United States Patent
Snyder et al.

(10) Patent No.: US 8,394,522 B2
(45) Date of Patent: Mar. 12, 2013

(54) ROBUST METAL FILM ENCAPSULATION

(75) Inventors: Shawn W. Snyder, Golden, CO (US);
Paul C. Brantner, Conifer, CO (US);
Joseph A. Keating, Broomfield, CO (US); Timothy N. Bradow, Littleton, CO (US); Prativadi B. Narayan, Broomfield, CO (US); Bernd J. Neudecker, Littleton, CO (US)

(73) Assignee: Infinite Power Solutions, Inc., Littleton, CO (US)

( * ) Notice: Subject to any disclaimer, the term of this patent is extended or adjusted under 35 U.S.C. 154(b) by 824 days.

(21) Appl. No.: 12/111,388

(22) Filed: Apr. 29, 2008

(65) Prior Publication Data

US 2008/0261107 A1    Oct. 23, 2008

(51) Int. Cl.
*H01M 2/18* (2006.01)
(52) U.S. Cl. .................. 429/136; 429/129; 429/246
(58) Field of Classification Search .................. None
See application file for complete search history.

(56) References Cited

U.S. PATENT DOCUMENTS

| | | | |
|---|---|---|---|
| 712,316 A | 10/1902 | Loppe et al. | |
| 1,712,316 A | 10/1902 | Loppe et al. | |
| 2,970,180 A * | 1/1961 | Urry | 429/118 |
| 3,309,302 A | 3/1967 | Heil | |
| 3,616,403 A | 10/1971 | Collins et al. | |
| 3,790,432 A | 2/1974 | Fletcher et al. | |
| 3,797,091 A | 3/1974 | Gavin | |
| 3,850,604 A | 11/1974 | Klein | |
| 3,939,008 A | 2/1976 | Longo et al. | |
| 4,082,569 A | 4/1978 | Evans, Jr. | |
| 4,111,523 A | 9/1978 | Kaminow et al. | |
| 4,127,424 A | 11/1978 | Ullery, Jr. | |
| 4,226,924 A | 10/1980 | Kimura et al. | |
| 4,283,216 A | 8/1981 | Brereton | |
| 4,318,938 A | 3/1982 | Barnett et al. | |
| 4,328,297 A | 5/1982 | Bilhorn | |
| 4,395,713 A | 7/1983 | Nelson et al. | |
| 4,437,966 A | 3/1984 | Hope et al. | |
| 4,442,144 A | 4/1984 | Pipkin | |
| 4,467,236 A | 8/1984 | Kolm et al. | |
| 4,481,265 A | 11/1984 | Ezawa et al. | |
| 4,518,661 A | 5/1985 | Rippere | |

(Continued)

FOREIGN PATENT DOCUMENTS

| | | |
|---|---|---|
| CN | 1415124 | 4/2003 |
| CN | 1532984 | 9/2004 |

(Continued)

OTHER PUBLICATIONS

Abraham, K.M. et al., "Inorganic-organic composite solid polymer electrolytes," 147(4) J. Electrochem. Soc. 1251-56 (2000).

(Continued)

*Primary Examiner* — Cynthia Lee
(74) *Attorney, Agent, or Firm* — Jeff E. Schwartz; Fox Rothschild LLP

(57) ABSTRACT

The present invention relates to metal film encapsulation of an electrochemical device. The metal film encapsulation may provide contact tabs for the electrochemical device. The present invention may also include a selectively conductive bonding layer between a contact and a cell structure. The present invention may further include ways of providing heat and pressure resilience to the bonding layer and improving the robustness of the protection for the cell structure.

24 Claims, 26 Drawing Sheets

U.S. PATENT DOCUMENTS

| | | |
|---|---|---|
| 4,555,456 A | 11/1985 | Kanehori et al. |
| 4,572,873 A | 2/1986 | Kanehori et al. |
| 4,587,225 A | 5/1986 | Tsukuma et al. |
| 4,619,680 A | 10/1986 | Nourshargh et al. |
| 4,645,726 A | 2/1987 | Hiratani et al. |
| 4,664,993 A | 5/1987 | Sturgis et al. |
| 4,668,593 A | 5/1987 | Sammells |
| RE32,449 E | 6/1987 | Claussen et al. |
| 4,672,586 A | 6/1987 | Shimohigashi et al. |
| 4,710,940 A | 12/1987 | Sipes, Jr. |
| 4,728,588 A | 3/1988 | Noding et al. |
| 4,740,431 A | 4/1988 | Little |
| 4,756,717 A | 7/1988 | Sturgis et al. |
| 4,785,459 A | 11/1988 | Baer |
| 4,826,743 A | 5/1989 | Nazri |
| 4,865,428 A | 9/1989 | Corrigan |
| 4,878,094 A | 10/1989 | Balkanski |
| 4,903,326 A | 2/1990 | Zakman et al. |
| 4,915,810 A | 4/1990 | Kestigian et al. |
| 4,964,877 A | 10/1990 | Keister et al. |
| 4,977,007 A | 12/1990 | Kondo et al. |
| 4,978,437 A | 12/1990 | Wirz |
| 5,006,737 A | 4/1991 | Fay |
| 5,019,467 A | 5/1991 | Fujiwara |
| 5,030,331 A | 7/1991 | Sato |
| 5,035,965 A | 7/1991 | Sangyoji et al. |
| 5,055,704 A | 10/1991 | Link et al. |
| 5,057,385 A | 10/1991 | Hope et al. |
| 5,085,904 A | 2/1992 | Deak et al. |
| 5,096,852 A | 3/1992 | Hobson |
| 5,100,821 A | 3/1992 | Fay |
| 5,107,538 A | 4/1992 | Benton et al. |
| 5,110,694 A | 5/1992 | Nagasubramanian et al. |
| 5,110,696 A | 5/1992 | Shokoohi et al. |
| 5,119,269 A | 6/1992 | Nakayama |
| 5,119,460 A | 6/1992 | Bruce et al. |
| 5,124,782 A | 6/1992 | Hundt et al. |
| 5,147,985 A | 9/1992 | DuBrucq |
| 5,153,710 A | 10/1992 | McCain |
| 5,169,408 A | 12/1992 | Biggerstaff et al. |
| 5,171,413 A | 12/1992 | Arntz et al. |
| 5,173,271 A | 12/1992 | Chen et al. |
| 5,174,876 A | 12/1992 | Buchal et al. |
| 5,180,645 A | 1/1993 | Moré |
| 5,187,564 A | 2/1993 | McCain |
| 5,196,041 A | 3/1993 | Tumminelli et al. |
| 5,196,374 A | 3/1993 | Hundt et al. |
| 5,200,029 A | 4/1993 | Bruce et al. |
| 5,202,201 A | 4/1993 | Meunier et al. |
| 5,206,925 A | 4/1993 | Nakazawa et al. |
| 5,208,121 A | 5/1993 | Yahnke et al. |
| 5,217,828 A | 6/1993 | Sangyoji et al. |
| 5,221,891 A | 6/1993 | Janda et al. |
| 5,225,288 A | 7/1993 | Beeson et al. |
| 5,227,264 A | 7/1993 | Duval et al. |
| 5,237,439 A | 8/1993 | Misono et al. |
| 5,252,194 A | 10/1993 | Demaray et al. |
| 5,262,254 A | 11/1993 | Koksbang et al. |
| 5,273,608 A | 12/1993 | Nath |
| 5,287,427 A | 2/1994 | Atkins et al. |
| 5,296,089 A | 3/1994 | Chen et al. |
| 5,300,461 A | 4/1994 | Ting |
| 5,302,474 A | 4/1994 | Shackle |
| 5,303,319 A | 4/1994 | Ford et al. |
| 5,306,569 A | 4/1994 | Hiraki |
| 5,307,240 A | 4/1994 | McMahon |
| 5,309,302 A | 5/1994 | Vollmann |
| 5,314,765 A | 5/1994 | Bates |
| 5,326,652 A | 7/1994 | Lake |
| 5,326,653 A | 7/1994 | Chang |
| 5,338,624 A | 8/1994 | Gruenstern et al. |
| 5,338,625 A | 8/1994 | Bates et al. |
| 5,342,709 A | 8/1994 | Yahnke et al. |
| 5,355,089 A | 10/1994 | Treger et al. |
| 5,360,686 A | 11/1994 | Peled et al. |
| 5,362,579 A | 11/1994 | Rossoll et al. |
| 5,381,262 A | 1/1995 | Arima et al. |
| 5,387,482 A | 2/1995 | Anani |
| 5,401,595 A | 3/1995 | Kagawa et al. |
| 5,403,680 A | 4/1995 | Otagawa et al. |
| 5,411,537 A | 5/1995 | Munshi et al. |
| 5,411,592 A | 5/1995 | Ovshinsky et al. |
| 5,419,982 A | 5/1995 | Tura et al. |
| 5,427,669 A | 6/1995 | Drummond |
| 5,435,826 A | 7/1995 | Sakakibara et al. |
| 5,437,692 A | 8/1995 | Dasgupta et al. |
| 5,445,856 A | 8/1995 | Chaloner-Gill |
| 5,445,906 A | 8/1995 | Hobson et al. |
| 5,448,110 A | 9/1995 | Tuttle et al. |
| 5,449,576 A | 9/1995 | Anani |
| 5,455,126 A | 10/1995 | Bates et al. |
| 5,457,569 A | 10/1995 | Liou et al. |
| 5,458,995 A | 10/1995 | Behl et al. |
| 5,464,692 A | 11/1995 | Huber |
| 5,464,706 A | 11/1995 | Dasgupta et al. |
| 5,470,396 A | 11/1995 | Mongon et al. |
| 5,472,795 A | 12/1995 | Atita |
| 5,475,528 A | 12/1995 | LaBorde |
| 5,478,456 A | 12/1995 | Humpal et al. |
| 5,483,613 A | 1/1996 | Bruce et al. |
| 5,493,177 A | 2/1996 | Muller et al. |
| 5,498,489 A | 3/1996 | Dasgupta et al. |
| 5,499,207 A | 3/1996 | Miki et al. |
| 5,501,918 A | 3/1996 | Gruenstern et al. |
| 5,504,041 A | 4/1996 | Summerfelt |
| 5,512,147 A | 4/1996 | Bates et al. |
| 5,512,387 A | 4/1996 | Ovshinsky |
| 5,512,389 A | 4/1996 | Dasgupta et al. |
| 5,538,796 A | 7/1996 | Schaffer et al. |
| 5,540,742 A | 7/1996 | Sangyoji et al. |
| 5,547,780 A | 8/1996 | Kagawa et al. |
| 5,547,781 A * | 8/1996 | Blonsky et al. ............... 429/174 |
| 5,547,782 A | 8/1996 | Dasgupta et al. |
| 5,552,242 A | 9/1996 | Ovshinsky et al. |
| 5,555,127 A | 9/1996 | Abdelkader et al. |
| 5,561,004 A | 10/1996 | Bates et al. |
| 5,563,979 A | 10/1996 | Bruce et al. |
| 5,565,071 A | 10/1996 | Demaray et al. |
| 5,567,210 A | 10/1996 | Bates et al. |
| 5,569,520 A | 10/1996 | Bates |
| 5,582,935 A | 12/1996 | Dasgupta et al. |
| 5,591,520 A | 1/1997 | Migliorini et al. |
| 5,597,660 A | 1/1997 | Bates et al. |
| 5,597,661 A | 1/1997 | Takeuchi et al. |
| 5,599,355 A | 2/1997 | Nagasubramanian et al. |
| 5,601,952 A | 2/1997 | Dasgupta et al. |
| 5,603,816 A | 2/1997 | Demaray et al. |
| 5,607,560 A | 3/1997 | Hirabayashi et al. |
| 5,607,789 A | 3/1997 | Treger et al. |
| 5,612,152 A | 3/1997 | Bates |
| 5,612,153 A | 3/1997 | Moulton et al. |
| 5,613,995 A | 3/1997 | Bhandarkar et al. |
| 5,616,933 A | 4/1997 | Li |
| 5,618,382 A | 4/1997 | Mintz et al. |
| 5,625,202 A | 4/1997 | Chai |
| 5,637,418 A | 6/1997 | Brown et al. |
| 5,643,480 A | 7/1997 | Gustavsson et al. |
| 5,644,207 A | 7/1997 | Lew et al. |
| 5,645,626 A | 7/1997 | Edlund et al. |
| 5,645,960 A | 7/1997 | Scrosati et al. |
| 5,654,054 A | 8/1997 | Tropsha et al. |
| 5,654,984 A | 8/1997 | Hershbarger et al. |
| 5,658,652 A | 8/1997 | Sellergren |
| 5,660,700 A | 8/1997 | Shimizu et al. |
| 5,665,490 A | 9/1997 | Takeuchi et al. |
| 5,667,538 A | 9/1997 | Bailey |
| 5,677,784 A | 10/1997 | Harris |
| 5,679,980 A | 10/1997 | Summerfelt |
| 5,681,666 A | 10/1997 | Treger et al. |
| 5,686,360 A | 11/1997 | Harvey, III et al. |
| 5,689,522 A | 11/1997 | Beach |
| 5,693,956 A | 12/1997 | Shi et al. |
| 5,702,829 A | 12/1997 | Paidassi et al. |
| 5,705,293 A | 1/1998 | Hobson |
| 5,716,728 A | 2/1998 | Smesko |
| 5,718,813 A | 2/1998 | Drummond et al. |
| 5,719,976 A | 2/1998 | Henry et al. |

| Patent | Date | Inventor |
|---|---|---|
| 5,721,067 A | 2/1998 | Jacobs et al. |
| RE35,746 E | 3/1998 | Lake |
| 5,731,661 A | 3/1998 | So et al. |
| 5,738,731 A | 4/1998 | Shindo et al. |
| 5,742,094 A | 4/1998 | Ting |
| 5,755,938 A | 5/1998 | Fukui et al. |
| 5,755,940 A | 5/1998 | Shindo |
| 5,757,126 A | 5/1998 | Harvey, III et al. |
| 5,762,768 A | 6/1998 | Goy et al. |
| 5,763,058 A | 6/1998 | Isen et al. |
| 5,771,562 A | 6/1998 | Harvey, III et al. |
| 5,776,278 A | 7/1998 | Tuttle et al. |
| 5,779,839 A | 7/1998 | Tuttle et al. |
| 5,790,489 A | 8/1998 | O'Connor |
| 5,792,550 A | 8/1998 | Phillips et al. |
| 5,805,223 A | 9/1998 | Shikakura et al. |
| 5,811,177 A | 9/1998 | Shi et al. |
| 5,814,195 A | 9/1998 | Lehan et al. |
| 5,830,330 A | 11/1998 | Lantsman |
| 5,831,262 A | 11/1998 | Greywall et al. |
| 5,834,137 A | 11/1998 | Zhang et al. |
| 5,841,931 A | 11/1998 | Foresi et al. |
| 5,842,118 A | 11/1998 | Wood, Jr. |
| 5,845,990 A | 12/1998 | Hymer |
| 5,847,865 A | 12/1998 | Gopinath et al. |
| 5,849,163 A | 12/1998 | Ichikawa et al. |
| 5,851,896 A | 12/1998 | Summerfelt |
| 5,853,830 A | 12/1998 | McCaulley et al. |
| 5,855,744 A | 1/1999 | Halsey et al. |
| 5,856,705 A | 1/1999 | Ting |
| 5,864,182 A | 1/1999 | Matsuzaki |
| 5,865,860 A | 2/1999 | Delnick |
| 5,870,273 A | 2/1999 | Sogabe et al. |
| 5,874,184 A | 2/1999 | Takeuchi et al. |
| 5,882,721 A | 3/1999 | Delnick |
| 5,882,946 A | 3/1999 | Otani |
| 5,889,383 A | 3/1999 | Teich |
| 5,895,731 A | 4/1999 | Clingempeel |
| 5,897,522 A | 4/1999 | Nitzan |
| 5,900,057 A | 5/1999 | Buchal et al. |
| 5,909,346 A | 6/1999 | Malhotra et al. |
| 5,916,704 A | 6/1999 | Lewin et al. |
| 5,923,964 A | 7/1999 | Li |
| 5,930,046 A | 7/1999 | Solberg et al. |
| 5,930,584 A | 7/1999 | Sun et al. |
| 5,942,089 A | 8/1999 | Sproul et al. |
| 5,948,215 A | 9/1999 | Lantsman |
| 5,948,464 A | 9/1999 | Delnick |
| 5,948,562 A | 9/1999 | Fulcher et al. |
| 5,952,778 A | 9/1999 | Haskal et al. |
| 5,955,217 A | 9/1999 | Van Lerberghe |
| 5,961,672 A | 10/1999 | Skotheim et al. |
| 5,961,682 A | 10/1999 | Lee et al. |
| 5,966,491 A | 10/1999 | DiGiovanni |
| 5,970,393 A | 10/1999 | Khorrami et al. |
| 5,973,913 A | 10/1999 | McEwen et al. |
| 5,977,582 A | 11/1999 | Flemming et al. |
| 5,982,144 A | 11/1999 | Johnson et al. |
| 5,985,484 A | 11/1999 | Young et al. |
| 5,985,485 A | 11/1999 | Ovshinsky et al. |
| 6,000,603 A | 12/1999 | Koskenmaki et al. |
| 6,001,224 A | 12/1999 | Drummond et al. |
| 6,004,660 A | 12/1999 | Topolski et al. |
| 6,007,945 A | 12/1999 | Jacobs et al. |
| 6,013,949 A | 1/2000 | Tuttle |
| 6,019,284 A | 2/2000 | Freeman et al. |
| 6,023,610 A | 2/2000 | Wood, Jr. |
| 6,024,844 A | 2/2000 | Drummond et al. |
| 6,025,094 A | 2/2000 | Visco et al. |
| 6,028,990 A | 2/2000 | Shahani et al. |
| 6,030,421 A | 2/2000 | Gauthier et al. |
| 6,033,768 A | 3/2000 | Muenz et al. |
| 6,042,965 A | 3/2000 | Nestler et al. |
| 6,045,626 A | 4/2000 | Yano et al. |
| 6,045,652 A | 4/2000 | Tuttle et al. |
| 6,045,942 A | 4/2000 | Miekka et al. |
| 6,046,081 A | 4/2000 | Kuo |
| 6,046,514 A | 4/2000 | Rouillard et al. |
| 6,048,372 A | 4/2000 | Mangahara et al. |
| 6,051,114 A | 4/2000 | Yao et al. |
| 6,051,296 A | 4/2000 | McCaulley et al. |
| 6,052,397 A | 4/2000 | Jeon et al. |
| 6,057,557 A | 5/2000 | Ichikawa |
| 6,058,233 A | 5/2000 | Dragone |
| 6,071,323 A | 6/2000 | Kawaguchi |
| 6,075,973 A | 6/2000 | Greeff et al. |
| 6,077,106 A | 6/2000 | Mish |
| 6,077,642 A | 6/2000 | Ogata et al. |
| 6,078,791 A | 6/2000 | Tuttle et al. |
| 6,080,508 A | 6/2000 | Dasgupta et al. |
| 6,080,643 A | 6/2000 | Noguchi et al. |
| 6,093,944 A | 7/2000 | VanDover |
| 6,094,292 A | 7/2000 | Goldner et al. |
| 6,096,569 A | 8/2000 | Matsuno et al. |
| 6,100,108 A | 8/2000 | Mizuno et al. |
| 6,106,933 A | 8/2000 | Nagai et al. |
| 6,110,531 A | 8/2000 | Paz de Araujo et al. |
| 6,115,616 A | 9/2000 | Halperin et al. |
| 6,117,279 A | 9/2000 | Smolanoff et al. |
| 6,118,426 A | 9/2000 | Albert et al. |
| 6,120,890 A | 9/2000 | Chen et al. |
| 6,129,277 A | 10/2000 | Grant et al. |
| 6,133,670 A | 10/2000 | Rodgers et al. |
| 6,137,671 A | 10/2000 | Staffiere |
| 6,144,916 A | 11/2000 | Wood, Jr. et al. |
| 6,146,225 A | 11/2000 | Sheats et al. |
| 6,148,503 A | 11/2000 | Delnick et al. |
| 6,156,452 A * | 12/2000 | Kozuki et al. .................. 429/211 |
| 6,157,765 A | 12/2000 | Bruce et al. |
| 6,159,635 A | 12/2000 | Dasgupta et al. |
| 6,160,373 A | 12/2000 | Dunn et al. |
| 6,162,709 A | 12/2000 | Raoux et al. |
| 6,165,566 A | 12/2000 | Tropsha |
| 6,168,884 B1 | 1/2001 | Neudecker et al. |
| 6,169,474 B1 | 1/2001 | Greeff et al. |
| 6,175,075 B1 | 1/2001 | Shiotsuka et al. |
| 6,176,986 B1 | 1/2001 | Watanabe et al. |
| 6,181,283 B1 | 1/2001 | Johnson et al. |
| 6,192,222 B1 | 2/2001 | Greeff et al. |
| 6,197,167 B1 | 3/2001 | Tanaka |
| 6,198,217 B1 | 3/2001 | Suzuki et al. |
| 6,204,111 B1 | 3/2001 | Uemoto et al. |
| 6,210,544 B1 | 4/2001 | Sasaki |
| 6,210,832 B1 | 4/2001 | Visco et al. |
| 6,214,061 B1 | 4/2001 | Visco et al. |
| 6,214,660 B1 | 4/2001 | Uemoto et al. |
| 6,218,049 B1 | 4/2001 | Bates et al. |
| 6,220,516 B1 | 4/2001 | Tuttle et al. |
| 6,223,317 B1 | 4/2001 | Pax et al. |
| 6,228,532 B1 | 5/2001 | Tsuji et al. |
| 6,229,987 B1 | 5/2001 | Greeff et al. |
| 6,232,242 B1 | 5/2001 | Hata et al. |
| 6,235,432 B1 | 5/2001 | Kono et al. |
| 6,236,793 B1 | 5/2001 | Lawrence et al. |
| 6,242,128 B1 | 6/2001 | Tura et al. |
| 6,242,129 B1 | 6/2001 | Johnson |
| 6,242,132 B1 | 6/2001 | Neudecker et al. |
| 6,248,291 B1 | 6/2001 | Nakagama et al. |
| 6,248,481 B1 | 6/2001 | Visco et al. |
| 6,248,640 B1 | 6/2001 | Nam |
| 6,249,222 B1 | 6/2001 | Gehlot |
| 6,252,564 B1 | 6/2001 | Albert et al. |
| 6,258,252 B1 | 7/2001 | Miyasaka et al. |
| 6,261,917 B1 | 7/2001 | Quek et al. |
| 6,264,709 B1 | 7/2001 | Yoon et al. |
| 6,265,652 B1 | 7/2001 | Kurata et al. |
| 6,268,695 B1 | 7/2001 | Affinito |
| 6,271,053 B1 | 8/2001 | Kondo |
| 6,271,793 B1 | 8/2001 | Brady et al. |
| 6,271,801 B2 | 8/2001 | Tuttle et al. |
| 6,280,585 B1 | 8/2001 | Obinata et al. |
| 6,280,875 B1 | 8/2001 | Kwak et al. |
| 6,281,142 B1 | 8/2001 | Basceri et al. |
| 6,284,406 B1 | 9/2001 | Xing et al. |
| 6,287,986 B1 | 9/2001 | Mihara |
| 6,289,209 B1 | 9/2001 | Wood, Jr. |
| 6,290,821 B1 | 9/2001 | McLeod |
| 6,290,822 B1 | 9/2001 | Fleming et al. |

| | | |
|---|---|---|
| 6,291,098 B1 | 9/2001 | Shibuya et al. |
| 6,294,722 B1 | 9/2001 | Kondo et al. |
| 6,296,949 B1 | 10/2001 | Bergstresser et al. |
| 6,296,967 B1 | 10/2001 | Jacobs et al. |
| 6,296,971 B1 | 10/2001 | Hara |
| 6,300,215 B1 | 10/2001 | Shin |
| 6,302,939 B1 | 10/2001 | Rabin |
| 6,306,265 B1 | 10/2001 | Fu et al. |
| 6,316,563 B2 | 11/2001 | Naijo et al. |
| 6,323,416 B1 | 11/2001 | Komori et al. |
| 6,324,211 B1 | 11/2001 | Ovard et al. |
| 6,325,294 B2 | 12/2001 | Tuttle et al. |
| 6,329,213 B1 | 12/2001 | Tuttle et al. |
| 6,339,236 B1 | 1/2002 | Tomii et al. |
| 6,340,880 B1 | 1/2002 | Higashijima et al. |
| 6,344,366 B1 | 2/2002 | Bates |
| 6,344,419 B1 | 2/2002 | Forster et al. |
| 6,344,795 B1 | 2/2002 | Gehlot |
| 6,350,353 B2 | 2/2002 | Gopalraja et al. |
| 6,351,630 B2 | 2/2002 | Wood, Jr. |
| 6,356,230 B1 | 3/2002 | Greef et al. |
| 6,356,694 B1 | 3/2002 | Weber |
| 6,356,764 B1 | 3/2002 | Ovard et al. |
| 6,358,810 B1 | 3/2002 | Dornfest et al. |
| 6,360,954 B1 | 3/2002 | Barnardo |
| 6,361,662 B1 | 3/2002 | Chiba et al. |
| 6,365,300 B1 | 4/2002 | Ota et al. |
| 6,365,319 B1 | 4/2002 | Heath et al. |
| 6,368,275 B1 | 4/2002 | Sliwa et al. |
| 6,369,316 B1 | 4/2002 | Plessing et al. |
| 6,372,383 B1 | 4/2002 | Lee et al. |
| 6,372,386 B1 | 4/2002 | Cho et al. |
| 6,373,224 B1 | 4/2002 | Goto et al. |
| 6,375,780 B1 | 4/2002 | Tuttle et al. |
| 6,376,027 B1 | 4/2002 | Lee et al. |
| 6,379,835 B1 | 4/2002 | Kucherovsky et al. |
| 6,379,842 B1 | 4/2002 | Mayer |
| 6,379,846 B1 | 4/2002 | Terahara et al. |
| 6,380,477 B1 | 4/2002 | Curtin |
| 6,384,573 B1 | 5/2002 | Dunn |
| 6,387,563 B1 | 5/2002 | Bates |
| 6,391,166 B1 | 5/2002 | Wang |
| 6,392,565 B1 | 5/2002 | Brown |
| 6,394,598 B1 | 5/2002 | Kaiser |
| 6,395,430 B1 | 5/2002 | Cho et al. |
| 6,396,001 B1 | 5/2002 | Nakamura |
| 6,398,824 B1 | 6/2002 | Johnson |
| 6,399,241 B1 | 6/2002 | Hara et al. |
| 6,402,039 B1 | 6/2002 | Freeman et al. |
| 6,402,795 B1 | 6/2002 | Chu et al. |
| 6,402,796 B1 | 6/2002 | Johnson |
| 6,409,965 B1 | 6/2002 | Nagata et al. |
| 6,413,284 B1 | 7/2002 | Chu et al. |
| 6,413,285 B1 | 7/2002 | Chu et al. |
| 6,413,382 B1 | 7/2002 | Wang et al. |
| 6,413,645 B1 | 7/2002 | Graff et al. |
| 6,413,676 B1 | 7/2002 | Munshi |
| 6,414,626 B1 | 7/2002 | Greeff et al. |
| 6,416,598 B1 | 7/2002 | Sircar |
| 6,420,961 B1 | 7/2002 | Bates et al. |
| 6,422,698 B2 | 7/2002 | Kaiser |
| 6,423,106 B1 | 7/2002 | Bates |
| 6,423,776 B1 | 7/2002 | Akkapeddi et al. |
| 6,426,163 B1 | 7/2002 | Pasquier et al. |
| 6,432,577 B1 | 8/2002 | Shul et al. |
| 6,432,584 B1 | 8/2002 | Visco et al. |
| 6,433,380 B2 | 8/2002 | Shin |
| 6,433,465 B1 | 8/2002 | McKnight et al. |
| 6,436,156 B1 | 8/2002 | Wandeloski et al. |
| 6,437,231 B2 | 8/2002 | Kurata et al. |
| 6,444,336 B1 | 9/2002 | Jia et al. |
| 6,444,355 B1 | 9/2002 | Murai et al. |
| 6,444,368 B1 | 9/2002 | Hikmet et al. |
| 6,444,750 B1 | 9/2002 | Touhsaent |
| 6,459,418 B1 | 10/2002 | Comiskey et al. |
| 6,459,726 B1 | 10/2002 | Ovard et al. |
| 6,466,771 B2 | 10/2002 | Wood, Jr. |
| 6,475,668 B1 | 11/2002 | Hosokawa et al. |
| 6,480,699 B1 | 11/2002 | Lovoi |
| 6,481,623 B1 | 11/2002 | Grant et al. |
| 6,488,822 B1 | 12/2002 | Moslehi |
| 6,494,999 B1 | 12/2002 | Herrera et al. |
| 6,495,283 B1 | 12/2002 | Yoon et al. |
| 6,497,598 B2 | 12/2002 | Affinito |
| 6,500,287 B1 | 12/2002 | Azens et al. |
| 6,503,661 B1 | 1/2003 | Park et al. |
| 6,503,831 B2 | 1/2003 | Speakman |
| 6,506,289 B2 | 1/2003 | Demaray et al. |
| 6,511,516 B1 | 1/2003 | Johnson et al. |
| 6,511,615 B1 | 1/2003 | Dawes et al. |
| 6,517,968 B2 | 2/2003 | Johnson et al. |
| 6,522,067 B1 | 2/2003 | Graff et al. |
| 6,524,466 B1 | 2/2003 | Bonaventura et al. |
| 6,524,750 B1 | 2/2003 | Mansuetto |
| 6,525,976 B1 | 2/2003 | Johnson |
| 6,528,212 B1 | 3/2003 | Kusumoto et al. |
| 6,529,827 B1 | 3/2003 | Beason et al. |
| 6,533,907 B2 | 3/2003 | Demaray et al. |
| 6,537,428 B1 | 3/2003 | Xiong et al. |
| 6,538,211 B2 | 3/2003 | St. Lawrence et al. |
| 6,541,147 B1 | 4/2003 | McLean et al. |
| 6,548,912 B1 | 4/2003 | Graff et al. |
| 6,551,745 B2 | 4/2003 | Moutsios et al. |
| 6,558,836 B1 | 5/2003 | Whitacre et al. |
| 6,562,513 B1 | 5/2003 | Takeuchi et al. |
| 6,563,998 B1 | 5/2003 | Farah et al. |
| 6,569,564 B1 | 5/2003 | Lane |
| 6,569,570 B2 | 5/2003 | Sonobe et al. |
| 6,570,325 B2 | 5/2003 | Graff et al. |
| 6,572,173 B2 | 6/2003 | Muller |
| 6,573,652 B1 | 6/2003 | Graff et al. |
| 6,576,546 B2 | 6/2003 | Gilbert et al. |
| 6,579,728 B2 | 6/2003 | Grant et al. |
| 6,582,480 B2 | 6/2003 | Pasquier et al. |
| 6,582,481 B1 | 6/2003 | Erbil |
| 6,582,852 B1 | 6/2003 | Gao et al. |
| 6,589,299 B2 | 7/2003 | Missling et al. |
| 6,593,150 B2 | 7/2003 | Ramberg et al. |
| 6,599,662 B1 | 7/2003 | Chiang et al. |
| 6,600,905 B2 | 7/2003 | Greeff et al. |
| 6,602,338 B2 | 8/2003 | Chen et al. |
| 6,603,139 B1 | 8/2003 | Tessler et al. |
| 6,603,391 B1 | 8/2003 | Greeff et al. |
| 6,605,228 B1 | 8/2003 | Kawaguchi et al. |
| 6,608,464 B1 | 8/2003 | Lew et al. |
| 6,608,470 B1 | 8/2003 | Oglesbee et al. |
| 6,610,440 B1 | 8/2003 | LaFollette et al. |
| 6,615,614 B1 | 9/2003 | Makikawa et al. |
| 6,616,035 B2 | 9/2003 | Ehrensvard et al. |
| 6,618,829 B2 | 9/2003 | Pax et al. |
| 6,620,545 B2 | 9/2003 | Goenka et al. |
| 6,622,049 B2 | 9/2003 | Penner et al. |
| 6,632,563 B1 | 10/2003 | Krasnov et al. |
| 6,637,906 B2 | 10/2003 | Knoerzer et al. |
| 6,637,916 B2 | 10/2003 | Mullner |
| 6,639,578 B1 | 10/2003 | Comiskey et al. |
| 6,642,895 B2 | 11/2003 | Zurcher et al. |
| 6,645,675 B1 | 11/2003 | Munshi |
| 6,650,000 B2 | 11/2003 | Ballantine et al. |
| 6,650,942 B2 | 11/2003 | Howard et al. |
| 6,662,430 B2 | 12/2003 | Brady et al. |
| 6,664,006 B1 | 12/2003 | Munshi |
| 6,673,484 B2 | 1/2004 | Matsuura |
| 6,673,716 B1 | 1/2004 | D'Couto et al. |
| 6,674,159 B1 | 1/2004 | Peterson et al. |
| 6,677,070 B2 | 1/2004 | Kearl |
| 6,683,244 B2 | 1/2004 | Fujimori et al. |
| 6,683,749 B2 | 1/2004 | Daby et al. |
| 6,686,096 B1 | 2/2004 | Chung |
| 6,693,840 B2 | 2/2004 | Shimada et al. |
| 6,700,491 B2 | 3/2004 | Shafer |
| 6,706,449 B2 | 3/2004 | Mikhaylik et al. |
| 6,709,778 B2 | 3/2004 | Johnson |
| 6,713,216 B2 | 3/2004 | Kugai et al. |
| 6,713,389 B2 | 3/2004 | Speakman |
| 6,713,987 B2 | 3/2004 | Krasnov et al. |
| 6,723,140 B2 | 4/2004 | Chu et al. |
| 6,730,423 B2 | 5/2004 | Einhart et al. |

| Patent No. | Date | Inventor(s) |
|---|---|---|
| 6,733,924 B1 | 5/2004 | Skotheim et al. |
| 6,737,197 B2 | 5/2004 | Chu et al. |
| 6,737,789 B2 | 5/2004 | Radziemski et al. |
| 6,741,178 B1 | 5/2004 | Tuttle |
| 6,750,156 B2 | 6/2004 | Le et al. |
| 6,752,842 B2 | 6/2004 | Luski et al. |
| 6,753,108 B1 | 6/2004 | Hampden-Smith et al. |
| 6,753,114 B2 | 6/2004 | Jacobs et al. |
| 6,760,520 B1 | 7/2004 | Medin et al. |
| 6,764,525 B1 | 7/2004 | Whitacre et al. |
| 6,768,246 B2 | 7/2004 | Pelrine et al. |
| 6,768,855 B1 | 7/2004 | Bakke et al. |
| 6,770,176 B2 | 8/2004 | Benson et al. |
| 6,773,848 B1 | 8/2004 | Nortoft et al. |
| 6,780,208 B2 | 8/2004 | Hopkins et al. |
| 6,797,428 B1 | 9/2004 | Skotheim et al. |
| 6,797,429 B1 | 9/2004 | Komatsu |
| 6,805,998 B2 | 10/2004 | Jenson et al. |
| 6,805,999 B2 | 10/2004 | Lee et al. |
| 6,818,356 B1 | 11/2004 | Bates |
| 6,822,157 B2 | 11/2004 | Fujioka |
| 6,824,922 B2 | 11/2004 | Park et al. |
| 6,827,826 B2 | 12/2004 | Demaray et al. |
| 6,828,063 B2 | 12/2004 | Park et al. |
| 6,828,065 B2 | 12/2004 | Munshi |
| 6,830,846 B2 | 12/2004 | Kramlich et al. |
| 6,835,493 B2 | 12/2004 | Zhang et al. |
| 6,838,209 B2 | 1/2005 | Langan et al. |
| 6,846,765 B2 | 1/2005 | Imamura et al. |
| 6,852,139 B2 | 2/2005 | Zhang et al. |
| 6,855,441 B1 | 2/2005 | Levanon |
| 6,861,821 B2 | 3/2005 | Masumoto et al. |
| 6,863,699 B1 | 3/2005 | Krasnov et al. |
| 6,866,901 B2 | 3/2005 | Burrows et al. |
| 6,866,963 B2 | 3/2005 | Seung et al. |
| 6,869,722 B2 | 3/2005 | Kearl |
| 6,884,327 B2 | 4/2005 | Pan et al. |
| 6,886,240 B2 | 5/2005 | Zhang et al. |
| 6,890,385 B2 | 5/2005 | Tsuchiya et al. |
| 6,896,992 B2 | 5/2005 | Kearl |
| 6,899,975 B2 | 5/2005 | Watanabe et al. |
| 6,902,660 B2 | 6/2005 | Lee et al. |
| 6,905,578 B1 | 6/2005 | Moslehi et al. |
| 6,906,436 B2 | 6/2005 | Jenson et al. |
| 6,911,667 B2 | 6/2005 | Pichler et al. |
| 6,916,679 B2 | 7/2005 | Snyder et al. |
| 6,921,464 B2 | 7/2005 | Krasnov et al. |
| 6,923,702 B2 | 8/2005 | Graff et al. |
| 6,924,164 B2 | 8/2005 | Jenson |
| 6,929,879 B2 | 8/2005 | Yamazaki |
| 6,936,377 B2 | 8/2005 | Wensley et al. |
| 6,936,381 B2 | 8/2005 | Skotheim et al. |
| 6,936,407 B2 | 8/2005 | Pichler |
| 6,949,389 B2 | 9/2005 | Pichler et al. |
| 6,955,986 B2 | 10/2005 | Li |
| 6,962,613 B2 | 11/2005 | Jenson |
| 6,962,671 B2 | 11/2005 | Martin et al. |
| 6,964,829 B2 | 11/2005 | Utsugi et al. |
| 6,982,132 B1 | 1/2006 | Goldner et al. |
| 6,986,965 B2 | 1/2006 | Jenson et al. |
| 6,994,933 B1 | 2/2006 | Bates |
| 7,022,431 B2 | 4/2006 | Shchori et al. |
| 7,033,406 B2 | 4/2006 | Weir et al. |
| 7,045,246 B2 | 5/2006 | Simburger et al. |
| 7,045,372 B2 | 5/2006 | Ballantine et al. |
| 7,056,620 B2 | 6/2006 | Krasnov et al. |
| 7,073,723 B2 | 7/2006 | Fürst et al. |
| 7,095,372 B2 | 8/2006 | Soler Castany et al. |
| 7,129,166 B2 | 10/2006 | Speakman |
| 7,131,189 B2 | 11/2006 | Jenson |
| 7,144,654 B2 | 12/2006 | LaFollette et al. |
| 7,144,655 B2 | 12/2006 | Jenson et al. |
| 7,157,187 B2 | 1/2007 | Jenson |
| 7,158,031 B2 | 1/2007 | Tuttle |
| 7,162,392 B2 | 1/2007 | Vock et al. |
| 7,183,693 B2 | 2/2007 | Brantner et al. |
| 7,186,479 B2 | 3/2007 | Krasnov et al. |
| 7,194,801 B2 | 3/2007 | Jenson et al. |
| 7,198,832 B2 | 4/2007 | Burrows et al. |
| 7,202,825 B2 | 4/2007 | Leizerovich et al. |
| 7,220,517 B2 | 5/2007 | Park et al. |
| 7,230,321 B2 | 6/2007 | McCain |
| 7,247,408 B2 | 7/2007 | Skotheim et al. |
| 7,253,494 B2 | 8/2007 | Mino et al. |
| 7,265,674 B2 | 9/2007 | Tuttle |
| 7,267,904 B2 | 9/2007 | Komatsu et al. |
| 7,267,906 B2 | 9/2007 | Mizuta et al. |
| 7,273,682 B2 | 9/2007 | Park et al. |
| 7,274,118 B2 | 9/2007 | Jenson et al. |
| 7,288,340 B2 | 10/2007 | Iwamoto |
| 7,316,867 B2 | 1/2008 | Park et al. |
| 7,323,634 B2 | 1/2008 | Speakman |
| 7,332,363 B2 | 2/2008 | Edwards |
| 7,335,441 B2 | 2/2008 | Luski et al. |
| RE40,137 E | 3/2008 | Tuttle et al. |
| 7,345,647 B1 | 3/2008 | Rodenbeck |
| 7,348,099 B2 | 3/2008 | Mukai et al. |
| 7,389,580 B2 | 6/2008 | Jenson et al. |
| 7,400,253 B2 | 7/2008 | Cohen |
| 7,410,730 B2 | 8/2008 | Bates |
| RE40,531 E | 10/2008 | Graff et al. |
| 7,466,274 B2 | 12/2008 | Lin et al. |
| 7,468,221 B2 | 12/2008 | LaFollette et al. |
| 7,494,742 B2 | 2/2009 | Tarnowski et al. |
| 7,670,724 B1 | 3/2010 | Chan et al. |
| 7,848,715 B2 | 12/2010 | Boos |
| 7,858,223 B2 | 12/2010 | Visco et al. |
| 7,993,773 B2 | 8/2011 | Snyder et al. |
| 8,010,048 B2 | 8/2011 | Brommer et al. |
| 8,021,778 B2 | 9/2011 | Snyder et al. |
| 8,056,814 B2 | 11/2011 | Martin et al. |
| 8,236,443 B2 | 8/2012 | Snyder et al. |
| 2001/0005561 A1 | 6/2001 | Yamada et al. |
| 2001/0027159 A1 | 10/2001 | Kaneyoshi |
| 2001/0031122 A1 | 10/2001 | Lackritz et al. |
| 2001/0032666 A1 | 10/2001 | Jenson et al. |
| 2001/0033952 A1 | 10/2001 | Jenson et al. |
| 2001/0034106 A1 | 10/2001 | Moise et al. |
| 2001/0041294 A1 | 11/2001 | Chu et al. |
| 2001/0041460 A1 | 11/2001 | Wiggins |
| 2001/0052752 A1 | 12/2001 | Ghosh et al. |
| 2001/0054437 A1 | 12/2001 | Komori et al. |
| 2001/0055719 A1 | 12/2001 | Akashi et al. |
| 2002/0000034 A1 | 1/2002 | Jenson |
| 2002/0001746 A1 | 1/2002 | Jenson |
| 2002/0001747 A1 | 1/2002 | Jenson |
| 2002/0004167 A1 | 1/2002 | Jenson et al. |
| 2002/0009630 A1 | 1/2002 | Gao et al. |
| 2002/0019296 A1 | 2/2002 | Freeman et al. |
| 2002/0028377 A1 | 3/2002 | Gross |
| 2002/0033330 A1 | 3/2002 | Demaray et al. |
| 2002/0037756 A1 | 3/2002 | Jacobs et al. |
| 2002/0066539 A1 | 6/2002 | Muller |
| 2002/0067615 A1 | 6/2002 | Muller |
| 2002/0071989 A1 | 6/2002 | Verma et al. |
| 2002/0076133 A1 | 6/2002 | Li et al. |
| 2002/0090758 A1 | 7/2002 | Henley et al. |
| 2002/0091929 A1 | 7/2002 | Ehrensvard |
| 2002/0093029 A1 | 7/2002 | Ballantine et al. |
| 2002/0106297 A1 | 8/2002 | Ueno et al. |
| 2002/0110733 A1 | 8/2002 | Johnson |
| 2002/0115252 A1 | 8/2002 | Haukka et al. |
| 2002/0134671 A1 | 9/2002 | Demaray et al. |
| 2002/0139662 A1 | 10/2002 | Lee |
| 2002/0140103 A1 | 10/2002 | Kloster et al. |
| 2002/0159245 A1 | 10/2002 | Murasko et al. |
| 2002/0161404 A1 | 10/2002 | Schmidt |
| 2002/0164441 A1 | 11/2002 | Amine et al. |
| 2002/0170821 A1 | 11/2002 | Sandlin et al. |
| 2002/0170960 A1 | 11/2002 | Ehrensvard et al. |
| 2003/0019326 A1 | 1/2003 | Han et al. |
| 2003/0022487 A1 | 1/2003 | Yoon et al. |
| 2003/0024994 A1 | 2/2003 | Ladyansky |
| 2003/0029493 A1 | 2/2003 | Plessing |
| 2003/0030589 A1 | 2/2003 | Zurcher et al. |
| 2003/0035906 A1 | 2/2003 | Memarian et al. |
| 2003/0036003 A1 | 2/2003 | Shchori et al. |
| 2003/0042131 A1 | 3/2003 | Johnson |

| | | |
|---|---|---|
| 2003/0044665 A1 | 3/2003 | Rastegar et al. |
| 2003/0048635 A1 | 3/2003 | Knoerzer et al. |
| 2003/0057423 A1 | 3/2003 | Shimoda et al. |
| 2003/0063883 A1 | 4/2003 | Demaray et al. |
| 2003/0064292 A1 | 4/2003 | Neudecker et al. |
| 2003/0068559 A1 | 4/2003 | Armstrong et al. |
| 2003/0076642 A1 | 4/2003 | Shiner et al. |
| 2003/0077914 A1 | 4/2003 | Le et al. |
| 2003/0079838 A1 | 5/2003 | Brcka |
| 2003/0091904 A1 | 5/2003 | Munshi |
| 2003/0095463 A1 | 5/2003 | Shimada et al. |
| 2003/0097858 A1 | 5/2003 | Strohhofer et al. |
| 2003/0109903 A1 | 6/2003 | Berrang et al. |
| 2003/0127319 A1 | 7/2003 | Demaray et al. |
| 2003/0134054 A1 | 7/2003 | Demaray et al. |
| 2003/0141186 A1 | 7/2003 | Wang et al. |
| 2003/0143853 A1 | 7/2003 | Celii et al. |
| 2003/0146877 A1 | 8/2003 | Mueller |
| 2003/0152829 A1 | 8/2003 | Zhang et al. |
| 2003/0162094 A1 | 8/2003 | Lee et al. |
| 2003/0173207 A1 | 9/2003 | Zhang et al. |
| 2003/0173208 A1 | 9/2003 | Pan et al. |
| 2003/0174391 A1 | 9/2003 | Pan et al. |
| 2003/0175142 A1 | 9/2003 | Milonopoulou et al. |
| 2003/0178623 A1 | 9/2003 | Nishiki et al. |
| 2003/0178637 A1 | 9/2003 | Chen et al. |
| 2003/0180610 A1 | 9/2003 | Felde et al. |
| 2003/0185266 A1 | 10/2003 | Henrichs |
| 2003/0231106 A1 | 12/2003 | Shafer |
| 2003/0232248 A1 | 12/2003 | Iwamoto et al. |
| 2004/0008587 A1 | 1/2004 | Siebott et al. |
| 2004/0015735 A1 | 1/2004 | Norman |
| 2004/0023106 A1 | 2/2004 | Benson et al. |
| 2004/0028875 A1 | 2/2004 | Van Rijn et al. |
| 2004/0029311 A1 | 2/2004 | Snyder et al. |
| 2004/0038050 A1 | 2/2004 | Saijo et al. |
| 2004/0043557 A1 | 3/2004 | Haukka et al. |
| 2004/0048157 A1 | 3/2004 | Neudecker et al. |
| 2004/0053124 A1* | 3/2004 | LaFollette et al. .......... 429/149 |
| 2004/0058237 A1 | 3/2004 | Higuchi et al. |
| 2004/0072067 A1 | 4/2004 | Minami et al. |
| 2004/0077161 A1 | 4/2004 | Chen et al. |
| 2004/0078662 A1 | 4/2004 | Hamel et al. |
| 2004/0081415 A1 | 4/2004 | Demaray et al. |
| 2004/0081860 A1 | 4/2004 | Hundt et al. |
| 2004/0085002 A1 | 5/2004 | Pearce |
| 2004/0101761 A1 | 5/2004 | Park et al. |
| 2004/0105644 A1 | 6/2004 | Dawes |
| 2004/0106038 A1 | 6/2004 | Shimamura et al. |
| 2004/0106045 A1 | 6/2004 | Ugaji |
| 2004/0106046 A1 | 6/2004 | Inda |
| 2004/0118700 A1 | 6/2004 | Schierle-Arndt et al. |
| 2004/0126305 A1 | 7/2004 | Chen et al. |
| 2004/0151986 A1 | 8/2004 | Park et al. |
| 2004/0161640 A1 | 8/2004 | Salot |
| 2004/0175624 A1 | 9/2004 | Luski et al. |
| 2004/0188239 A1 | 9/2004 | Robison et al. |
| 2004/0209159 A1 | 10/2004 | Lee et al. |
| 2004/0212276 A1 | 10/2004 | Brantner et al. |
| 2004/0214079 A1 | 10/2004 | Simburger et al. |
| 2004/0219434 A1 | 11/2004 | Benson et al. |
| 2004/0245561 A1 | 12/2004 | Sakashita et al. |
| 2004/0258984 A1 | 12/2004 | Ariel et al. |
| 2004/0259305 A1 | 12/2004 | Demaray et al. |
| 2005/0000794 A1 | 1/2005 | Demaray et al. |
| 2005/0006768 A1 | 1/2005 | Narasimhan et al. |
| 2005/0048802 A1 | 3/2005 | Zhang et al. |
| 2005/0070097 A1 | 3/2005 | Barmak et al. |
| 2005/0072458 A1 | 4/2005 | Goldstein |
| 2005/0079418 A1 | 4/2005 | Kelley et al. |
| 2005/0095506 A1 | 5/2005 | Klaassen |
| 2005/0105231 A1 | 5/2005 | Hamel et al. |
| 2005/0110457 A1 | 5/2005 | LaFollette et al. |
| 2005/0112461 A1 | 5/2005 | Amine et al. |
| 2005/0118464 A1 | 6/2005 | Levanon |
| 2005/0130032 A1 | 6/2005 | Krasnov et al. |
| 2005/0133361 A1 | 6/2005 | Ding et al. |
| 2005/0141170 A1 | 6/2005 | Honda et al. |
| 2005/0142447 A1 | 6/2005 | Nakai et al. |
| 2005/0147877 A1 | 7/2005 | Tarnowski et al. |
| 2005/0158622 A1 | 7/2005 | Mizuta et al. |
| 2005/0170736 A1 | 8/2005 | Cok |
| 2005/0175891 A1 | 8/2005 | Kameyama et al. |
| 2005/0176181 A1 | 8/2005 | Burrows et al. |
| 2005/0181280 A1 | 8/2005 | Ceder et al. |
| 2005/0183946 A1 | 8/2005 | Pan et al. |
| 2005/0189139 A1 | 9/2005 | Stole |
| 2005/0208371 A1 | 9/2005 | Kim et al. |
| 2005/0239917 A1 | 10/2005 | Nelson et al. |
| 2005/0255828 A1 | 11/2005 | Fisher |
| 2005/0266161 A1 | 12/2005 | Medeiros et al. |
| 2006/0019504 A1 | 1/2006 | Taussig |
| 2006/0021214 A1 | 2/2006 | Jenson et al. |
| 2006/0021261 A1 | 2/2006 | Face |
| 2006/0040177 A1 | 2/2006 | Onodera et al. |
| 2006/0046907 A1 | 3/2006 | Rastegar et al. |
| 2006/0054496 A1 | 3/2006 | Zhang et al. |
| 2006/0057283 A1 | 3/2006 | Zhang et al. |
| 2006/0057304 A1 | 3/2006 | Zhang et al. |
| 2006/0063074 A1 | 3/2006 | Jenson et al. |
| 2006/0071592 A1 | 4/2006 | Narasimhan et al. |
| 2006/0134522 A1 | 6/2006 | Zhang et al. |
| 2006/0155545 A1 | 7/2006 | Jayne |
| 2006/0201583 A1 | 9/2006 | Michaluk et al. |
| 2006/0210779 A1 | 9/2006 | Weir et al. |
| 2006/0222954 A1 | 10/2006 | Skotheim et al. |
| 2006/0234130 A1 | 10/2006 | Inda |
| 2006/0237543 A1 | 10/2006 | Goto et al. |
| 2006/0255435 A1 | 11/2006 | Fuergut et al. |
| 2006/0286448 A1 | 12/2006 | Snyder et al. |
| 2007/0009802 A1 | 1/2007 | Lee et al. |
| 2007/0021156 A1 | 1/2007 | Hoong et al. |
| 2007/0023275 A1 | 2/2007 | Tanase et al. |
| 2007/0037058 A1 | 2/2007 | Visco et al. |
| 2007/0053139 A1 | 3/2007 | Zhang et al. |
| 2007/0064396 A1 | 3/2007 | Oman |
| 2007/0087230 A1 | 4/2007 | Jenson et al. |
| 2007/0091543 A1 | 4/2007 | Gasse et al. |
| 2007/0125638 A1 | 6/2007 | Zhang et al. |
| 2007/0141468 A1 | 6/2007 | Barker |
| 2007/0148065 A1 | 6/2007 | Weir et al. |
| 2007/0148553 A1 | 6/2007 | Weppner |
| 2007/0151661 A1 | 7/2007 | Mao et al. |
| 2007/0164376 A1 | 7/2007 | Burrows et al. |
| 2007/0166612 A1 | 7/2007 | Krasnov et al. |
| 2007/0184345 A1 | 8/2007 | Neudecker et al. |
| 2007/0196682 A1 | 8/2007 | Visser et al. |
| 2007/0202395 A1 | 8/2007 | Snyder et al. |
| 2007/0205513 A1 | 9/2007 | Brunnbauer et al. |
| 2007/0210459 A1 | 9/2007 | Burrows et al. |
| 2007/0222681 A1 | 9/2007 | Greene et al. |
| 2007/0224951 A1 | 9/2007 | Gilb et al. |
| 2007/0229228 A1 | 10/2007 | Yamazaki et al. |
| 2007/0235320 A1 | 10/2007 | White et al. |
| 2007/0264564 A1 | 11/2007 | Johnson et al. |
| 2007/0278653 A1 | 12/2007 | Brunnbauer et al. |
| 2007/0298326 A1 | 12/2007 | Angell et al. |
| 2008/0003496 A1 | 1/2008 | Neudecker et al. |
| 2008/0008936 A1 | 1/2008 | Mizuta et al. |
| 2008/0014501 A1 | 1/2008 | Skotheim et al. |
| 2008/0057397 A1 | 3/2008 | Skotheim et al. |
| 2008/0150829 A1 | 6/2008 | Lin et al. |
| 2008/0213672 A1 | 9/2008 | Skotheim et al. |
| 2008/0233708 A1 | 9/2008 | Hisamatsu |
| 2008/0254575 A1 | 10/2008 | Fuergut et al. |
| 2008/0261107 A1 | 10/2008 | Snyder et al. |
| 2008/0263855 A1 | 10/2008 | Li et al. |
| 2008/0286651 A1 | 11/2008 | Neudecker et al. |
| 2009/0092903 A1 | 4/2009 | Johnson et al. |
| 2009/0124201 A1 | 5/2009 | Meskens |
| 2009/0181303 A1 | 7/2009 | Neudecker et al. |
| 2009/0302226 A1 | 12/2009 | Schieber et al. |
| 2009/0308936 A1 | 12/2009 | Nitzan et al. |
| 2009/0312069 A1 | 12/2009 | Peng et al. |
| 2010/0001079 A1 | 1/2010 | Martin et al. |
| 2010/0032001 A1 | 2/2010 | Brantner |

| | | |
|---|---|---|
| 2010/0086853 A1 | 4/2010 | Venkatachalam et al. |
| 2011/0267235 A1 | 11/2011 | Brommer et al. |
| 2011/0304430 A1 | 12/2011 | Brommer et al. |

FOREIGN PATENT DOCUMENTS

| | | |
|---|---|---|
| DE | 19824145 A1 | 12/1999 |
| DE | 10 2005 014 427 A1 | 9/2006 |
| DE | 10 2006 054 309 A1 | 11/2006 |
| DE | 10 2008 016 665 A1 | 10/2008 |
| DE | 102007030604 | 1/2009 |
| EP | 0 510 883 | 10/1992 |
| EP | 0 639 655 | 2/1995 |
| EP | 0 652 308 | 5/1995 |
| EP | 0 820 088 | 1/1998 |
| EP | 1 068 899 | 1/2001 |
| EP | 0 867 985 | 2/2001 |
| EP | 1 092 689 | 4/2001 |
| EP | 1 189 080 | 3/2002 |
| EP | 1 713 024 A1 | 10/2006 |
| FR | 2806198 A1 | 9/2001 |
| FR | 2 861 218 | 4/2005 |
| JP | 55009305 | 1/1980 |
| JP | 56-076060 | 6/1981 |
| JP | 56156675 | 12/1981 |
| JP | 60-068558 | 4/1985 |
| JP | 60068558 | 4/1985 |
| JP | 61-269072 | 11/1986 |
| JP | 62267944 | 11/1987 |
| JP | 63-290922 | 11/1988 |
| JP | 2000-162234 | 11/1988 |
| JP | 2-054764 | 2/1990 |
| JP | 2230662 | 9/1990 |
| JP | 03-036962 | 2/1991 |
| JP | 4058456 | 2/1992 |
| JP | 4072049 | 3/1992 |
| JP | 6-010127 | 1/1994 |
| JP | 6-100333 | 4/1994 |
| JP | 7-233469 | 5/1995 |
| JP | 7-224379 | 8/1995 |
| JP | 08-114408 | 5/1996 |
| JP | 09-259932 A | 10/1997 |
| JP | 10-026571 | 1/1998 |
| JP | 10-239187 | 9/1998 |
| JP | 11204088 | 7/1999 |
| JP | 11-251518 A | 9/1999 |
| JP | 2000114435 | 5/2000 |
| JP | 2000188099 | 7/2000 |
| JP | 2000268867 | 9/2000 |
| JP | 2001-171812 | 6/2001 |
| JP | 2001259494 | 9/2001 |
| JP | 2001297764 | 10/2001 |
| JP | 2001328198 | 11/2001 |
| JP | 2002-140776 | 5/2002 |
| JP | 2002-344115 | 11/2002 |
| JP | 2003-17040 | 1/2003 |
| JP | 2003-133420 A | 5/2003 |
| JP | 2003347045 | 12/2003 |
| JP | 2004071305 | 3/2004 |
| JP | 2004 146297 A | 5/2004 |
| JP | 2004149849 | 5/2004 |
| JP | 2004-158268 | 6/2004 |
| JP | 2004273436 | 9/2004 |
| JP | 2005-256101 | 9/2005 |
| JP | 2005-286011 A | 10/2005 |
| JP | 2002-026412 | 2/2007 |
| JP | 7-107752 | 4/2007 |
| KR | 20020007881 | 1/2002 |
| KR | 20020017790 | 3/2002 |
| KR | 20020029813 | 4/2002 |
| KR | 20020038917 | 5/2002 |
| KR | 20030033913 | 5/2003 |
| KR | 20030042288 | 5/2003 |
| KR | 20030085252 | 11/2003 |
| RU | 2241281 | 11/2004 |
| WO | WO 9513629 | 5/1995 |
| WO | WO 9623085 | 8/1996 |
| WO | WO 9623217 | 8/1996 |
| WO | WO 9727344 | 7/1997 |
| WO | WO 9735044 | 9/1997 |
| WO | WO 9847196 | 10/1998 |
| WO | WO 9943034 | 8/1999 |
| WO | WO 9957770 | 11/1999 |
| WO | WO 0021898 | 4/2000 |
| WO | WO 0022742 | 4/2000 |
| WO | WO 0028607 | 5/2000 |
| WO | WO 0036665 | 6/2000 |
| WO | WO 0060682 | 10/2000 |
| WO | WO 0060689 | 10/2000 |
| WO | WO 0062365 | 10/2000 |
| WO | WO 0101507 | 1/2001 |
| WO | WO 0117052 A2 | 3/2001 |
| WO | WO 0124303 | 4/2001 |
| WO | WO 0133651 A1 | 5/2001 |
| WO | WO 0139305 A1 | 5/2001 |
| WO | WO 0173864 A2 | 10/2001 |
| WO | WO 0173865 A2 | 10/2001 |
| WO | WO 0173866 A2 | 10/2001 |
| WO | WO 0173868 A2 | 10/2001 |
| WO | WO 0173870 A2 | 10/2001 |
| WO | WO 0173883 A2 | 10/2001 |
| WO | WO 0173957 A2 | 10/2001 |
| WO | WO 0182390 | 11/2001 |
| WO | 02 15301 A2 | 2/2002 |
| WO | WO 0212932 | 2/2002 |
| WO | WO 0242516 | 5/2002 |
| WO | WO 0247187 A1 | 6/2002 |
| WO | WO 02071506 | 9/2002 |
| WO | WO 02101857 | 12/2002 |
| WO | WO 03003485 | 1/2003 |
| WO | WO 03005477 | 1/2003 |
| WO | WO 03026039 | 3/2003 |
| WO | WO 03036670 | 5/2003 |
| WO | WO 03069714 | 8/2003 |
| WO | WO 03080325 | 10/2003 |
| WO | WO 03083166 | 10/2003 |
| WO | WO 2004012283 | 2/2004 |
| WO | WO 2004021532 | 3/2004 |
| WO | WO 2004061887 | 7/2004 |
| WO | WO 2004077519 | 9/2004 |
| WO | WO 2004086550 | 10/2004 |
| WO | WO 2004093223 | 10/2004 |
| WO | WO 2004106581 | 12/2004 |
| WO | WO 2004106582 | 12/2004 |
| WO | WO 2005008828 | 1/2005 |
| WO | WO 2005013394 | 2/2005 |
| WO | WO 2005038957 | 4/2005 |
| WO | WO 2005067645 | 7/2005 |
| WO | WO 2005085138 | 9/2005 |
| WO | WO 2005091405 | 9/2005 |
| WO | WO 2006063308 | 6/2006 |
| WO | WO 2006085307 | 8/2006 |
| WO | WO 2007016781 | 2/2007 |
| WO | WO-2007019855 A1 | 2/2007 |
| WO | WO 2007027535 | 3/2007 |
| WO | WO 2007095604 A2 | 8/2007 |
| WO | WO 2008036731 A2 | 3/2008 |

OTHER PUBLICATIONS

Abrahams, I., "$Li_6Zr_2O_7$, a new anion vacancy ccp based structure, determined by ab initio powder diffraction methods," 104 J. Solid State Chem. 397-403 (1993).

Amatucci, G. et al., "Lithium scandium phosphate-based electrolytes for solid state lithium rechargeable microbatteries," 60 Solid State Ionics 357-65 (1993).

Appetecchi, G.B. et al., "Composite polymer electrolytes with improved lithium metal electrode interfacial properties," 145(12) J. Electrochem. Soc. 4126-32 (1998).

Bates, J.B. et al., "Electrical properties of amorphous lithium electrolyte thin films," 53-56 Solid State Ionics 647-54 (1992).

Delmas, C. et al., "Des conducteurs ioniques pseudo-bidimensionnels $Li_8MO_6$(M= Zr, Sn), $Li_7LO_6$(L= Nb, Ta) et $Li_6In_2O_6$," 14 Mat. Res. Bull. 619-25 (1979).

Hu, Y-W. et al., "Ionic conductivity of lithium phosphate-doped lithium orthosilicate," 11 Mat. Res. Bull. 1227-30 (1976).

Neudecker, B. et al., "$Li_9SiAlO_8$: a lithium ion electrolyte for voltages above 5.4 V," 143(7) J. Electrochem. Soc. 2198-203 (1996).

Ohno, H. et al., "Electrical conductivity of a sintered pellet of octalithium zirconate," 132 J. Nucl. Mat. 222-30 (1985).
Scholder, V. et al., "Über Zirkonate, Hafnate und Thorate von Barium, Strontium, Lithium und Natrium," Zeitschrift für Anorganische und Allgemeine Chemie, Band 362, pp. 149-168 (1968).
Yu, X. et al., "A stable thin-film lithium electrolyte: lithium phosphorus oxynitride," 144(2) J. Electrochem. Soc. 524-532 (1997).
Hwang et al., "Characterization of Sputter-Deposited $LiMn_2O_4$ Thin Films for Rechargeable Microbatteries," 141(12) J. Electrochem. Soc. 3296-99 (1994).
Jones et al., 53-56 Solid State Ionics 628 (1992).
Mattox "Handbook of Physical Vapor Deposition (PVD) Processing, Society of Vacuum Coaters," Albuquerque, New Mexico 660f and 692ff, Noyes Publications (1998).
Affinito, J.D. et al., "PML/oxide/PML barrier layer performance differences arising from use of UV or electron beam polymerization of the PML layers," Thin Solid Films 308-309: 19-25 (1997).
Affinito, J.D. et al., "Polymer-oxide transparent barrier layers," Society of Vacuum Coaters, 39th Ann. Technical Conference Proceedings, May 5-10, 1996, Philadelphia, PA, pp. 392-397 (1996).
Alder, T. et al., "High-efficiency fiber-to-chip coupling using low-loss tapered single-mode fiber," IEEE Photonics Tech. Left. 12(8): 1016-1018 (2000).
Almeida, V.R. et al., "Nanotaper for compact mode conversion," Optics Letters 28(15): 1302-1304 (2003).
Anh et al., "Significant Suppression of Leakage Current in $(Ba,Sr)TiO_3$ Thin Films by Ni or Mn Doping," J. Appl. Phys.,92(5): 2651-2654 (Sep. 2002).
Asghari, M. And Dawnay, E., "ASOC™—a manufacturing integrated optics technology," SPIE 3620: 252-262 (Jan. 1999).
Barbier, D. et al., "Amplifying four-wavelength combiner, based on erbium/ytterbium doped waveguide amplifiers and integrated splitters," IEEE Photonics Tech. Lett. 9:315-317 (1997).
Barbier, D., "Performances and potential applications of erbium doped planar waveguide amplifiers and lasers," Proc. OAA, Victoria, BC, Canada, pp. 58-63 (Jul. 21-23, 1997).
Beach R.J., "Theory and optimization of lens ducts," Applied Optics 35(12): 2005-2015 (1996).
Belkind, A. et al., "Pulsed-DC Reactive Sputtering of Dielectrics: Pulsing Parameter Effects," 43rd Annual Technical Conference Proceedings (2000).
Belkind, A. et al., "Using pulsed direct current power for reactive sputtering of $Al_2O_3$," J. Vac. Sci. Technol. A 17(4): 1934-1940 (1999).
Bestwick, T., "ASOC™ silicon integrated optics technology," SPIE 3631: 182-190 (1999).
Borsella, E. et al., "Structural incorporation of silver in soda-lime glass by the ion-exchange process: a photoluminescence spectroscopy study," Applied Physics A 71: 125-132 (2000).
Byer, R.L., "Nonlinear optics and solid-state lasers: 2000," IEEE J. Selected Topics in Quantum Electronics 6(6): 911-930 (2000).
Campbell, S.A. et al., "Titanium dioxide (TiO2)-based gate insulators," IBM J. Res. Develop. 43(3): 383-392 (1999).
Chang, C.Y. and Sze, S.M. (eds.), in ULSI Technology, The McGraw-Hill Companies, Inc., Nyew York, Chapter 4, pp. 169-170 and 226-231 (1996).
Chen, G. et al., "Development of supported bifunctional electrocatalysts for unitized regenerative fuel cells," J. Electrochemical Society 149(8): A1092-A1099 (2002).
Choi, Y.B. et al., "Er-Al-codoped silicate planar light waveguide-type amplifier fabricated by radio-frequency sputtering," Optics Letters 25(4): 263-265 (2000).
Choy et al., "Eu-Doped Y2O3 Phosphor Films Produced by Electrostatic-Assisted Chemical Vapor Deposition," J. Mater. Res. 14(7): 3111-3114 (Jul. 1999).
Cocorullo, G. et al., "Amorphous silicon waveguides and light modulators for integrated photonics realized by low-temperature plasma-enhanced chemical-vapor deposition," Optics Lett. 21(24): 2002-2004 (1996).
Cooksey, K. et al., "Predicting permeability & Transmission rate for multilayer materials," Food Technology 53(9): 60-63 (1999).

Crowder, M.A. et al., "Low-temperature single-crystal Si TFT's fabricated on Si films processed via sequential lateral solidification," IEEE Electron Device Lett. 19(8): 306-308 (1998).
Delavaux, J-M. et al., "Integrated optics erbium ytterbium amplifier system in 10Gb/s fiber transmission experiment," 22nd European Conference on Optical Communication, Osla, I.123-I.126 (1996).
Distributed Energy Resources: Fuel Cells, Projects, 4 pages. http://www.eere.energy.govider/fuel_cells/projects.html (2003).
Dorey, R.A., "Low temperature micromoulding of functional ceramic devices," Grant summary for GR/S84156/01 for the UK Engineering and Physical Sciences Research Council, 2 pages (2004).
DuPont Teijin Films, Mylar 200 SBL 300, Product Information, 4 pages (2000).
Electrometals Technologies Limited, Financial Report for 2002, Corporate Directory, Chairman's review, Review of Operations, 10 pages (2002).
E-Tek website: FAQ, Inside E-Tek, E-TEk News, Products; http://www.etek-inc.com/, 10 pages (2003).
Flytzanis, C. et al., "Nonlinear optics in composite materials," in Progress in Optics XXIX, Elsevier Science Publishers B.V., pp. 323-425 (1991).
Frazao, O. et al., "EDFA gain flattening using long-period fibre gratings based on the electric arc technique," Proc. London Comm. Symp. 2001, London, England, 3 pages (2001).
Fujii, M. et al., "1.54 μm photoluminescence of $Er^{3+}$doped into $SiO_2$ films containing Si nanocrystals: evidence for energy transfer from Si nanocrystals for $Er^{3+}$," Appl. Phys. Lett. 71(9): 1198-1200 (1997).
Garcia, C. et al., "Size dependence of lifetime and absorption cross section of Si nanocrystals embedded in $SiO_2$," Appl. Phys. Lett. 82(10): 1595-1597 (2003).
Goossens, A. et al., "Sensitization of $TiO_2$ with p-type semiconductor polymers," Chem. Phys. Lett. 287: 148 (1998).
Greene, J.E. et al., "Morphological and electrical properties of rf sputtered $Y_2O_3$-doped $ZrO_2$ thin films," J. Vac. Sci. Tech. 13(1): 72-75 (1976).
Han, H.-S. et al., "Optical gain at 1.54 μm in Erbium-doped Silicon nanocluster sensitized waveguide," Appl. Phys. Left. 79(27): 4568-4570 (2001).
Hayakawa, T. et al., "Enhanced fluorescence from $Eu^{3+}$owing to surface plasma oscillation of silver particles in glass," J. Non-Crystalline Solids 259: 16-22 (1999).
Hayakawa, T. et al., "Field enhancement effect of small Ag particles on the fluorescence from $Eu^{3+}$-doped $SiO_2$ glass," Appl. Phys. Lett. 74(11): 1513-1515 (1999).
Hayfield, P.C.S., I Development of a New Material-Monolithic $Ti_9O_7$ Ebonixe4 Ceramic, Royal Society of Chemistry, Cambridge, Table of Contents, 4 pages (2002).
Hehlen, M.P. et al., "Spectroscopic properties of $Er^{3+}$- and $Yb^{3+}$-doped soda-lime silicate and aluminosilicate glasses," Physical Review B 56(15): 9302-9318 (1997).
Hehlen, M.P. et al., "Uniform upconversion in high-concentration $Er^{3+}$-doped soda lime silicate and aluminosilicate glasses," Optics Letters 22(11); 772-774 (1997).
Horst, F. et al., "Compact, tunable optical devices in silicon-oxynitride waveguide technology," Top. Meeting Integrated Photonics Res. '00, Quebec, Canada, p. IThF1, 3 pages (2000).
Howson, R.P., "The reactive sputtering of oxides and nitrides," Pure & Appl. Chem. 66(6): 1311-1318 (1994).
Hubner, J. and Guldberg-Kjaer, S., "Planar Er- and Yb-doped amplifiers and lasers," COM Technical University of Denmark, 10th European Conf. on Integrated Optics, Session WeB2, pp. 71-74 (2001).
Hwang et al., "Characterization of sputter-deposited LiMn2O4 thin films for rechargeable microbatteries," 141(12) J. Electrochem. Soc. 3296-99 (1994).
Hwang, M-S. et al., "The effect of pulsed magnetron sputtering on the properties of iridium tin oxide thin films," Surface and Coatings Tech. 171: 29-33 (2003).
Im, J.S. and Sposili, R.S., "Crystalline Si films for integrated active-matrix liquid crystal displays," MRS Bulletin, pp. 39-48 (1996).
Im, J.S. et al., "Controlled super-lateral growth of Si-films for microstructural manipulation and optimization," Physica Status Solidi (A) 166(2): 603-617 (1998).

Im, J.S. et al., "Single-crystal Si films for thin-film transistor devices," Appl. Physics Lett. 70(25): 3434-3436 (1997).

Itob, M. et al., "Large reduction of singlemode-fibre coupling loss in 1.5% Δplanar lightwave circuits using spot-size converters," Electronics Letters 38(2): 72-74 (2002).

Jackson, M.K. And Movassaghi, M., "An accurate compact EFA model," Eur. Conf. Optical Comm., Munich, Germany, 2 pages (2000).

Janssen, R. et al., "Photoinduced electron transfer from conjugated polymers onto nanocrystalline $TiO_2$," Synthet. Metal., 1 page (1999).

Johnson, J.E. et al., "Monolithically integrated semiconductor optical amplifier and electroabsorption modulator with dual-waveguide spot-size converter input," IEEE J. Selected topics in Quantum Electronics 6(1): 19-25 (2000).

Jonsson, L.B. et al., "Frequency response in pulsed DC reactive sputtering processes," Thin Solid Films 365: 43-48 (2000).

Kato, K. and Inoue, Y., "Recent progress on PLC hybrid integration," SPIE 3631: 28-36 (1999).

Kato, K. and Tohmori, Y., "PLC hybrid integration technology and its application to photonic components," IEEE J. Selected Topics in Quantum Electronics 6(1): 4-13 (2000).

Kelly, P.J. and Arnell, R.D., "Control of the structure and properties of aluminum oxide coatings deposited by pulsed magnetron sputtering," J. Vac. Sci. Technol. A 17(3): 945-953 (1999).

Kelly, P.J. et al., "A novel technique for the deposition of aluminum-doped zinc oxide films," Thin Solid Films 426(1-2): 111-116 (2003).

Kelly, P.J. et al., "Reactive pulsed magnetron sputtering process for alumina films," J. Vac. Sci. Technol. A 18(6): 2890-2896 (2000).

Kik, P.G. and Polman, A., "Gain limiting processes in Er-doped Si nanocrystal waveguides in $SiO_2$," J. Appl. Phys. 91(1): 536-536 (2002).

Kim et al., "Correlation Between the Microstructures and the Cycling Performance of $RuO_2$ Electrodes for Thin-Film Microsupercapacitros," J. Vac. Sci. Technol. B20(5): 1827-1832 (Sep. 2002).

Kim, D-W. et al. "Mixture Behavior and Microwave Dielectric Properties in the Low-fired $TiO_2$-CuO System," Jpn. J. Appl. Phys. 39:2696-2700 (2000).

Kim, H-K. et al., "Characteristics of rapid-thermal-annealed LiCoO2 cathode film for an all-solid-state thin film microbattery," J. Vac. Sci. Technol. A 22(4): 1182-1187 (2004).

Kim, J-Y. et al. "Frequency-dependent pulsed direct current magnetron sputtering of titanium oxide films," J. Vac. Sci. Technol. A 19(2):429-434 (2001).

Ladouceur, F. and Love, J.D., in: Silica-based Buried Channel Waveguides and Devices, Chapman & Hall, London, Table of Contents, 6 pages (1996).

Ladouceur, F. et al., "Effect of side wall roughness in buried channel waveguides," IEEE Proc. Optoelectron. 141(4):242-248 (1994).

Lamb, W. and Zeiler, R., Designing Non-Foil Containing Skins for Vacuum Insulation Panel (VIP) Application, Vuoto XXVIII(1-2):55-58 (1999).

Lamb, W.B., "Designing Nonfoil Containing Skins for VIP Applications," DuPont VIA Symposium Presentation, 35 pages (1999).

Lange, M.R. et al, "High Gain Ultra-Short Length Phosphate glass Erbium-Doped Fiber Amplifier Material," OSA Optical Fiber Communications (OFC), 3 pages (2002).

Laporta, P. et al, "Diode-pumped cw bulk Er:Yb: glass laser," Optics Letters 16(24):1952-1954 (1991).

Laurent-Lund, C. et al., "PECVD Grown Multiple Core Planar Waveguides with Extremely Low Interface Reflections and Losses," IEEE Photonics Tech. Lett. 10(10):1431-1433 (1998).

Lee, B.H. et al., "Effects of interfacial layer growth on the electrical characteristics of thin titanium oxide films on silion," Appl. Phys. Lett. 74(21):3143-3145 (1999).

Lee, K.K. et al., "Effect of size and roughness on light transmission in a $Si/SiO_2$ waveguide: Experiments and model," Appl. Phys. Lett. 77(11):1617-1619 (2000).

Love, J.D. et al., "Quantifying Loss Minimisation in Single-Mode Fibre Tapers," Electronics Letters 22(17):912-914 (1986).

Mardare, D. and Rusu, G.I., "On the structure of Titanium Oxide Thin Films," Andalele Stiintifice Ale Universitatii IASI, Romania, pp. 201-208 (1999).

Marques, P.V.S. et al., "Planar Silica-on-Silicon Waveguide Lasers Based in Two Layers Core Devices," 10th European Conference on Integrated Optics, Session WeB2, pp. 79-82 (2001).

Meijerink, A. et al, "Luminescence of $Ag^+$, in Crystalline and Glassy $Srb_4O_7$," J. Physics Chem. Solids 54(8):901-906 (1993).

Mesnaoui, M. et al, "Spectroscopic properties of Ag, ions in phosphate glasses of $NaPO_3$—$AgPO_3$ system," Eur. J. Solid State Inorg. Chem. 29:1001-1013 (1992).

Mitomi, O. et al., "Design of a Single-Mode Tapered Waveguide for Low-Loss Chip-to-Fiber Coupling," IEEE J. Quantum Electronics 30(8): 1787-1793 (1994).

Mizuno, Y. et al "Temperature dependence of oxide decomposition on titanium surfaces in UHV," J. Vac. Sci & Tech. A. 20(5): 1716-1721 (2002).

Ohkubo, H. et al., Polarization-Insensitive Arrayed-Waveguide Grating Using Pure $Si0_2$Cladding, Fifth Optoelectronics and Communication Conference (OECC 2000) Technical Digest, pp. 366-367 (2000).

Ohmi, S. et al., "Rare earth mental oxides for high-K fate insulator," VLSI Design 2004, 1 page (2004).

Ohtsuki, T., et al., "Gain Characteristics of high concentration $Er^{3+}$-doped phosphate glass waveguide," J. Appl. Phys. 78(6):3617-3621 (1995).

Ono, H. et al., "Design of a Low-loss Y-branch Optical Waveguide," Fifth Optoelectronic and Communications Conference (OECC 2000) Technical Digest, pp. 502-503 (2000).

Padmini, P. et al. "Realization of High Tunability Barium Strontium Titanate Thin Films by rf Megnetron Sputtering," Appl. Phys. Lett. 75(20):3186-3188 (1999).

Pan, T. et al., "Planar Er [3+]-doped aluminosilicate waveguide amplifier with more than 10 dB gain across C-band, " Optical Society of America, 3 pages (2000).

Park et al., "Characteristics of Pt Thin Film on the Conducting Ceramics TiO and Ebonex ($Ti_4O_7$) as Electrode Materials," Thin Solid Films 258: 5-9 (1995).

Peters, D.P. et al., "Formation mechanism of silver nanocrystals made by ion irradiation of $Na^+$—$Ag^+$ion-exchanged sodalime silicate glass," Nuclear Instruments and Methods in Physics Research B 168:237-244 (2000).

Rajarajan, M. et al., "Numerical Study of Spot-Size Expanders fro an Efficient OEIC to SMF Coupling," IEEE Photonics Technology Letters 10(8): 1082-1084 (1998).

Ramaswamy, R.V. et al., "Ion-Exchange Glass Waveguides: A Review," J. Lightwave Technology 6(6): 984-1002 (1988).

Roberts, S.W. et al., "The Photoluminescence of Erbium-doped Silicon Monoxide," University of Southampton , Department of Electronics and Computer Science Research Journal, 7 pages (1996).

Saha et al., "Large Reduction of Leakage Current by Graded-Layer La Doping in (Ba0.5,Sr0.5)TiO3 Thin Films," Appl. Phys. Lett. 79(1): 111-113 (Jul. 2001).

Sanyo Vacuum Industries Co., Ltd. Products Infor, $TiO_2$, (2003), 1 page, http://www.sanyovac.co.jp/Englishweb/products?ETiO2.htm.

Schermer, R. et al., "Investigation of Mesa Dielectric Waveguides," Proceedings of the OSA Integrated Photonics Research Topical Meeting and Exhibit, Paper No. IWB3, 3 pages (2001).

Schiller, S. et al., "PVD Coating of Plastic Webs and Sheets with High Rates on Large Areas," European Materials Research Society 1999 Spring Meeting, Jun. 1-4, 1999, Strasbourg, France, 13 pages (1999).

Scholl, R., "Power Supplies for Pulsed Plasma Technologies: State-of-the-Art and Outlook," Advances Energy Industries, Inc. 1-8 (1999).

Scholl, R., "Power Systems for Reactive Sputtering of Insulating Films," Advances Energy Industries, Inc., 1-8 (Aug. 2001).

Second International Symposium of Polymer Surface Modification: Relevance to Adhesion, Preliminary Program, 13 pages (1999).

Seventh International Conference on $TiO_2$ Photocatalysis: Fundamentals & Applications, Toronto, Ontario, Canada, Final Program, 7 pages (Nov. 17-21, 2002).

Sewell, P. et al., "Rib Waveguide Spot-Size Transformers: Modal Properties," J Lightwave Technology 17(5):848-856 (1999).

Shaw, D.G. et al., "Use of Vapor Deposited Acrylate Coatings to Improve the Barrier Properties of Metallized Film," Society of Vacuum Coaters, 37th Annual Technical Conference Proceedings, pp. 240-244 (1994).

Shin, J.C. et al. "Dielectric and Electrical Properties of Sputter Grown (Ba,Se)TiO$_3$ Thin Films," J. Appl. Phys. 86(1):506-513 (1999).

Shmulovich, J. et al., "Recent progress in Erbium-doped waveguide amplifiers," Bell Laboratories, pp. 35-37 (1999).

Slooff, L.H. et al., "Optical properties of Erbium-doped organic polydentate cage complexes," J. Appl. Phys. 83(1):497-503 (1998).

Smith, R.E. et al., "Reduced Coupling Loss Using a Tapered-Rib Adiabatic-Following Fiber Coupler," IEEE Photonics Technology Lett. 8(8):1052-1054 (1996).

Snoeks, E. et al., "Cooperative upconversion in erbium-implanted soda-lime silicate glass optical waveguides," J. Opt. Soc. Am. B 12(8): 1468-1474 (1995).

Strohhofer, C. and Polman, A. "Energy transfer to $Er^{3+}$ in Ag ion-exchanged glass," FOM Institute for Atomic and Molecular Physics, 10 pages (2001).

Sugiyama, A. et al., "Gas Permeation Through the Pinholes of Plastic Film Laminated with Aluminum Foil," Vuoto XXVIII(1-2):51-54 (1999).

Tervonen, A. "Challenges and opportunities for integrated optics in optical networks," SPIE 3620:2-11 (1999).

Ting, C.Y. et al., "Study of planarized sputter-deposited $SiO_2$," J. Vac. Sci Technol, 15(3):1105-1112 (1978).

Tomaszewski, H. et al., "Yttria-stabilized zirconia thin films grown by reactive r.f. magnetron sputtering," Thin Solid Films 287: 104-109 (1996).

Triechel, O. and Kirchhoff, V., "The influences of pulsed magnetron sputtering on topography and crystallinity of $TiO_2$ films on glass," Surface and Coating Technology 123:268-272 (2000).

Tukamoto, H. and West, A.R., "Electronic Conductivity of $LiCoO_s$ and Its Enhancement by Magnesium Doping," J. Electrochem. Soc 144(9):3164-3168 (1997).

Van Dover, R.B., "Amorphous Lanthanide-Doped $TiO_x$ Dielectric Films," Appl. Phys. Left. 74(20):3041-3043 (1999).

Viljanen, J. and Leppihalme, M., "Planner Optical Coupling Elements for Multimode Fibers with Two-Step Ion Migration Process," Applied Physics 24(1):61-63 (1981).

Villegas, M.A. et al., "Optical spectroscopy of a soda lime glass exchanged with silver," Phys. Chem. Glasses 37(6):248-253 (1996).

Von Rottkay, K. et al., "Influences of stoichiometry on electrochromic cerium-titanium oxide compounds," Presented at the 11th Int'l Conference of Solid State Ionics, Honolulu, Hawaii, Nov. 19, 1997, Published in Solid State Ionics 113-115:425-430. (1998).

Westlinder, J. et al., "Simulations and Dielectric Characterization of Reactive dc Magnetron Cosputtered $(Ta_2O_5)_{1-x}(TiO_2)_x$ Thin Films," J Vac. Sci. Technol. B 20(3):855-861 (May/Jun. 2002).

Wilkes, K.E., "Gas Permeation Through Vacuum Barrier Films and its Effect on VIP Thermal Performance," presented at the Vacuum Insulation Panel Symp., Baltimore, Maryland, 21 pages (May 3, 1999).

Yanagawa, H. et al., "Index-and-Dimensional Taper and Its Application to Photonic Devices," J. Lightwave Technology 10(5):587-591 (1992).

Yoshikawa, K. et al., "Spray formed aluminum alloys for sputtering targets," Powder Metallurgy 43(3): 198-199 (2000).

Zhang, H. et al., "High Dielectric Strength, High k $TiO_2$ Films by Pulsed DC, Reactive Sputter Deposition," 5 pages (2001).

Sarro, P., "Silicon Carbide as a New MEMS Technology," Sensors and Actuators 82, 210-218 (2000).

Bates et al., "Thin-Film Lithium Batteries," in New Trends in Electrochemical Technology: Energy Storage Systems for Electronics (T. Osaka & M. Datta eds. Gordon and Breach 2000).

Wang et al., "Characterization of Thin-Film Rechargeable Lithium Batteries with Lithium Cobalt Oxide Cathodes," 143 J. Electrochem. Soc. 3203-13 (1996).

Dobkin, D.M., "Silicon Dioxide: Properties and Applications".

Restriction Requirement dated Feb. 22, 2010, in U.S. Appl. No. 11/687,032.

Response to Restriction Requirement dated Mar. 26, 2010, in U.S. Appl. No. 11/687,032.

Non-Final Rejection dated Jul. 9, 2010, in U.S. Appl. No. 11/687,032.

Amendment/Response to Non-Final Office Action dated Oct. 11, 2010, in U.S. Appl. No. 11/687,032.

Non-Final Rejection dated Dec. 28, 2010, in U.S. Appl. No. 11/687,032.

Response to Office Action dated Apr. 5, 2011, in U.S. Appl. No. 11/687,032.

Non-Final Rejection dated May 13, 2011, in U.S. Appl. No. 12/764,180.

Notice of Allowance dated Jun. 24, 2011, in U.S. Appl. No. 11/687,032.

Examiner's Amendment dated Jul. 28, 2011, in U.S. Appl. No. 11/687,032.

Hill, R et al., "Large Area Deposition by Mid-Frequency AC Sputtering," Society of Vacuum Coaters, 41[St] Annual Tech. Conference Proceedings, 197-202 (1998).

Macak, Karol et al., "Ionized Sputter Deposition Using an Extremely High Plasma Density Pulsed Magnetron Discharge," J. Vac. Sci. Technol. A 18(4):1533-37 (2000).

Balanis, Constantine A., "Antenna Theory: Analysis and Design," 3rd Ed., pp. 817-820 (John Wiley & Sons, Inc. Publication, 2005).

Inaguma, Yoshiyuki, "High Ionic Conductivity in Lithium Lanthanum Titanate," Solid State Communications, vol. 86, No. 10, pp. 689-693 (1993).

Guy, D., "Novel Architecture of Composite Electrode for Optimization of Lithium Battery Performance," Journal of Power Sources 157, pp. 438-442 (2006).

Wolfenstine, J., "Electrical Conductivity and Charge Compensation in Ta Doped $Li_4Ti_5O_{12}$," Journal of Power Sources 180, pp. 582-585 (2008).

Balanis, Constantine A., "Antenna Theory: Analysis and Design," 3rd Ed., pp. 811-820 (2005).

Jones and Akridge, "A thin film solid state microbattery," Solid State Ionics 53-56 (1992), pp. 628-634.

Amendment/Response to Non-Final Office Action dated Aug. 12, 2011, in U.S. Appl. No. 12/764,180.

Notice of Allowance dated Oct. 24, 2011, in U.S. Appl. No. 11/687,032.

Final Office Action dated Nov. 8, 2011, in U.S. Appl. No. 12/764,180.

Applicant Initiated Interview Summary dated Dec. 6, 2011, in U.S. Appl. No. 12/764,180.

Amendment/Response to Final Office Action dated Jan. 6, 2012 in U.S. Appl. No. 12/764,180.

Advisory Action dated Jan. 19, 2012 in U.S. Appl. No. 12/764,180.

Adachi et al., Thermal and Electrical Properties of Zirconium Nitride, 2005, Journal of Alloys and Compounds, 399, pp. 242-244.

Pichon et al., Zirconium Nitrides Deposited by Dual Ion Beam Sputtering: Physical Properties and Growth Modelling, 1999, Applied Surface Science, 150, pp. 115-124.

Tarniowy et al., The effect of thermal treatment on the structure, optical and electrical properties of amorphous titanium nitride thin films, Thin Solid Films, vol. 311, (1997), pp. 93-100.

Starner, "Human-powered wearable computing" 35 (3 & 4) IBM Sys. J. 618-29 (1996).

Celgard products description. retrieved from http://celgard.com/pdf/library/Celgard_Product_Comparison_10002.pdf on Jun. 17, 2011.

* cited by examiner

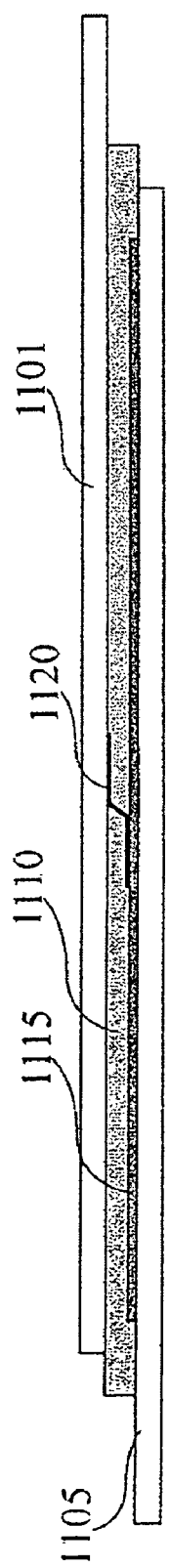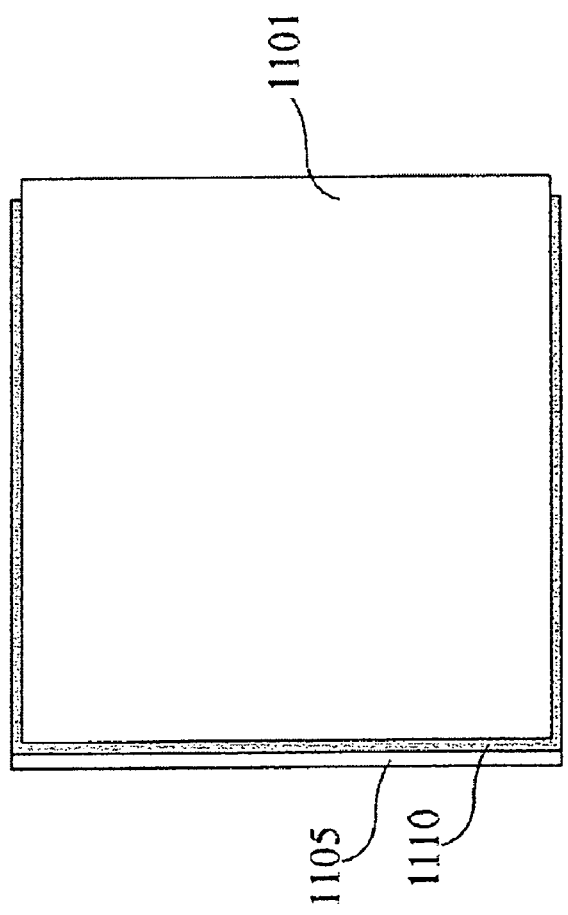
Figure 11A
Figure 11B

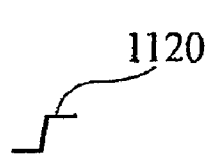
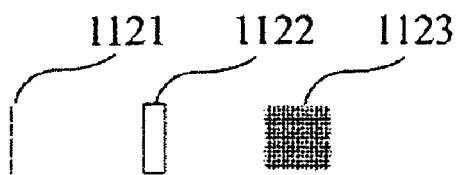
Figure 12A  Figure 12B
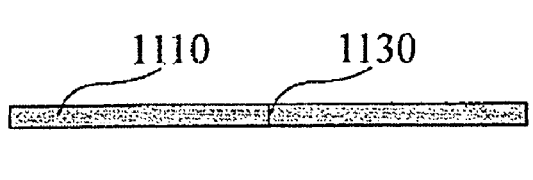
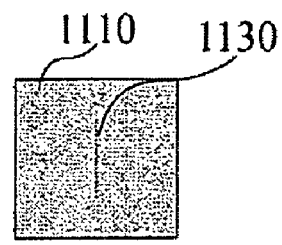
Figure 13A  Figure 13B
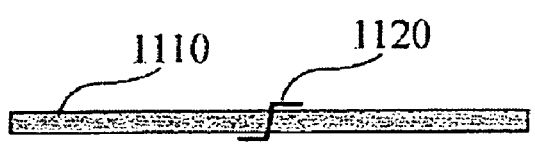
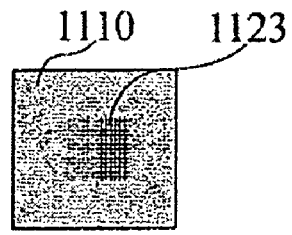
Figure 14A  Figure 14B
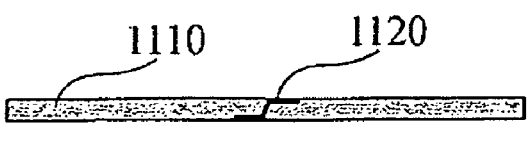
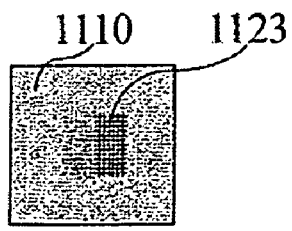
Figure 15A  Figure 15B

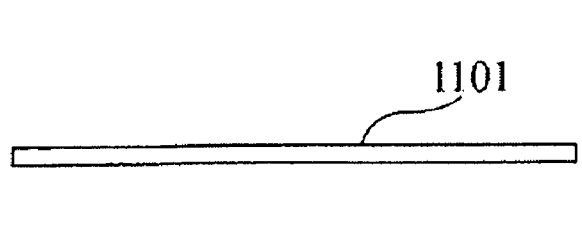 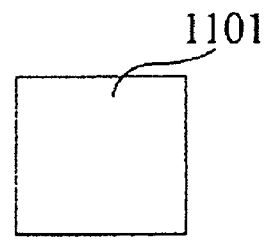
Figure 16A  Figure 16B
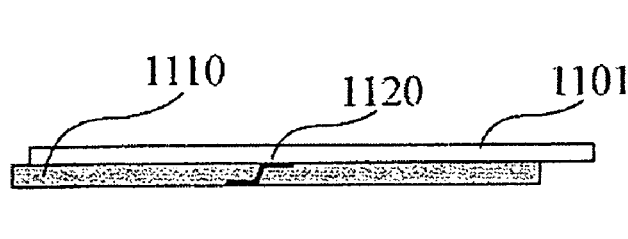 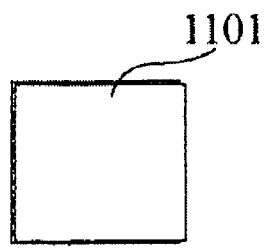
Figure 17A  Figure 17B
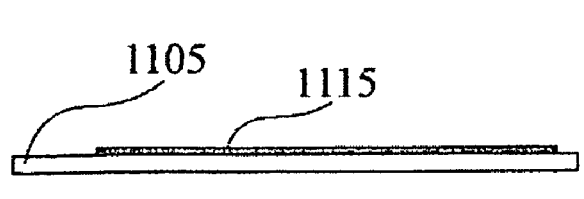 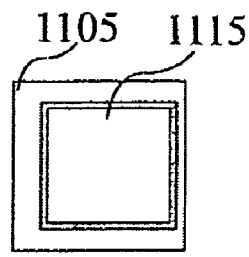
Figure 18A  Figure 18B
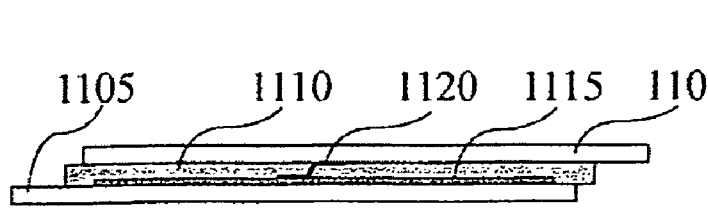 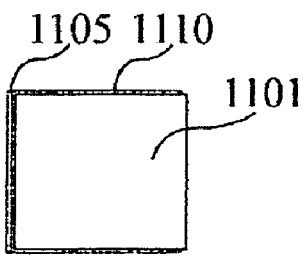
Figure 19A  Figure 19B

ROBUST METAL FILM ENCAPSULATION

RELATED APPLICATIONS

The present application is related to U.S. patent application Ser. No. 11/687,032, filed Mar. 16, 2007, which claims the benefit under 35 U.S.C. §119 of U.S. Patent Application Ser. No. 60/782,792, filed Mar. 16, 2006; and is related to U.S. patent application Ser. No. 11/561,277, filed Nov. 17, 2006, which claims the benefit under 35 U.S.C. §119 of U.S. Patent Application Ser. No. 60/737,613, filed Nov. 17, 2005, U.S. Patent Application Ser. No. 60/759,479 filed Jan. 17, 2006, and U.S. Patent Application Ser. No. 60/782,792, filed Mar. 16, 2006; and is related to U.S. patent application Ser. No. 11/209,536, filed Aug. 23, 2005; which is a continuation, and claims the benefit under 35 U.S.C. §120, of U.S. patent application Ser. No. 11/374,282, converted from U.S. provisional application Ser. No. 60/690,697, and filed Jun. 15, 2005; which is a continuation-in-part, and claims the benefit under 35 U.S.C. §120, of U.S. patent application Ser. No. 10/215, 190, filed Aug. 9, 2002, now U.S. Pat. No. 6,916,679, issued Jul. 12, 2005; all of which are incorporated herein by reference in their entirety.

FIELD OF THE INVENTION

The field of this invention includes the device, composition, method of depositing fabrication, and more specifically encapsulation of solid-state, thin-film, secondary and primary electrochemical devices, including batteries.

BACKGROUND OF THE INVENTION

Typical electrochemical devices comprise multiple electrically active layers such as an anode, cathode, electrolyte, substrate, current collectors, etc. Some layers, such as, for example, an anode layer comprising Lithium, are comprised of materials that are very environmentally sensitive. Such batteries require an encapsulation to protect such environmentally sensitive material. Some schemes used to encapsulate the sensitive layers of electrochemical devices, such encapsulation with gold foil, are expensive. Other schemes encapsulate the device with pouch, for example, made of metal and plastic, that seals around the perimeter of the device. As the temperature changes the residual gas atmosphere within the metal and plastic pouch expands and/or contracts. This expansion and/or contraction may blow out the seals of the metal and plastic pouch or create other problems, thus eliminating the encapsulating benefits of the pouch.

Typical electrochemical devices also have tabs that extend out from the substrate. These tabs provide electrically conductive contact points for the battery. These tabs can be fragile and can break when gripped or secured from the outside and create difficulties when trying to design the encapsulation to maintain a proper seal around the tabs.

Solid-state, thin-film, secondary and primary electrochemical devices, including batteries, have very small thickness dimensions, which may put their electrically conductive contact points, the terminals, in very close layered proximity by a dimension that is mainly defined by the thickness of the seal material. Any physical impact on such a device can entail the risk of bringing these two terminals into contact, which would accidentally electrically short out the device.

Thus, there is a need in the art to provide for better and more robust encapsulating approaches and better approaches to providing electrically conductive contacts, including encapsulation that is substantially thinner than known encapsulation methods while being more about robust against physical impact.

SUMMARY OF THE INVENTION

One exemplary embodiment of the present invention includes a battery with a first electrical contact; a bonding layer coupled with the first electrical contact and having an embedded conductor; at least one cell structure; and a second electrical contact, wherein the bonding layer and the at least one cell structure are sandwiched between the first and second contact layers. The bonding layer may be selectively conductive through the embedded conductor. The cell structure may further be in selective electrical contact with the first electrical contact via the embedded conductor.

The first electrical contact may, for example, include an encapsulate metal. The second electrical contact may, for example include a substrate. The bonding layer may be an adhesive material, an insulating material, a plastic, glass, and/or fiberglass. The conductor may be a tab, a wire, multiple wires, a wire mesh, perforated metal, a metal coating applied to the adhesive layer, or a disk. The conductor may be woven within the bonding layer and the bonding layer may include a slit within which the embedded conductor is woven. The bonding layer may be an adhesive material containing one or more conductive portions that may be, for example, conductive powders, bodies or particles applied to one or more selected areas. The first and second contacts may be made from a conductive material such as, for example, gold, platinum, stainless steel, titanium, zirconium, cobalt, aluminum, indium, nickel, copper, silver, carbon, bronze, brass, beryllium, and/or oxides, nitrides, and alloys thereof. An insulating layer on the first and/or second contact may also be included. The insulating layer may be, for example, a plastic. The cell structure may include an anode, an electrolyte; a cathode, and a barrier layer. The cathode may, for example, not be annealed or annealed using rapid thermal anneal methods.

Another exemplary embodiment of the present invention includes method of manufacturing a thin film battery having, in no particular order, the steps of creating a selectively conductive bonding layer; coupling the bonding layer with a first contact layer; coupling a first side of a cell structure with a second contact layer; and coupling a second side of the cell structure with the bonding layer. Alternate steps may include creating a cell structure with an anode, cathode, and electrolyte layers; embedding a conductor within the bonding layer; weaving at least one conductive wire through the bonding layer wherein selective portions of the conductive wire are exposed; heating the bonding layer and compressing the conductor within the bonding layer; and insulating the battery with an insulating material. A reinforcement layer including KEVLAR®, fiberglass, plastic, glass or other insulating material may also be embedded within the bonding layer. This reinforcement layer is selectively conductive.

Another exemplary embodiment of the present invention is a device having an electrochemical device with at least one notch; and a metal foil. The metal foil may encapsulate the electrochemical device and a portion of the metal foil extends over the notch providing an electrical contact tab on the metal foil over the notched portion of the electrochemical device. The contact area may also have a hole. The metal foil may have one or more openings. The device may also have a second electrochemical device with a metal foil encapsulating both electrochemical devices. Furthermore, there may be a number of electrochemical devices with metal foils there between. The metal foil encapsulates or lies over the electrochemical device.

The metal foil may further include a cathode element of the electrochemical device. The electrochemical device may have a substrate and the metal foil may also be conductively attached to the substrate.

In any of these exemplary embodiments the metal foil, for example, may be made of stainless steel or any other metallic substance having the necessary characteristics and properties such as a requisite amount of conductivity. The device may, for example, also include an insulating layer. Furthermore, the metal foil may, for example, be less than 100 microns thick, less than 50 microns thick, or less than 25 microns thick.

Another exemplary embodiment of the present invention includes a method of manufacturing an electrochemical device comprising the steps of providing an electrochemical device the may include the steps of providing a substrate; and providing a notch in the electrochemical device. This exemplary embodiment may also, for example, include the step of encapsulating the substrate with a metal foil. In this embodiment, for example, the metal foil extends over the area notched in the step providing a notch and is conductively bonded to the substrate. This embodiment may also further include the step of fabricating a cathode on the substrate by rapid thermal anneal. Also, this exemplary embodiment may include the steps of providing a cathode, anode, electrolyte, current collector, barrier layer, an insulating material on the metal foil, and/or a second electrochemical device wherein the second electrochemical device is encapsulated by the metal foil. This exemplary embodiment may also include the step of providing openings in the metal foil. These openings may be prefabricated in the metal foil.

Another exemplary embodiment of the present invention includes a battery with a first electrical contact, a bonding layer coupled with the first electrical contact and having an embedded conductor; at least one cell structure; and a second electrical contact, wherein the bonding layer and die at least one cell structure are sandwiched between the first and second contact layers. The bonding layer may be selectively conductive through the embedded conductor. The cell structure may further be in selective electrical contact with the first electrical contact via the embedded conductor.

The conductor may comprise elements such as Li, B, graphitic carbon, Al, Si, Sc, Ti, V, Cr, Mn, Fe, Co, Ni, Cu, Y, Zr, Nb, Mo, Ru, Rh, Pd, Ag, In, Sn, Hf, Ta, W, Re, Os, Ir, Pt, Au, Pb, any alloy thereof, and stainless steel. The conductor may also be covered with an electrically insulating film or a mechanically robust film. The insulating film may comprise, for example, Lipon, BeO, $B_2O_3$, BN, borate glass, $Al_2O_3$, AlN, $SiO_2$, $Si_3N_4$, silicate glass, $ScO_x$, $TiO_x$, $VO_x$, $CrO_x$, $FeO_x$, $YO_x$, $ZrO_x$, $NbO_x$, $MoO_x$, $HfO_x$, $TaO_x$, $WO_x$, polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, and any combination thereof. The mechanically robust film may comprise, for example, Lipon, borides, carbides, nitrides, oxides, polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, and any combination thereof.

The first electrical contact may itself be a conductor or an insulating layer. The insulating layer may be a ceramic comprising BeO, $B_2O_3$, BN, borate glass, $Al_2O_3$, AlN, $SiO_2$, $Si_3N_4$, silicate glass, $ScO_x$, $TiO_x$, $VO_x$, $CrO_x$, $FeO_x$, $YO_x$, $ZrO_x$, $NbO_x$, $MoO_x$, $HfO_x$, $TaO_x$, $WO_x$, and any combination thereof. Also, the insulating layer may be a polymer material comprising polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, and Tenite resins. The insulating layer may also be a composite material whose components may comprise any the materials mentioned above.

The bonding layer may comprise multiple layers (for example, two, three, four, or five layers) and each or multiple layers may comprise an adhesive material. Both the bonding layer and the adhesive material may comprise thermoplastic, thermally set, ethylene methacrylic acid (E/MAA) copolymer, ethylene methacrylic acid metallate (E/MAA) copolymer, cyano-acrylates, epoxies, fluoro-acrylates, polyimides containing ether linkages, urea-formaldehyde resins, vinyl chlorides, and low-density polyethylene (LDPE). The bonding may further comprise, for example, polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, oxide ceramic, nitride ceramic, carbide ceramic, silicate based glass, non-silicate based glass, fiberglass, and any combination thereof. The adhesive material may further comprise, for example, gold-coated polymer spheres, solder-type alloys, carbon, Ni, Cu, Au, Ag, and metallic powders.

Another exemplary embodiment of the present invention includes a battery with a first electrical contact; at least one cell structure; a bonding layer coupled with the first electrical contact; and a second electrical contact, wherein the first electrical contact is mechanically deformed to make electrical contact with the cell structure through the bonding layer, wherein the bonding layer and the cell structure are sandwiched between the first and second contact layers, and wherein the bonding layer may comprise multiple layers.

Another exemplary embodiment of the present invention includes a battery with at least one cell structure; an insulating layer comprising at least one layer; at least one embedded conductor inside the insulating layer wherein the conductor acts as a first electrical contact; and a second electrical contact, wherein the cell structure is sandwiched between the insulating layer and the second contact layer.

Another exemplary embodiment of the present invention includes a battery with more than one cell structures stacked onto each other; wherein each cell structure comprises a first electrical contact, a second electrical contact, and a bonding layer; wherein the bonding layer is sandwiched between the first electrical contact of a first cell structure and the second electrical contact of a neighboring cell structure and comprises more than one layer; wherein the first contact of said first cell structure further comprises at least one embedded conductor. The bonding layer in each cell structure may comprise thermoplastic, thermally set, ethylene ethylene methacrylic acid (E/MAA) copolymer, ethylene methacrylic acid inetallate (E/MAA) copolymer, cyano-acrylates, epoxies, fluoro-acrylates, polyimides containing ether linkages, urea-formaldehyde resins, vinyl chlorides, and low-density polyethylene (LDPE), polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, oxide ceramic, nitride ceramic, carbide ceramic, silicate glass, non-silicate based glass, fiberglass, and any combination thereof.

Another exemplary embodiment of the present invention includes a battery with at least one cell structure; an insulating layer comprising printed circuitry; at least one embedded conductor inside the insulating layer wherein the conductor acts as a first electrical contact; and a second electrical contact; wherein the insulting layer further comprises at least one layer; and wherein the cell structure is sandwiched between the insulating layer and the second electrical contact. An electrical connection may go over one edge of the insulating layer while creating an electrical contact to both the cell structure and the printed circuitry. The insulating layer may also comprise a ceramic or a polymer material.

BRIEF DESCRIPTION OF THE DRAWINGS

Some features and advantages of certain embodiments of the invention are described with reference to the drawings of certain preferred embodiments, which are intended to illustrate examples and not to limit the full scope of the invention.

The accompanying drawings, which are included to provide a further understanding of various embodiments of the invention are incorporated in and constitute a part of this specification, and illustrate exemplary embodiments of the invention that together with the description serve to explain certain principles of the invention. In the drawings:

FIG. 11A shows a side view electrochemical device with electrical contacts as an encapsulate and substrate according to an exemplary embodiment of the present invention.

FIG. 11B shows a top view electrochemical device with electrical contacts as an encapsulate and substrate according to an exemplary embodiment of the present invention.

FIG. 12A shows a side view of a stand alone conductor according to an exemplary embodiment of the present invention.

FIG. 12B shows top views of stand alone conductors according to an exemplary embodiment of the present invention.

FIG. 13A shows a side view of a bonding layer with a slit cut therein according to an exemplary embodiment of the present invention.

FIG. 13B shows a top view of a bonding layer with a slit cut therein according to an exemplary embodiment of the present invention.

FIG. 14A shows a side view of a conductor woven through a bonding layer according to an exemplary embodiment of the present invention.

FIG. 14B shows a top view of a mesh wire conductor woven through a bonding layer according to an exemplary embodiment of the present invention.

FIG. 15A shows a side view of a conductor embedded within a bonding layer according to an exemplary embodiment of the present invention.

FIG. 15B shows a top view of a mesh wire conductor embedded within a bonding layer according to an exemplary embodiment of the present invention.

FIG. 16A shows a side view of a first contact layer according to an exemplary embodiment of the present invention.

FIG. 16B shows a top view of a first contact layer according to an exemplary embodiment of the present invention.

FIG. 17A shows a side view of a first contact layer bonded with the bonding layer according to an exemplary embodiment of the present invention.

FIG. 17B shows a top view of a first contact layer bonded with the bonding layer according to an exemplary embodiment of the present invention.

FIG. 18A shows a side view of a cell structure on a second contact layer according to an exemplary embodiment of the present invention.

FIG. 18B shows a top view of a cell structure on a second contact layer according to an exemplary embodiment of the present invention.

FIG. 19A shows a side view of the first contact and bonding layer of FIG. 17A coupled with the cell structure and second contact of FIG. 18A according to an exemplary embodiment of the present invention.

FIG. 19B shows a top view of the first contact and bonding layer of FIG. 17B coupled with the cell structure and second contact of FIG. 18B according to an exemplary embodiment of the present invention.

DETAILED DESCRIPTION OF THE PREFERRED EMBODIMENTS

These and other aspects of the invention will now be described in greater detail in connection with exemplary embodiments that are illustrated in the accompanying drawings.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

All patents and other publications identified are incorporated herein by reference for the purpose of describing and disclosing. For example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason.

Figure 1A:
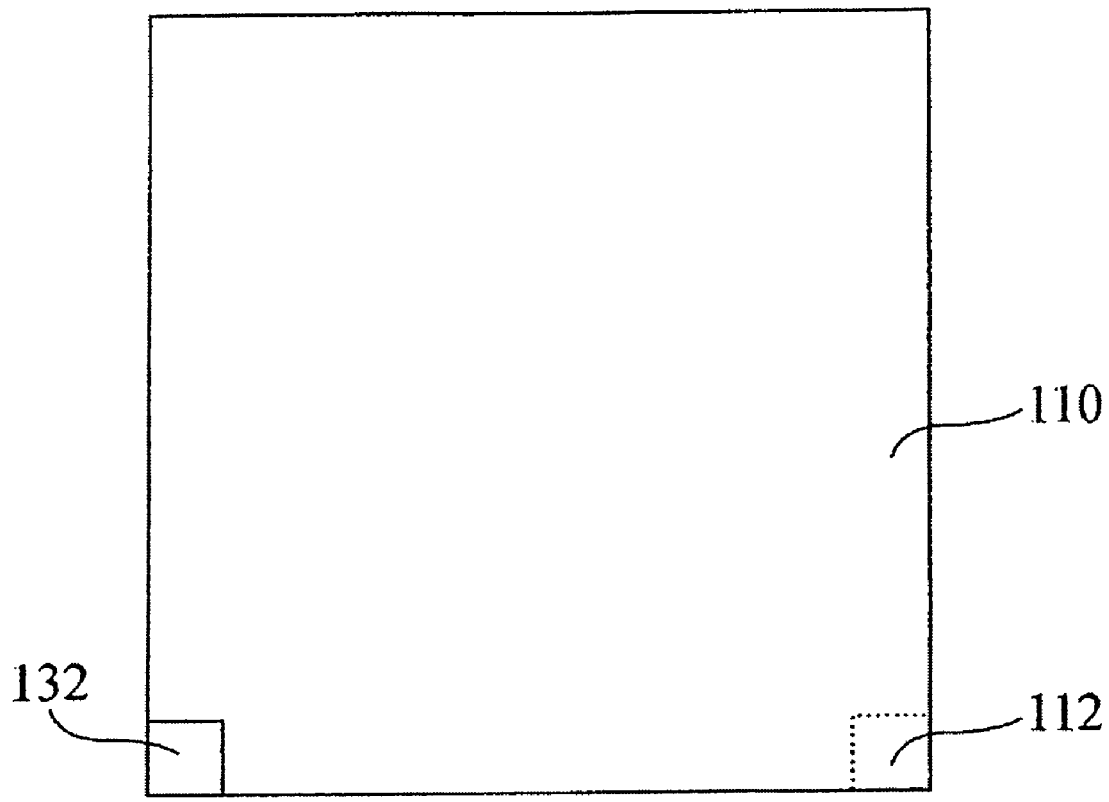
FIG. 1A shows a top view of an electrochemical device according to an exemplary embodiment of the present invention.
Figure 1B:
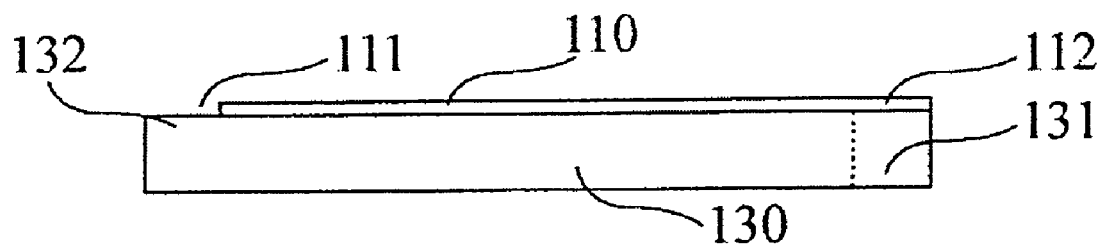
FIG. 1B shows a side view of an electrochemical device according to an exemplary embodiment of the present invention.

FIG. 1A shows a top view of one exemplary embodiment. FIG. 1B shows a side view of this embodiment. As shown in the figures, this embodiment comprises an electrochemical device 130 and a metal encapsulation layer 110. The electrochemical device 130 may comprise any number of materials or layers. The electrochemical device 130 may also comprise a battery. For example, the electrochemical device 130 may comprise an anode, cathode, electrolyte, current collectors, substrate, etc. Some materials may, for example, comprise Lithium, $LiCoO_2$, LIPON, gold, platinum, stainless steel, titanium, zirconium, cobalt, aluminum, indium, nickel, copper, silver, carbon, bronze, brass, beryllium, and/or oxides, nitrides, and alloys thereof. Furthermore, the electrochemical device 130 may be a thick film device.

The metal foil may, for example, be less than 100 microns in thickness. In another embodiment the metal foil may be less than 50 microns and in a specific embodiment the metal foil may be less than 25 microns.

The electrochemical device 130 may comprise at least one notch 131. The electrochemical device 130 shown in FIGS. 1A, 1B, 2A and 2B comprises a single notch 131, and the encapsulation layer 110 also includes a notch 111. These notches 111, 131 may be of any shape or size. The electrochemical device 130 or the encapsulation layer 110 may comprise any number of notches. The metal encapsulation layer 110 extends over the notch 131 in the electrochemical device 130 providing an encapsulation contact tab 112. This contact tab 112 extends over the open area left by the notch 131. The contact tab 112 may provide a convenient electrically conductive contact for the device. In a similar fashion, the electrochemical device may extend under the notch 111 in the metal encapsulation layer 110 providing a contact tab 132.

Figure 2A:
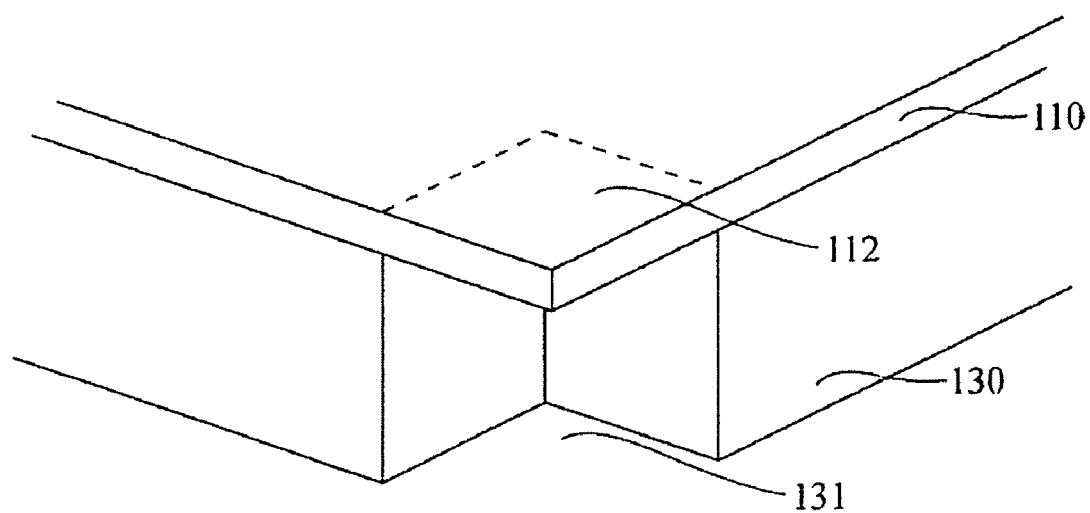
FIG. 2A shows a perspective view of one corner of an electrochemical device with a notch in the electrochemical device according to an exemplary embodiment of the present invention.
Figure 2B:
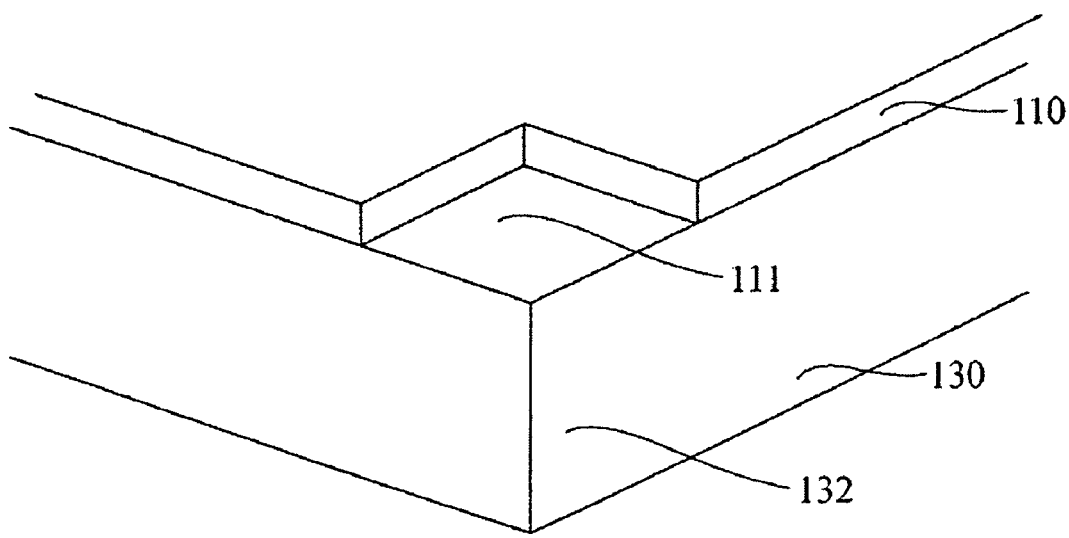
FIG. 2B shows a perspective view of one corner of an electrochemical device with a notch in the encapsulation layer according to an exemplary embodiment of the present invention.

FIG. 2A and FIG. 2B show perspective views of the embodiment shown in FIG. 1A and FIG. 1B. FIG. 2A shows an electrochemical device 130, a metal encapsulating layer 110, a notch 131 in the electrochemical device 130, and a contact tab 112 in the encapsulation layer 110. FIG. 2B shows an electrochemical device 130, a metal encapsulating layer 110, a notch 111 in the encapsulation 110 and the contact tab 132 in the electrochemical device 130. Although these figures show notches 131, 111 on the corner of the device, they may be in any location. One such exemplary configuration is shown in FIG. 7A with a notch on the side of the device. Also, the notch is not necessarily square. For instance, the notch shown in FIG. 7A is round, whereas those shown in FIGS. 1A, 1B, 2A and 2B are rectangular notches.

The metal foil layer 110 may be adapted to encapsulate the electrochemical device 130. This encapsulation may, for example, protect the electrochemical device 130 from damaging environmental effects. For example, many electrochemical devices comprise environmentally sensitive materials such as Lithium. These materials can be extremely reactive with air and moisture, and may degrade when exposed to such environments. Accordingly, the metal foil encapsulate layer 110 may protect environmentally sensitive materials in the electrochemical device from air and/or moisture.

The metal foil encapsulate layer 110 in an exemplary embodiment of the present invention may lie over a substrate layer in the electrochemical device 130. An electrochemical device may include a number of layers, for example, a substrate, cathode, electrolyte, and anode. Such a device may be encapsulated with a metal foil deposed on the substrate, and may also include contact tabs. The metal foil, therefore, may provide contacts that are secure, durable and may be incorporated at any location in the device. Because the contacts are part of the metal foil, they are less likely to break or shear from the substrate.

The metal foil layer, in an exemplary embodiment of the present invention, may comprise the cathode.

Figure 3A:
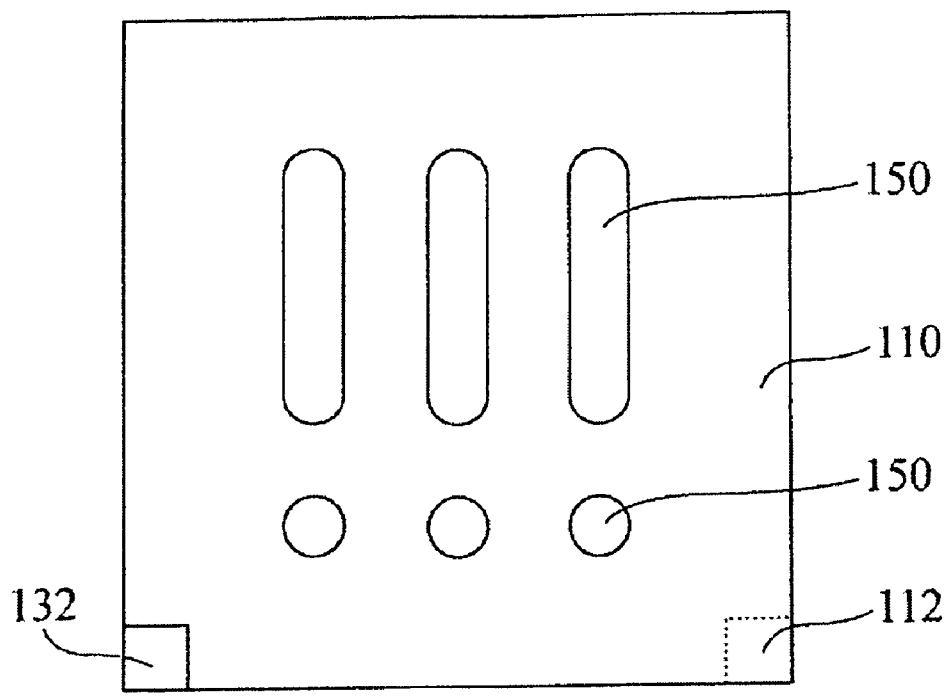
FIG. 3A shows a top view of an electrochemical device with a configuration of holes in the metal encapsulation according to an exemplary embodiment of the present invention.
Figure 3B:
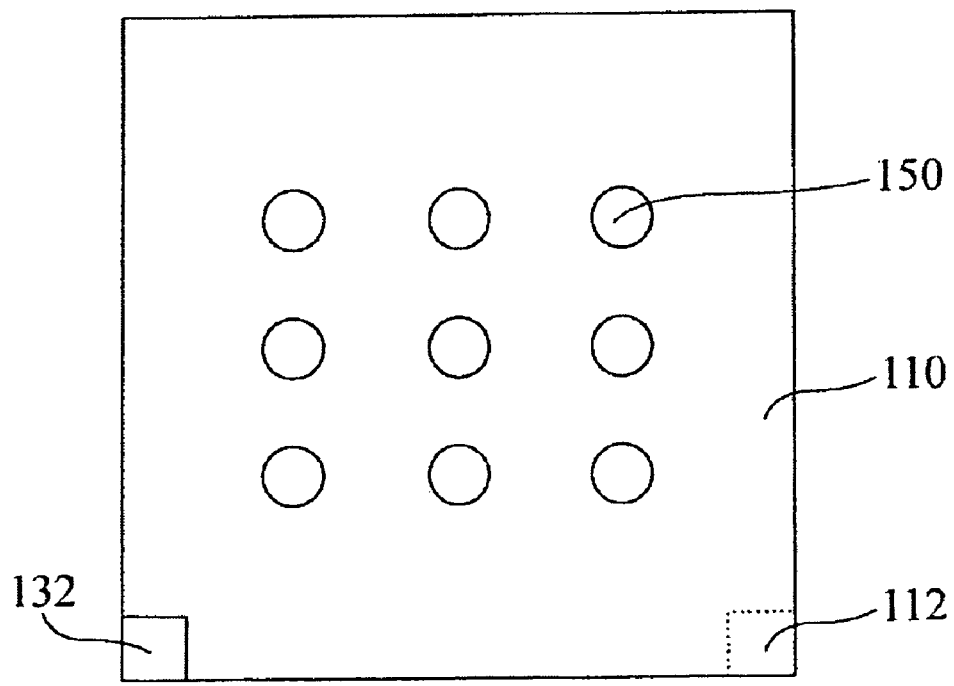
FIG. 3B shows a top view of an electrochemical device with another configuration of holes in the metal encapsulation according to an exemplary embodiment of the present invention.

FIG. 3A and FIG. 3B show top views of an exemplary embodiment of the present invention. In this embodiment, the metal foil encapsulation 110 comprises openings 150. These openings 150 may, for example, provide contact or access to layers in the electrochemical device. For example, these openings 150 may provide direct access to the substrate in the electrochemical device. These openings 150 may be of any size or configuration. Shown in the figures are exemplary circle and oval openings. Depending on the application a plurality of openings may be required or a single opening may suffice.

Figure 9A:
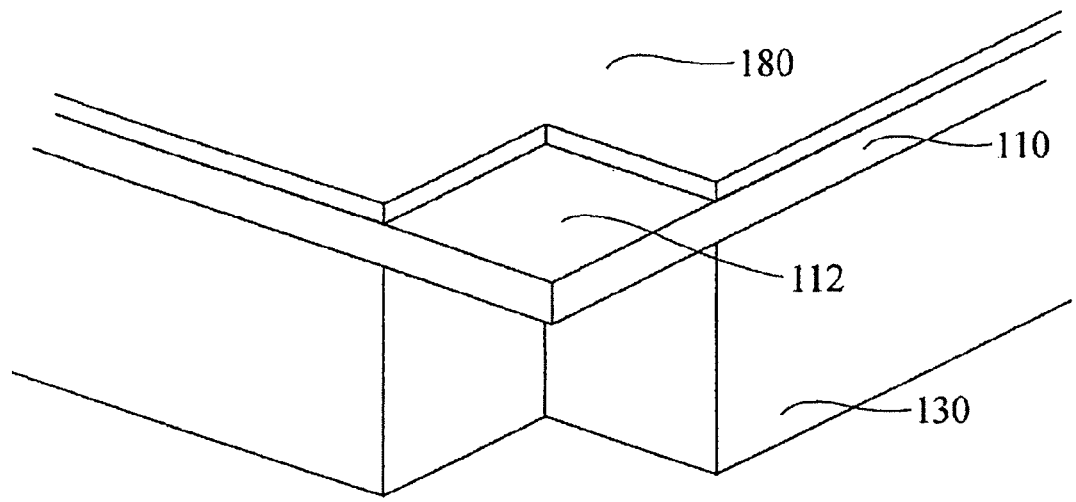
FIG. 9A shows the electrochemical device of FIG. 2A with an insulating layer according to an exemplary embodiment of the invention.
Figure 9B:
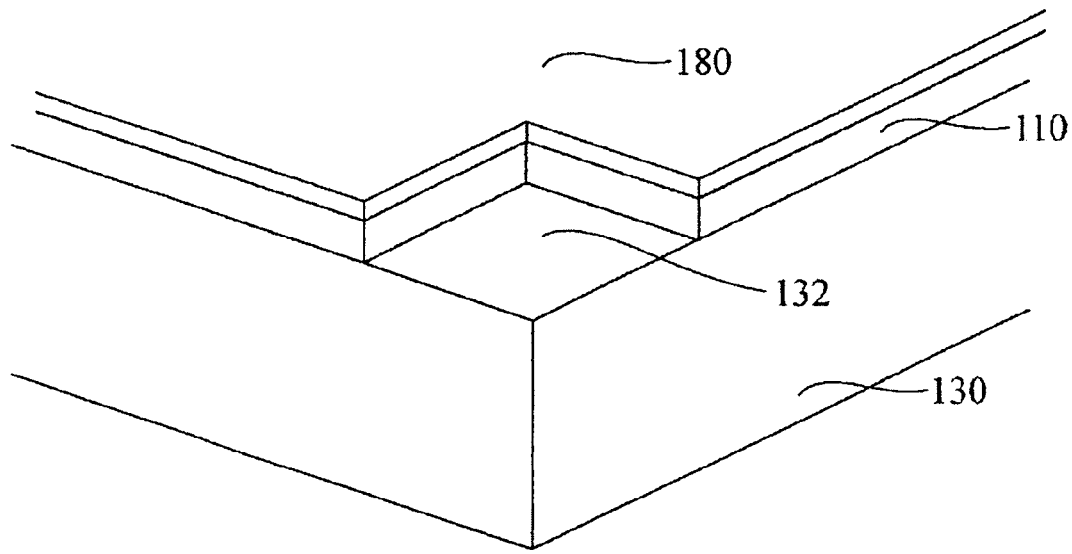
FIG. 9B shows the electrochemical device of FIG. 2B with an insulating layer according to an exemplary embodiment of the invention.

FIG. 9A shows the embodiment of FIG. 2A with an insulating layer 180 on the metal foil 110 and FIG. 9B shows the embodiment of FIG. 2B with an insulating layer 180 on the metal foil 110. The insulating layer 180 protects the metal foil 110 from unwanted electrical contacts. In FIG. 9A and FIG. 9B the tab 112, 132 portions are the only portion that are not covered with the insulating layer 180 allowing electrical contact only on the tabs 112, 132.

Figure 4A:
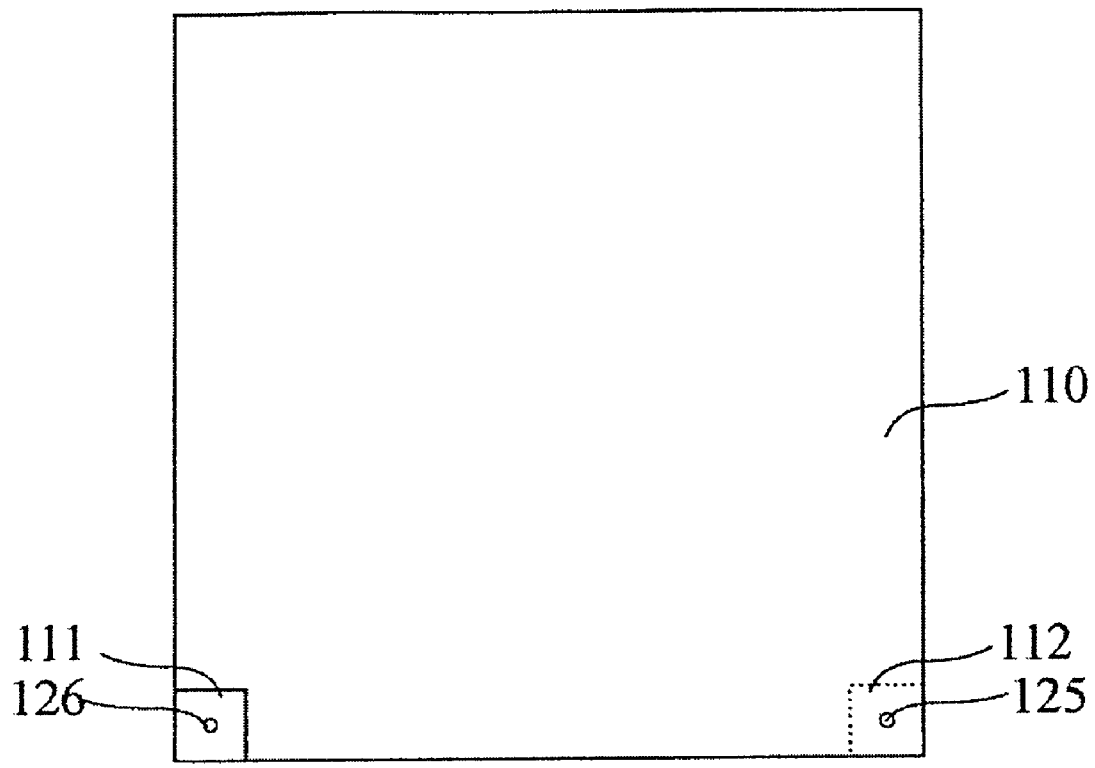
FIG. 4A shows a top view of an electrochemical device with holes in the contacts according to an exemplary embodiment of the present invention.
Figure 4B:
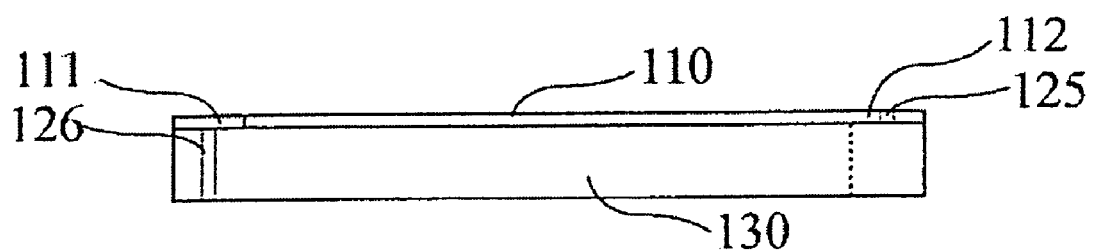
FIG. 4B shows a side view of an electrochemical device with holes in the contacts according to an exemplary embodiment of the present invention.

FIG. 4A and FIG. 4B show an exemplary embodiment of the present invention. This embodiment comprises a hole 126 in the contact tab 132 and a hole 125 in the encapsulate tab 112. Accordingly, these holes 125, 126 may, for example, provide a more secure contact point. Other devices may grip the contact through holes 125, 126.

Figure 5A:
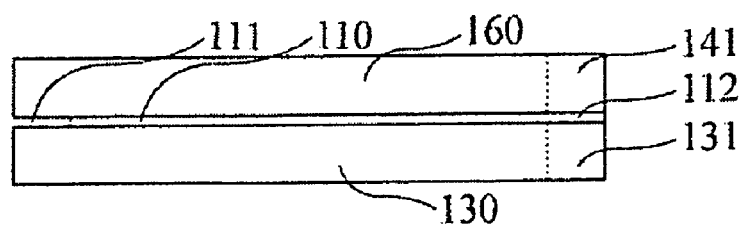
FIG. 5A shows a side view of an electrochemical device with an electrochemical device on each side of the metal film encapsulation according to an exemplary embodiment of the present invention.
Figure 5B:
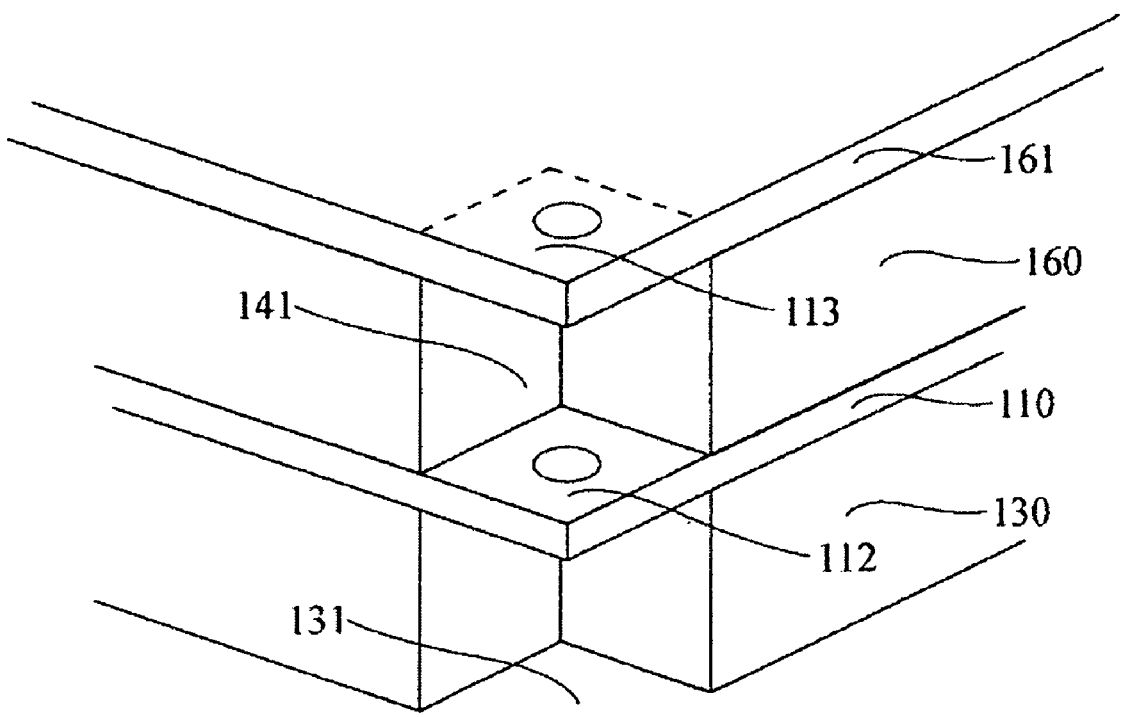
FIG. 5B shows a perspective view of an electrochemical device with an electrochemical device on each side of the metal film encapsulation according to an exemplary embodiment of the present invention.
Figure 5C:
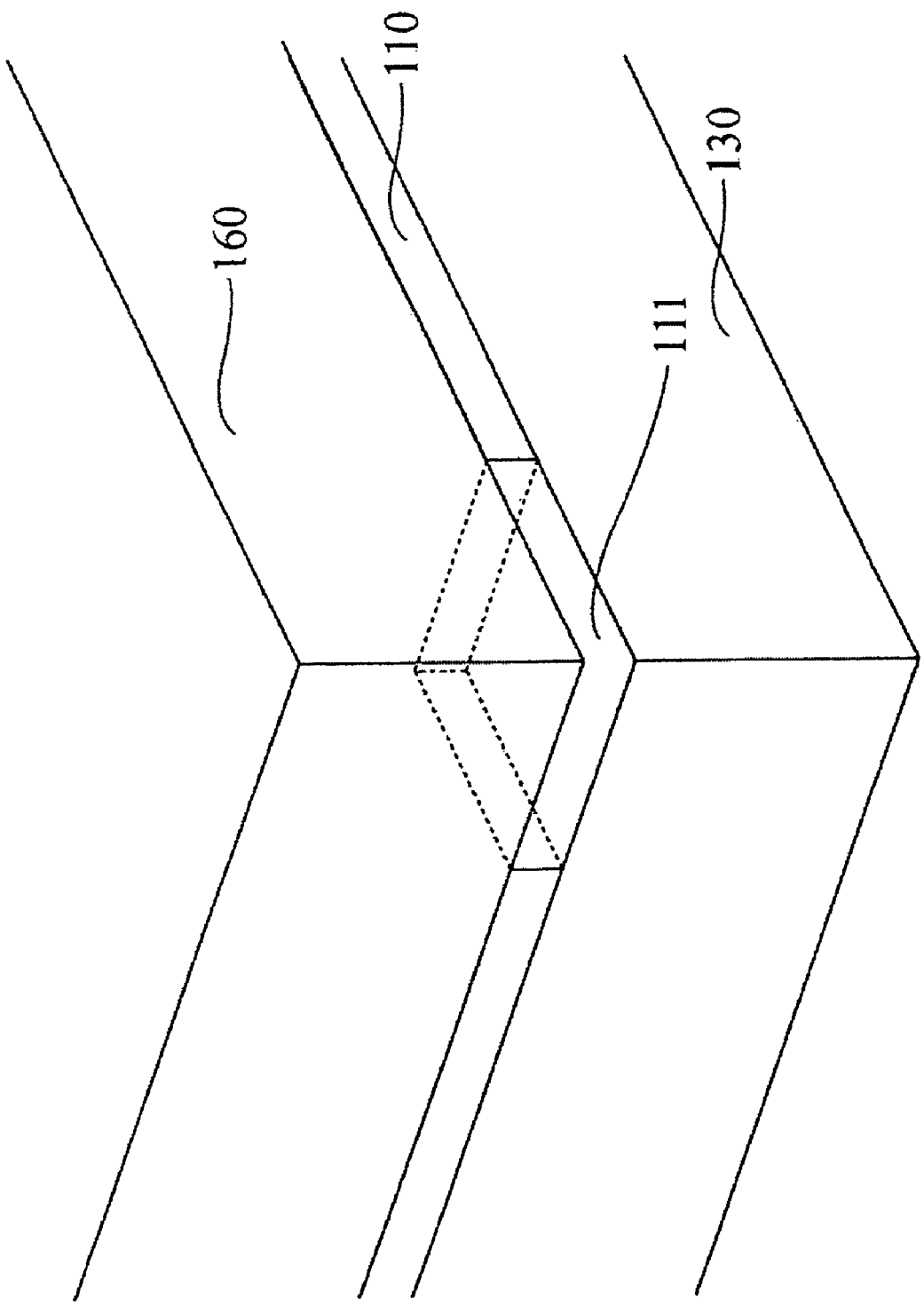
FIG. 5C shows a perspective view of an electrochemical device with a notched metal film encapsulation between two devices according to an exemplary embodiment of the present invention.
Figure 10:
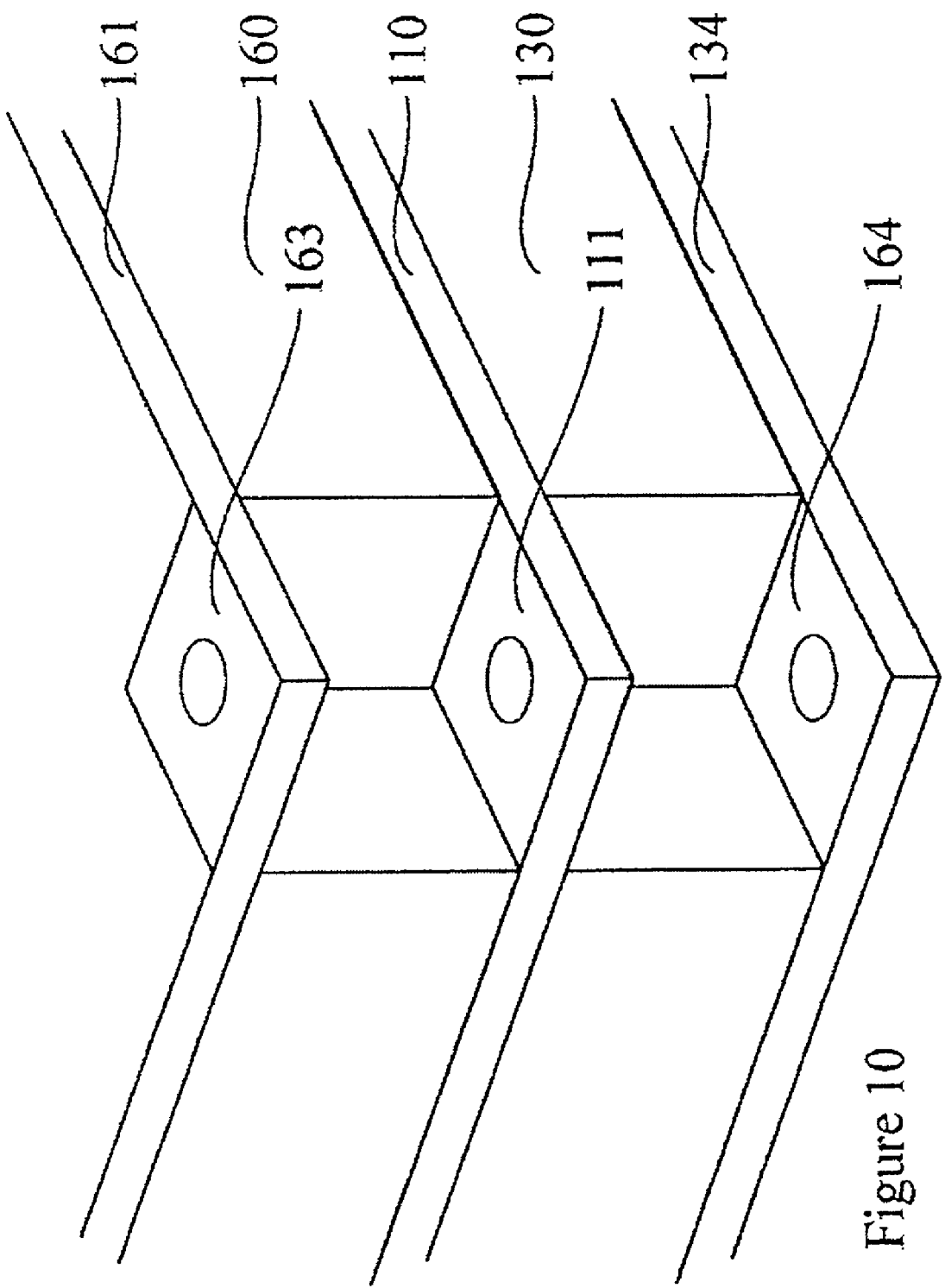
FIG. 10 shows two electrochemical devices with three metal foils according to an exemplary embodiment of the invention.

FIG. 5A, FIG. 5B, and FIG. 5C show an exemplary embodiment of the present invention. This embodiment comprises two electrochemical devices 130, 160 with a single metal foil encapsulation layer 110 between the two devices. In this embodiment, for example, the metal foil 110 may comprise the cathode for both electrochemical devices 130, 160. Furthermore, in another embodiment the metal foil 110 may be electrically conductive to the substrate of the electrochemical devices 130, 160. This embodiment may also include an encapsulation layer 161 on the top of electrochemical device 160 as shown in FIG. 5B. In FIG. 10 a third metal foil 134 is also included.

FIG. 5B is a perspective view of the right side of FIG. 5A with a second encapsulation layer 161. As shown the two electrochemical devices 130, 160 have notches 131, 141 and there is an extending tab 112 in the encapsulate layers 110, 113.

FIG. 5C is a perspective view of the left side of FIG. 5A and shows a notch 111 in the encapsulate 110 and tabs in both electrochemical devices.

Figure 6:
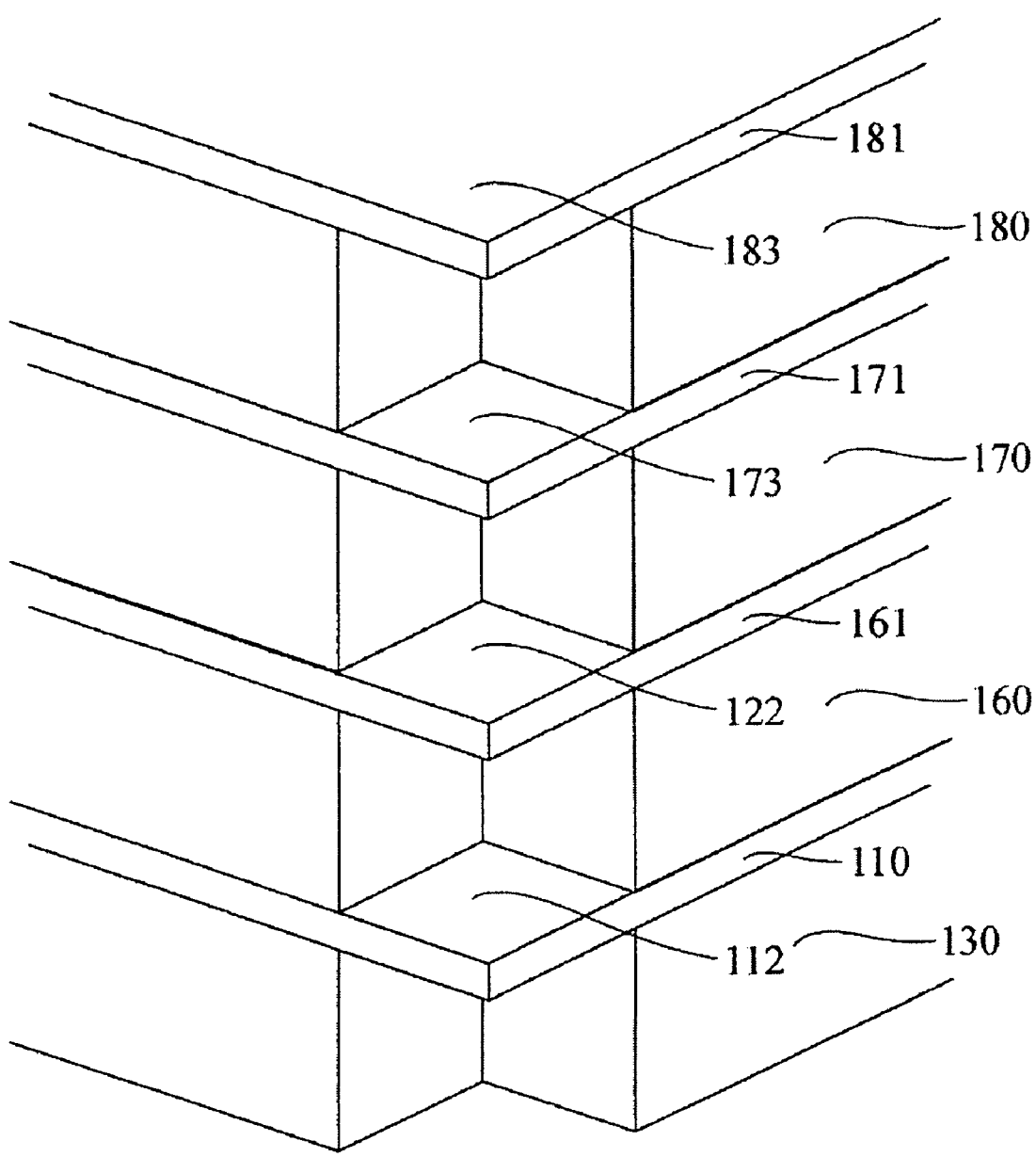
FIG. 6 shows a plurality of electrochemical devices stacked with metal foil in between according to an exemplary embodiment of the present invention.

FIG. 6 shows a plurality of electrochemical devices 130, 160, 170, 180 stacked one upon another with metal foil layers 110, 161, 171 between and a metal encapsulate 181 on the top. Although this figure shows four electrochemical devices 130, 160, 170, 180, the invention is not limited by the number of devices that may be stacked. Any number of devices may be stacked without deviating from the invention. This embodiment also shows four tabs 112, 122, 173, 183 in the encapsulation layers.

Figure 7:
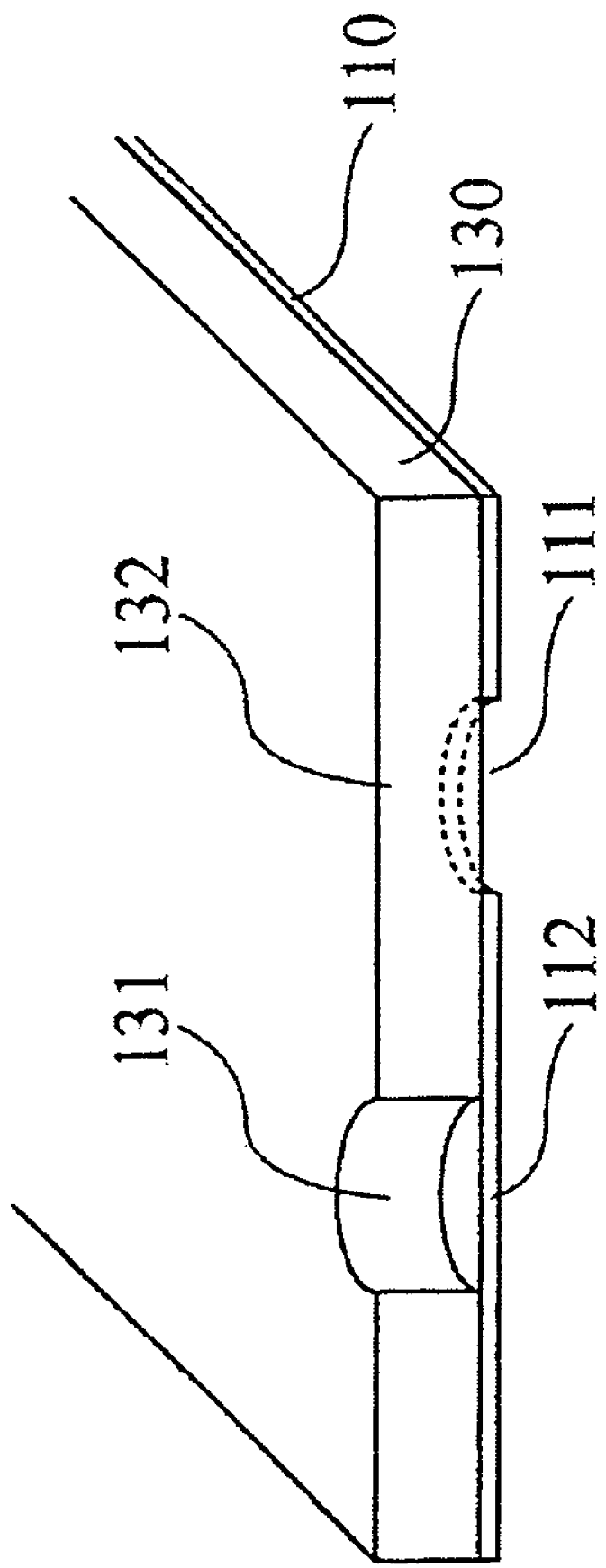
FIG. 7 shows an electrochemical device with a notch and tab on the side of the electrochemical device according to an exemplary embodiment of the invention.

FIG. 7 shows an exemplary embodiment of the present invention. In this embodiment an electrochemical device 130 has a notch 131 and a tab 132. On the bottom of the electrochemical device 130 is an encapsulation layer 110, which includes a tab 112 and a notch 111. The notches 111, 131 are circular and placed on the same side of the device.

Figure 8:
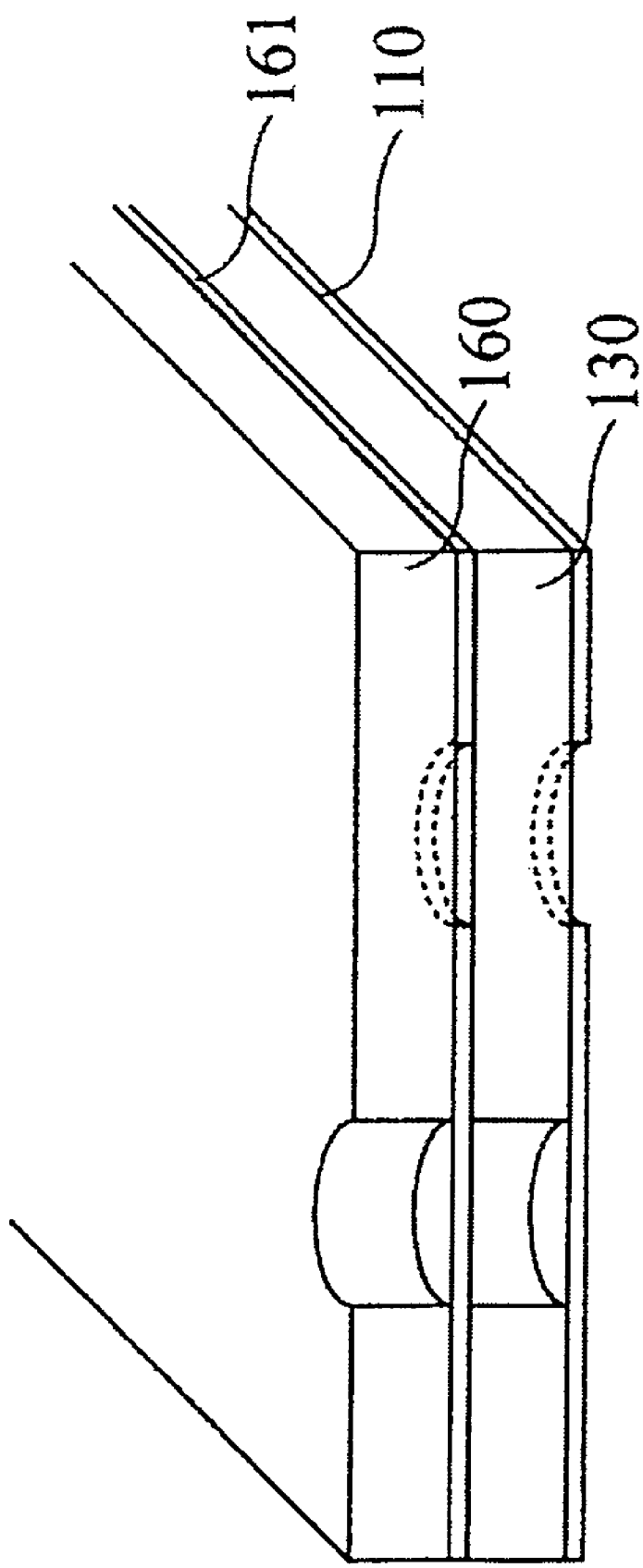
FIG. 8 shows an electrochemical device with a substrate, cathode, electrolyte, anode and a metal foil encapsulation according to an exemplary embodiment of the invention.

FIG. 8 shows a embodiment similar to that shown in FIG. 7 with circular notches in both the encapsulate 110 and the electrochemical cell 130. This exemplary embodiment shows a second electrochemical device 160 and a second encapsulation layer 161.

In an exemplary embodiment of the present invention, a metal foil may lay over an electrochemical device. This metal foil encapsulates the electrochemical device and protects it from environmental harm. The metal foil also provides tabs that are conductively contacted with the substrate of the device.

In an exemplary embodiment of the present invention, the electrochemical device comprises $LiCoO_2$. In this embodiment, the device is treated with a rapid thermal anneal. For example, the device is brought up to approximately 700° C. over a period of six minutes. The device is then held at this temperature for approximately five minutes and then quickly cooled to room temperature in about six minutes. This rapid thermal annealing crystallizes the $LiCoO_2$ so that it may be used without a barrier layer. The period of time may vary up to 30 minutes or even down to 10 seconds.

FIG. 11A shows a side view of an electrochemical device according to an exemplary embodiment of the present invention. In this embodiment, a first contact 1101 is coupled with bonding layer 1110 with a portion of the first contact 1101 extending past the bonding layer 1110. The bonding layer 1110 may also be bonded with the cell structure 1115. A second contact 1105 is placed under the cell structure 1115. A barrier layer, for example, may also be placed between the second contact 1105 and the cell structure 1115. Shown embedded within the bonding layer 1110 is conductor 1120. This conductor 1120, for example, creates a selectively conductive bonding layer. A selectively conductive bonding layer 1110 permits conduction from the cell structure 1115 through the bonding layer 1110 to the first contact 1101 at specific points, and yet provides insulation between the first contact 1101 and the second contact 1105.

The conductor 1120 may be placed within the bonding layer 1110 in many different ways. For example, a metal tab, a metal wire, multiple metal wires, a metal wire mesh, perforated metal foil, perforated metal, a metal coating applied to the adhesive layer, a metallic disk, a metallically coated fiberglass or combinations thereof may be used. In each of these examples, the conductor 1120 can provide electrical conduction between the cell structure 1115 and the first contact 1101 and yet provide insulation between the two contacts 1101, 1105. In some embodiments the conductor 1120 may be woven within the bonding layer 1110. The conductor 1115 may be, for example, disks embedded within the bonding layer 1110. In some embodiments slits within the bonding layer 1110 may be made in order to weave or place the conductor 1120 through the bonding layer 1110. Also, for example, holes or other means may be used to place the conductor 1120 through the bonding layer 1110.

In an exemplary embodiment, a reinforcement layer may be placed within the insulating layer. For example, a fiberglass material may cover half of one surface of the insulating layer, woven through the layer and then cover the other half of the bonding layer. Such a layer of fiberglass without a conductive coating would insulate the materials placed between. The fiberglass may be coated in a localized area with a conductive material. Such conductive coatings can coat the fiberglass area at the top and bottom surface of the bonding layer. In such an embodiment, for example, the fiberglass would conduct between the upper contact and the cell. Conductive material may be disposed on the fiberglass using ink jet, silk screen, plasma deposition, e-beam deposition, spray and/or brush methods. Other materials may be used rather than fiberglass, such as, for example, KEVLAR®, plastic, glass or other insulating materials.

An exemplary embodiment of the present invention provides for selective contact between the first contact and the cell structure through holes in the bonding layer. In such an embodiment, holes in the bonding layer may allow the first contact and cell structure to remain in contact. The layers may be, for example, pressed together to create a contact. Alternatively, conductive glues or inks may be applied in or near the hole area in the bonding layer to make the contact between the layers. Lithium may also be used as a conductive material.

The conductor 1120, for example, may be made of gold, platinum, stainless steel, titanium, zirconium, cobalt, aluminum, indium, nickel, copper, silver, carbon, bronze, brass, beryllium, or oxides, nitrides, and alloys thereof.

FIG. 11B shows a top view of the exemplary embodiment shown in FIG. 11A. As shown in FIG. 11B the first contact 1101 extends past the bonding layer 1110 and the second contact 1105. Likewise, for example, the second contact 1105 also extends past the boding layer 1115 and the first contact 1101 in the opposite direction.

Figure 11C:
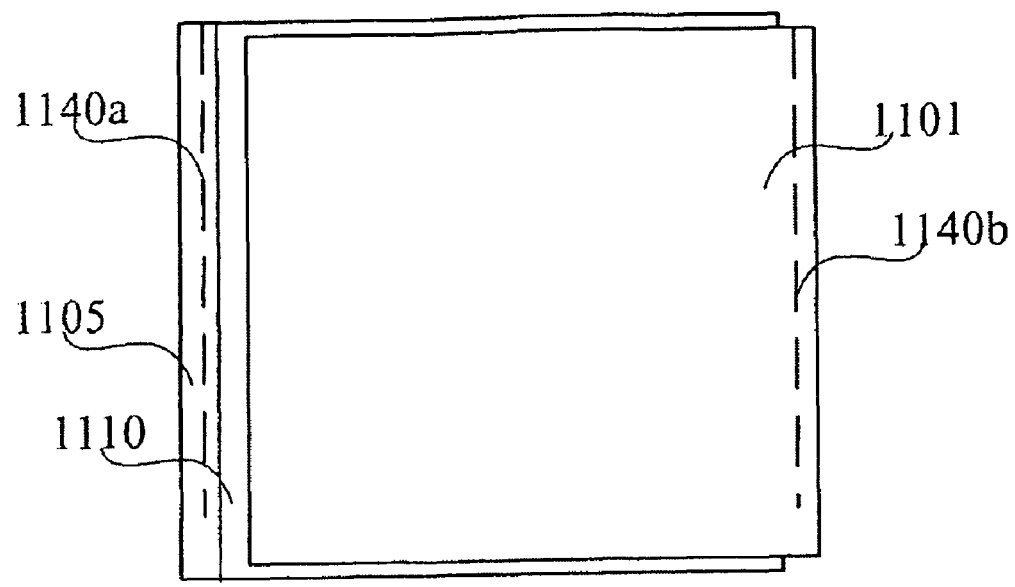
FIG. 11C shows a top view of the electrochemical device of FIG. 11B with partial cuts in the encapsulation according to an exemplary embodiment of the present invention.
Figure 11D:
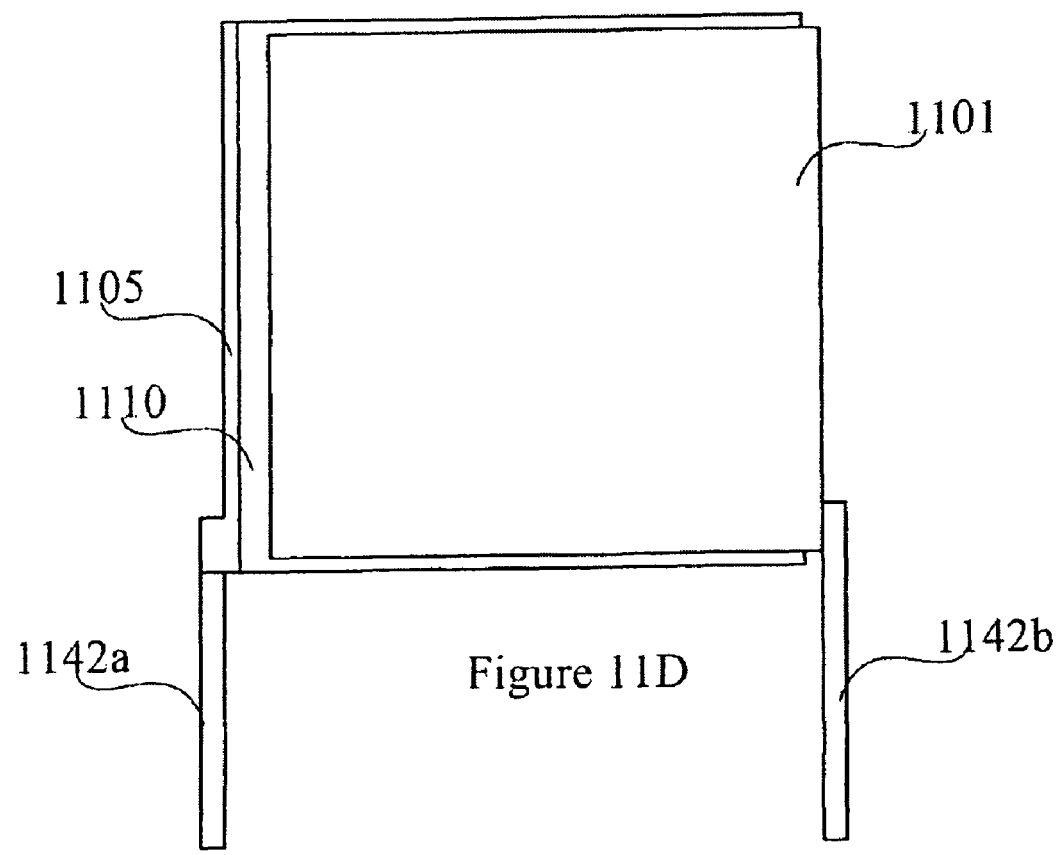
FIG. 11D shows a top view of the electrochemical device of FIG. 11C having resulting strips folded over according to an exemplary embodiment of the present invention.

FIGS. 11C and 11D show an exemplary embodiment in which leads are formed from the first and second contacts 1101, 1105. As shown in FIG. 11C, a first partial cut 1140a is made in the first contact 1101 and a partial cut 1140b is made in the second contact 1105. These partial cuts form strips that may be folded over to extend from the electrochemical device. For instance. FIG. 11D shows an example in which strips 1142a and 1142b resulting from the partial cuts in the contacts 1101, 1105 are folded in a downward direction of the drawing. It should be appreciated that only one or both of the extending parts of the contacts 1101, 1105 can be partially cut to form leads in a variety of ways for a desired application or orientation of the electrochemical device.

For purposes of explaining the exemplary embodiments shown in FIGS. 11A-11D, FIGS. 12A-19B show individual layers and parts of this embodiment and how they can be coupled or bonded together. These figures are not meant to show a step-by-step process for manufacturing any embodiments of the invention. Rather, these figures are presented to help understand how the layers interact. FIGS. 12A, 13A, 14A, 15A, 16A, 17A, 18A and 19A show side views of various parts of an exemplary battery, and FIGS. 12B, 13B, 14B, 15B, 16B, 17B, 18B and 19B show top views.

FIG. 12A shows a side view of a conductor 1120 according to one embodiment of the present invention. The top view of three exemplary types of conductors, a wire 1121, a tab 1122, and a wire mesh 1123, are shown in FIG. 12B. FIG. 13A shows a side view and FIG. 13B shows a top view of a slit 1130 cut within a bonding layer 1110. FIG. 14A shows a side view of a conductor 1120, for example, woven through the bonding layer. FIG. 14B shows a top view of a mesh wire conductor 1123 woven through the bonding layer 1110. FIG. 15A shows the conductor 1120 embedded within the bonding layer. The conductor 1120 may be embedded within the bonding layer 1110, for example, by heating the bonding layer 1110 to the point where the conductor 1120 may be pressed within the bonding layer 1110. The surfaces of the conductor 1120 and bonding layer 1110 may preferably be flush after this process. FIG. 15B shows a top view of a wire mesh conductor 1123 embedded within the bonding layer.

The resultant bonding layer 1110 from FIGS. 12A-15B show a bonding layer with insulating properties yet provides selective conductivity between the portions of the top surface and the lower surface of the bonding layer 1120. Other combination may also produce selective conductivity.

FIG. 16A and FIG. 16B show a first contact 1101. FIG. 17A shows the first contact 1101 bonded with the bonding layer 1110. Note that in this embodiment the conductor 1120 preferably makes electrical contact with the first electrical contact 1101. FIG. 17B, shows the top view of FIG. 17A. The first contact may also encapsulate the battery thereby protecting it from environmental degradation and damage. For example, many electrochemical devices comprise environmentally sensitive materials such as Lithium. These materials can be extremely reactive with air and moisture, and may degrade when exposed to such environments. Accordingly, the first contact 1101 may encapsulate the battery to protect it from environmentally sensitive materials in the electrochemical device from air and/or moisture.

FIG. 18A shows an exemplary embodiment of a single battery cell 1115 coupled with a second contact 1105. The second contact 1105 may also be the substrate upon which the cell is deposited. The cell structure in this embodiment comprises a cathode, and anode and an electrolyte. The electrolyte may include LIPON.

FIG. 19A shows a completed cell structure. The second contact 1105 and the cell structure 1115 from FIG. 18A are coupled with the first contact 1101 and the bonding layer 1110 as shown in 17A. Again, note how the conductor 1120 is preferably in electrical contact with the electrochemical device 1115 in a selective area. The cell is bounded by external contacts 1101 and 1105 with minimal layers there between. In this embodiment the first and second contacts 1101 and 1105 extend beyond the area of the electrochemical device 1115.

The first and second contacts 1101, 1105 of this embodiment can be made of a conductive metal. For example, the contact or contacts may be made of gold, platinum, stainless steel, titanium, zirconium, cobalt, aluminum, indium, nickel, copper, silver, carbon, bronze, brass, beryllium, or oxides, nitrides, and alloys thereof. Other conductive materials may also be used.

While the above examples show a conductive material 1120-1123 provided in an opening in the bonding layer 1110, such as the slit 1130 shown in FIG. 13b, it should be appreciated that electrical contact between the cell structure 1115 and first electrical contact 1101 may be provided by a number of other ways. For example, electrical conduction between the cell structure 1115 and the first contact 1101 may be provided by embedding a conductive powder within an adhesive forming the bonding layer 1110. For example, a conductive powder such as a metallic powder (e.g., nickel powder) can be embedded in an adhesive bonding layer 1110 at one or more selected areas within an adhesive bonding layer 1110 and between the contact 1101 and the cell structure 1115. Those skilled in the art will appreciate other conductive materials that may be provided for the selective conduction, such as conductive balls, slugs, wiring mesh etc. selectively provided within an adhesive. The ways to achieve electrical conduction between the cell structure 1115 and the first contact 1101, and yet provide insulation between the two contacts 1101, 1105, should not be considered as limited to the examples explained herein.

Figure 20A:
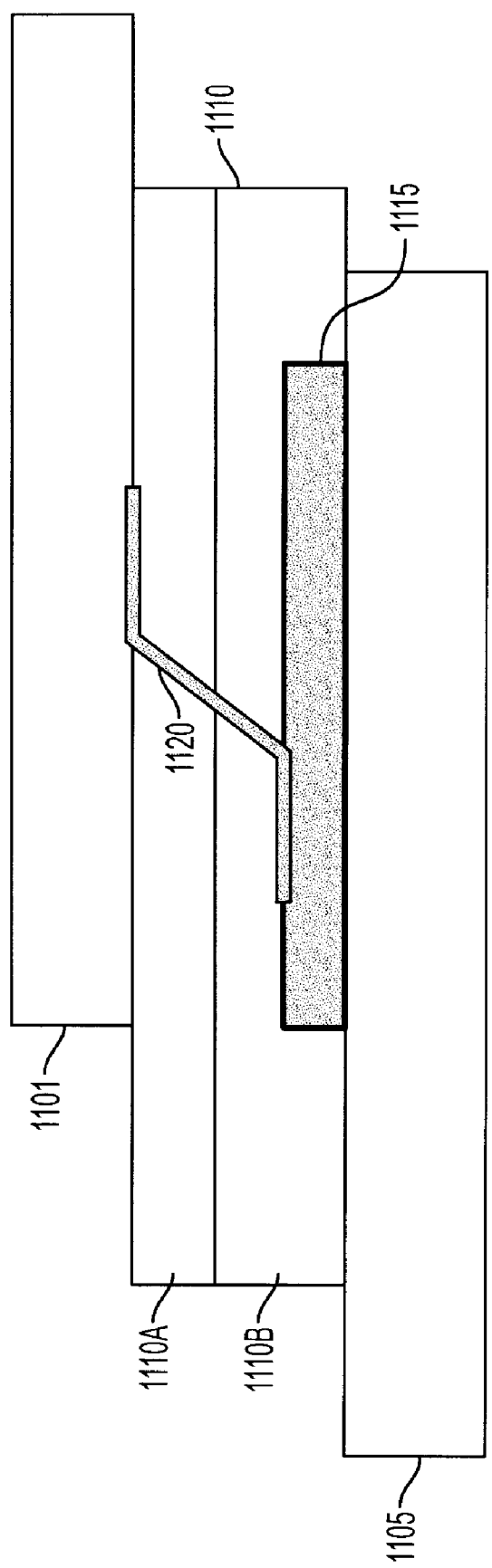
FIG. 20A shows a side view of a bonding layer according to an exemplary embodiment of the present invention.

FIG. 20A shows a side view of a bonding layer according to an exemplary embodiment of the present invention. In this embodiment, the bonding layer 1110 can be a composite of two layers: the upper layer 1110A being in contact with the first contact 1101 and the lower layer 1110B being in contact with the cell structure 1115. The lower layer 1110B may have chemical compatibility, chemical stability, chemical resistance, chemical non-reactivity, and chemical robustness with the cell structure 1115. The top layer 1110A may have a melting point preferably higher than 100° C. and pressure resilience against at least 10 psi so that the composite bonding layer has an enhanced heat and pressure resiliency compared to the bonding layer 1110. The conductor 1120 may be embedded through both the layers of 1110A aid 1110B.

In this exemplary embodiment, the lower layer 1110B can be, for example, a copolymer, which may be a thermoplastic or thermally set. In another exemplary embodiment, the lower layer 1110B can be an ethylene methacrylic acid (E/MAA) copolymer. In still another exemplary embodiment, the lower layer 1110B can be an ethylene methacrylic acid (E/MAA) copolymer, in which part of the methacrylic acid is neutralized with metal ions such as zinc (Zn) or sodium (Na). In still another exemplary embodiment, the lower layer 1110B may comprise at least one polymer type selected from the group of cyano-acrylates, epoxies, fluoro-acrylates, polyimides containing ether linkages, urea-formaldehyde resins, vinyl chlorides, and low-density polyethylene (LDPE).

In this exemplary embodiment, the upper layer 1110A can comprise at least one polymer type selected from the group of polyamides (e.g., Nylon), polyimides (e.g., Kapton), polyethylene terephthalates (e.g., Mylar), para-aramids (e.g., Kevlar), polyethylenes, high-density polyethylenes (e.g., Valeron), Ultra High Molecular Weight (UHMW) polyethylenes, polypropylenes, acrylics, polycarbonates, polyvinyl chlorides (PVC and CPVC), Acetal Delrin, phenolics, fluoroplastics (e.g., Teflon), polyurethanes, polystyrenes (e.g., acrylonitrile-butadiene-styrenes [ABS]), Keton PEEK, Tenite resins (e.g., Butyrate), silicate or non-silicate based glass, fiberglass, oxide ceramic (e.g., $ZrO_2$), nitride ceramic (e.g., AlN), carbide ceramic (e.g., SiC), or a combination/modification thereof.

Figure 20B:
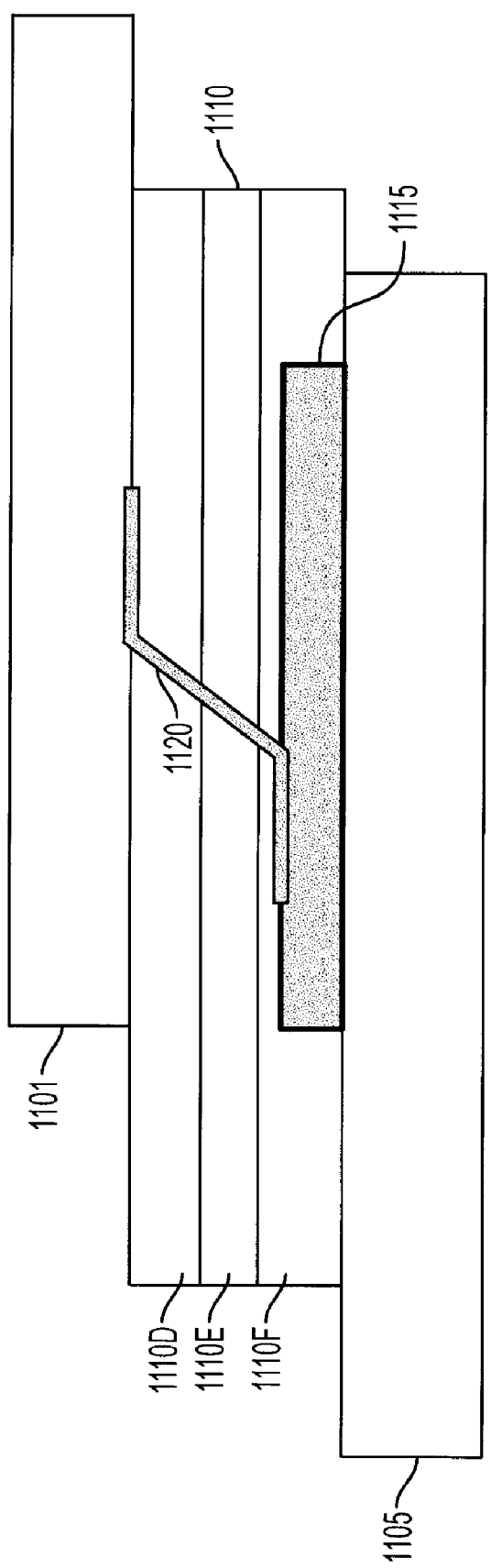
FIG. 20B shows a side view of a bonding layer according to another exemplary embodiment of the present invention.

FIG. 20B shows a side view of a bonding layer according to another exemplary embodiment of the present invention. In this exemplary embodiment, the bonding layer 1110 may have three layers: the topmost layer 1110D being in contact with the first contact 1101 and the lowest layer 1110F being in contact with the cell structure 1115. The middle layer 1110E may be in contact with the layers 1110D and 1110F, but 1110E may not contact with 1101 and 1115. The topmost layer 1110D may have chemical compatibility, chemical stability, chemical resistance, chemical non-reactivity, and chemical robustness with the first contact 1101. The lowest layer 1110F may have chemical compatibility, chemical stability, chemical resistance, chemical non-reactivity, and chemical robustness with the cell structure 1115. The middle layer 1110E, the so-termed heat and pressure resilient layer (HAPR layer), may have a melting point preferably higher than 100° C. and a pressure resilience against at least 10 psi, so that the composite bonding layer may possess an enhanced heat and pressure resiliency.

Figure 20C:
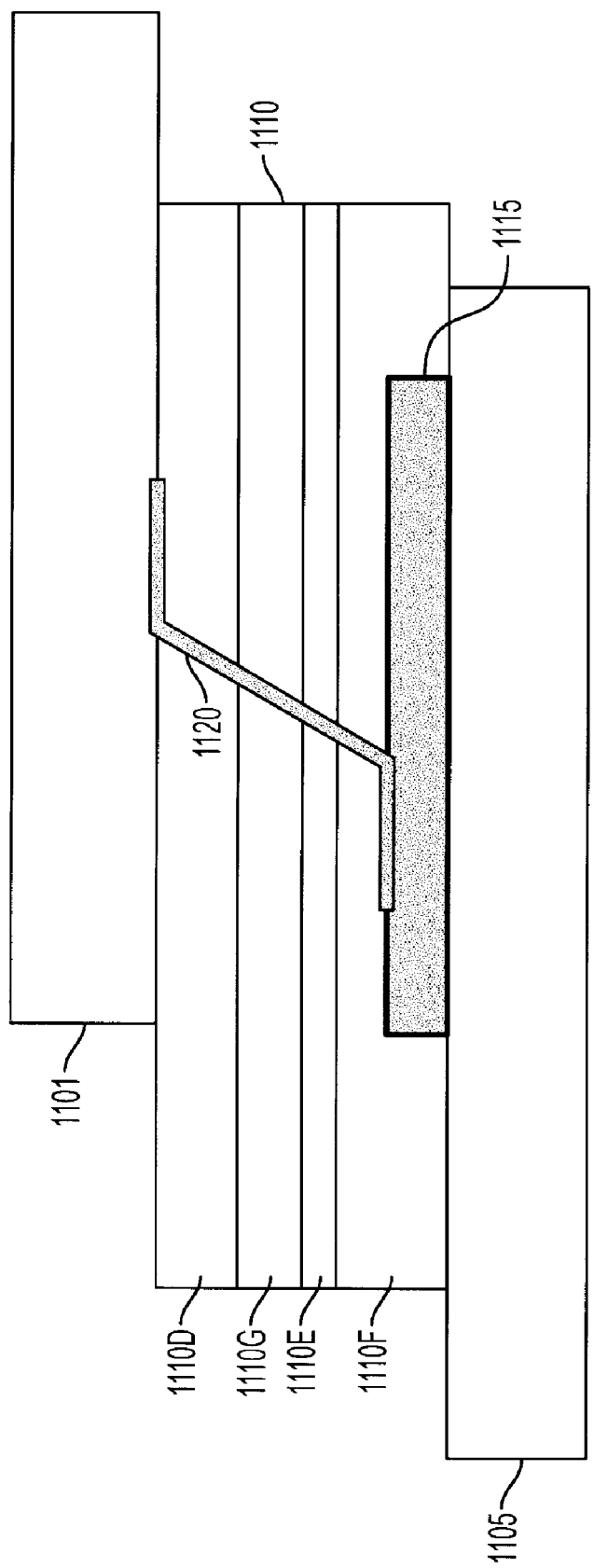
FIG. 20C shows a side view of a bonding layer according to another exemplary embodiment of the present invention.
Figure 20D:
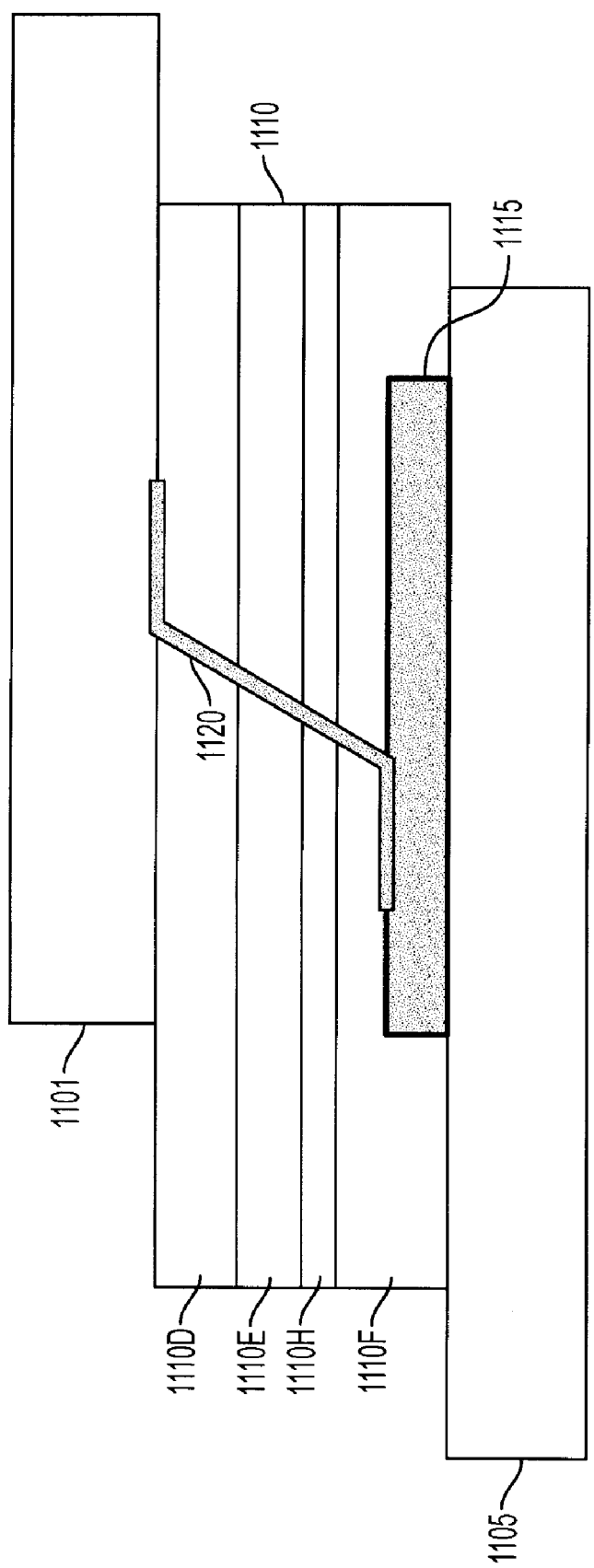
FIG. 20D shows a side view of a bonding layer according to another exemplary embodiment of the present invention.
Figure 20E:
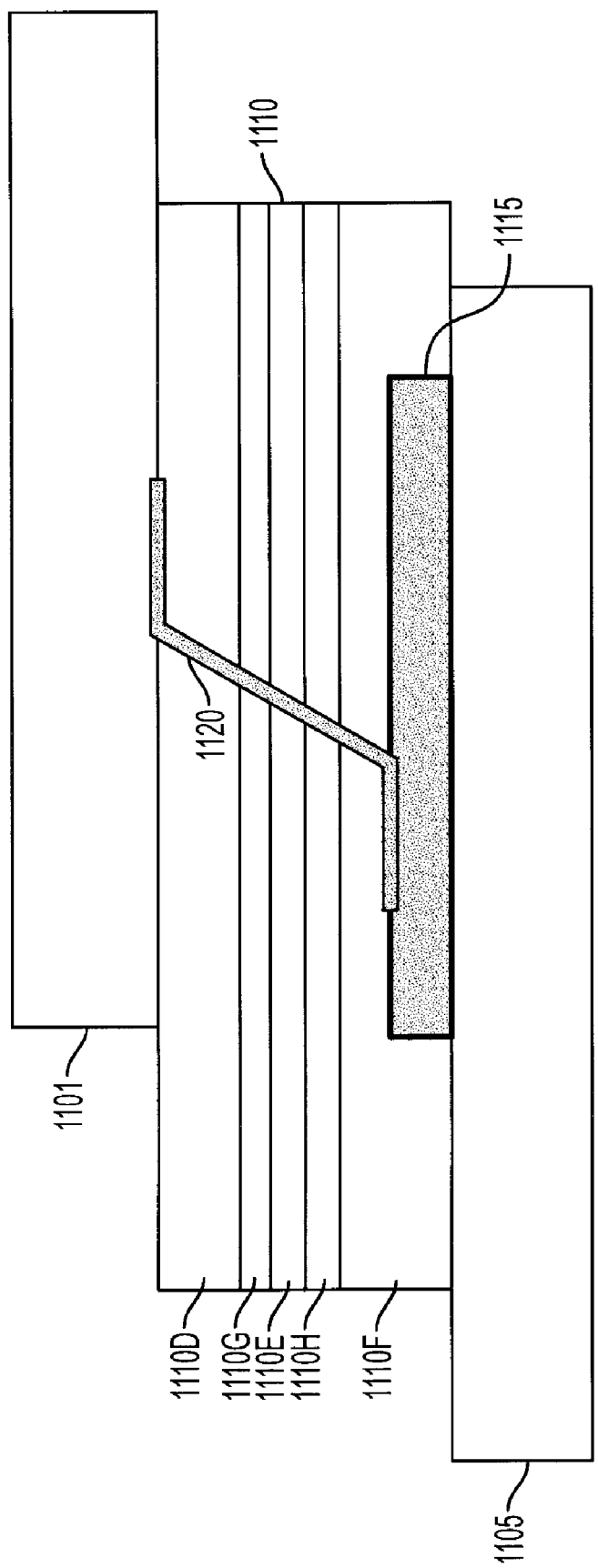
FIG. 20E shows a side view of a bonding layer according to another exemplary embodiment of the present invention.

FIG. 20C shows a side view of a bonding layer according to another exemplary embodiment of the present invention. In this exemplary embodiment, an adhesion layer 1110G can be added in between layers 1110D and 1110E. FIG. 20D show a side view of another exemplary embodiment in which bonding layer 1110 may comprise an adhesion layer 1110H in between 1110F and 1110E. FIG. 20E shows yet another exemplary embodiment in which both layers 1110G and 1110H can be added in between 1110F and 1110E. The adhesion layers 1110G and 1110H can be the same or different. The layers 1110D and 1110F can be same or different also. The conductor 1120 may be embedded through all the layers of 1110D, 1110E and 1110F, including 1110G and 1110H layers, when they are present.

In any of these exemplary embodiments, the topmost layer 1110D can be, for example, a copolymer, an ethylene methacrylic acid (E/MAA) copolymer, or an ethylene methacrylic acid (E/MAA) copolymer, in which part of the methacrylic acid is neutralized with metal ions such as zinc (Zn) or sodium (Na). In some other exemplary embodiments, the topmost layer 1110D may comprise at least one polymer type selected from the group of cyano-acrylates, epoxies, fluoro-acrylates, polyimides containing ether linkages, urea-formaldehyde resins, vinyl chlorides, and low-density polyethylene (LDPE).

In any of these exemplary embodiments, the HAPR layer 1110E, may comprise at least one polymer type selected from the group of polyamides (e.g., Nylon), polyimides (e.g., Kapton), polyethylene terephthalates (e.g., Mylar), para-aramids (e.g., Kevlar), polyethylenes, high-density polyethylenes (e.g., Valeron), Ultra High Molecular Weight (UHMW) polyethylenes, polypropylenes, acrylics, polycarbonates, polyvinyl chlorides (PVC and CPVC), Acetal Delrin, phenolics, fluoroplastics (e.g., Teflon), polyurethanes, polystyrenes (e.g., acrylonitrile-butadiene-styrenes [ABS]), Keton PEEK, Tenite resins (e.g., Butyrate), oxide ceramic (e.g., $ZrO_2$), nitride ceramic (e.g., AlN), carbide ceramic (e.g., SiC), silicate or non-silicate based glass, fiberglass, or a combination/modification thereof.

In any of these exemplary embodiments, the lowest layer 1110F may be, for example, a copolymer, an ethylene methacrylic acid (E/MAA) copolymer, or an ethylene methacrylic acid (E/MAA) copolymer, in which part of the methacrylic acid may be neutralized with metal ions such as zinc (Zn) or sodium (Na). In some other exemplary embodiments, the lowest layer 1110F may comprise at least one polymer type selected from the group of cyano-acrylates, epoxies, fluoro-acrylates, polyimides containing ether linkages, urea-formaldehyde resins, vinyl chlorides, and low-density polyethylene (LDPE).

In any of these exemplary embodiments, the conductor 1120 may, for example, comprise at least one element selected from the group of Li, B, graphitic carbon, Al, Si, Sc, Ti, V, Cr, Mn, Fe, Co, Ni, Cu, Y, Zr, Nb, Mo, Ru, Rh, Pd, Ag, In, Sn, Hf, Ta, W, Re, Os, Ir, Pt, Au, Pb, and any alloy thereof, including stainless steel, and is made by rolling, electroforming, drawing or any other materials processing technique or any vacuum deposition technique, such as sputtering, evaporation or CVD, or an electrochemical process (e.g., electroplating or electroless plating).

Figure 21:
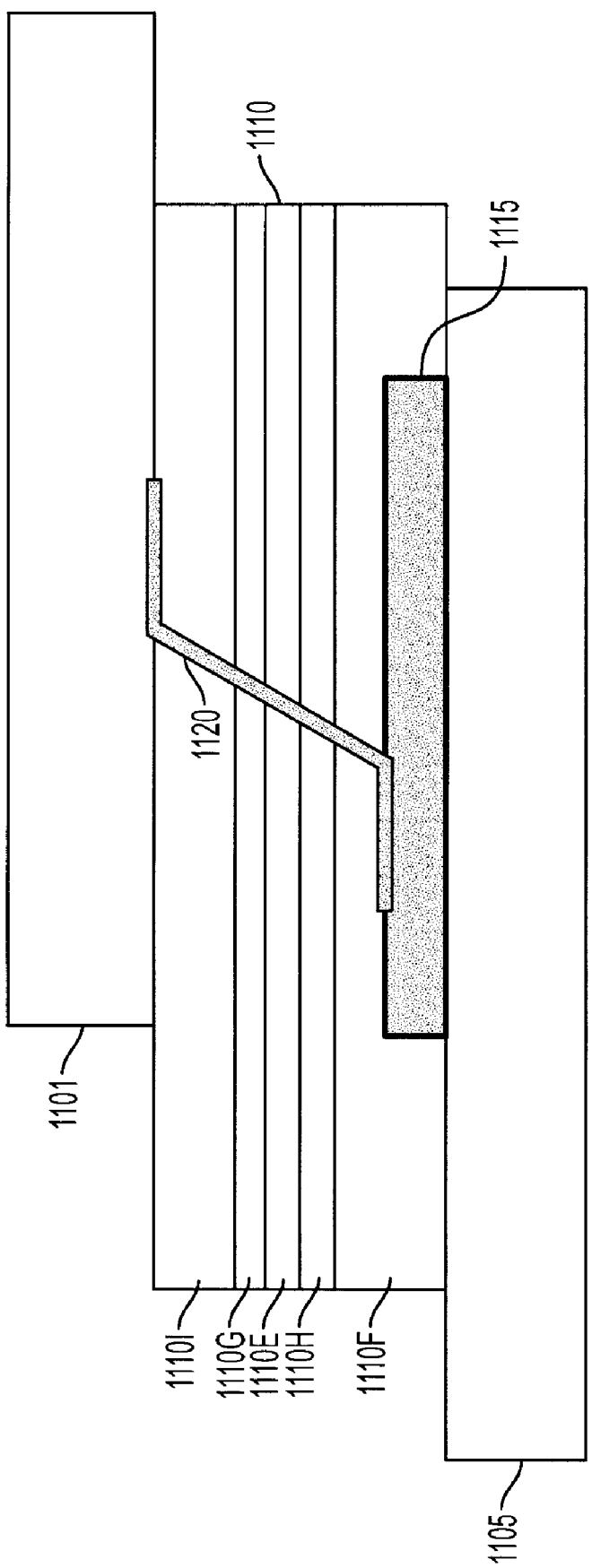
FIG. 21 shows a side view of a bonding layer according to an exemplary embodiment of the present invention.

FIG. 21 shows a side view of a bonding layer according to an exemplary embodiment of the present invention. In this exemplary embodiment, the bonding layer 1110 may be, partly or completely, an isotropic or anisotropic adhesive layer 1110I comprising at least one adhesive selected from the group of ethylene methacrylic acid (E/MAA) copolymer, ethylene methacrylic acid metallate (E/MAA) copolymer, cyano-acrylates, epoxies, fluoro-acrylates, polyimides containing ether linkages, urea-formaldehyde resins, vinyl chlorides, and low-density polyethylene (LDPE) that may contain gold-coated polymer spheres, solder-type alloys, or solid metal powders such as carbon, Ni, Au, Cu, or Ag. The adhesive material could be thermally set (for strong and reliable bonding) or thermoplastic (to facilitate the rework process). The isotropic or anisotropic adhesive may replace the conductor 1120, at least one of the layers from the group of 1110A, 1110B, 1110D, 1110E, 1110F, 1110G, and 1110H, or both.

Figure 22:
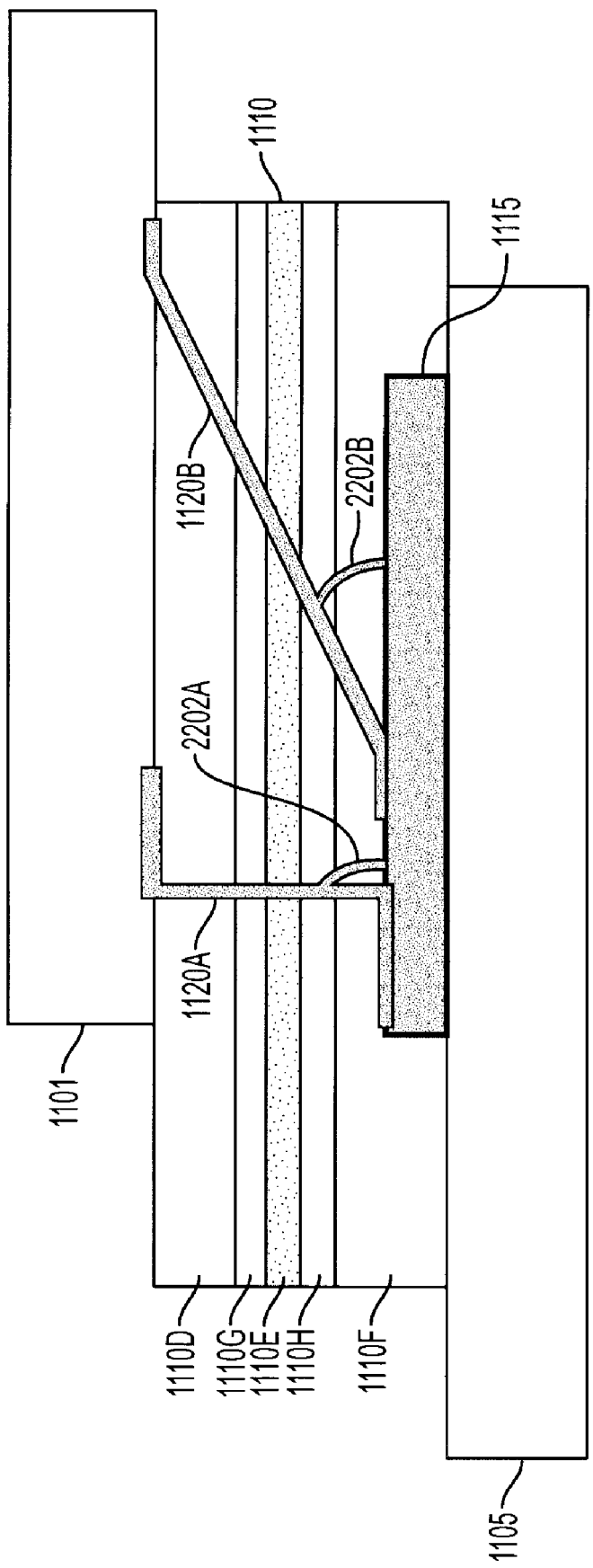
FIG. 22 shows a view of a conductor according to an exemplary embodiment of the present invention.

FIG. 22 shows a view of a conductor according to an exemplary embodiment of the present invention. In this exemplary embodiment, the conductor 1120 may have (one, two, three or many) conducting strips (1120A and 1120B, for example) attached. The strips (1120A, and 1120B) may be made by rolling, electroforming, drawing or any other materials processing technique, or any vacuum deposition technique, such as sputtering, evaporation or CVD, or an electrochemical process (e.g., electroplating or electroless plating). In one exemplary embodiment, the strip-forming process may involve a deposition mask. The strip material can be chosen such that it could form a good metallurgical bond with the anode material (e.g., Li). The metallurgical bond may either be created via a solid solution or through an alloy compound. In another exemplary embodiment, the strip may be made of metal, such as Li, B, graphitic carbon, Al, Si, Sc, Ti, V, Cr, Mn, Fe, Co, Ni, Cu, Y, Zr, Nb, Mo, Ru, Rh, Pd, Ag, In, Sn, Hf, Ta, W, Re, Os, Ir, Pt, Au, Pb, and any alloy thereof, including stainless steel, wherein Li, Ni or Cu are, for example, the most preferred material selections. The strips (1120A and 1120B) may be bent at an angle of a few degrees (for example, 5 degrees) to, for example, 90 degrees with respect to the longest dimension of the conductor 1120. In one exemplary embodiment, the strip 1120A, for example, is bent to form a 90 degree angle 2202A with respect to the longest dimension of the conductor 1120. In another exemplary embodiment, the strip 1120B, for example, is bent to form a 5 degree angle 2202B with respect to the longest dimension of the conductor 1120. The length and width of the strips may range from several micrometers to tens of millimeters. The thickness may range from $1/100^{th}$ of a micrometer up to tens of micrometers. In one exemplary embodiment, the strips are 3 mm long, 0.3 mm wide and 0.01 mm thick.

Figure 25:
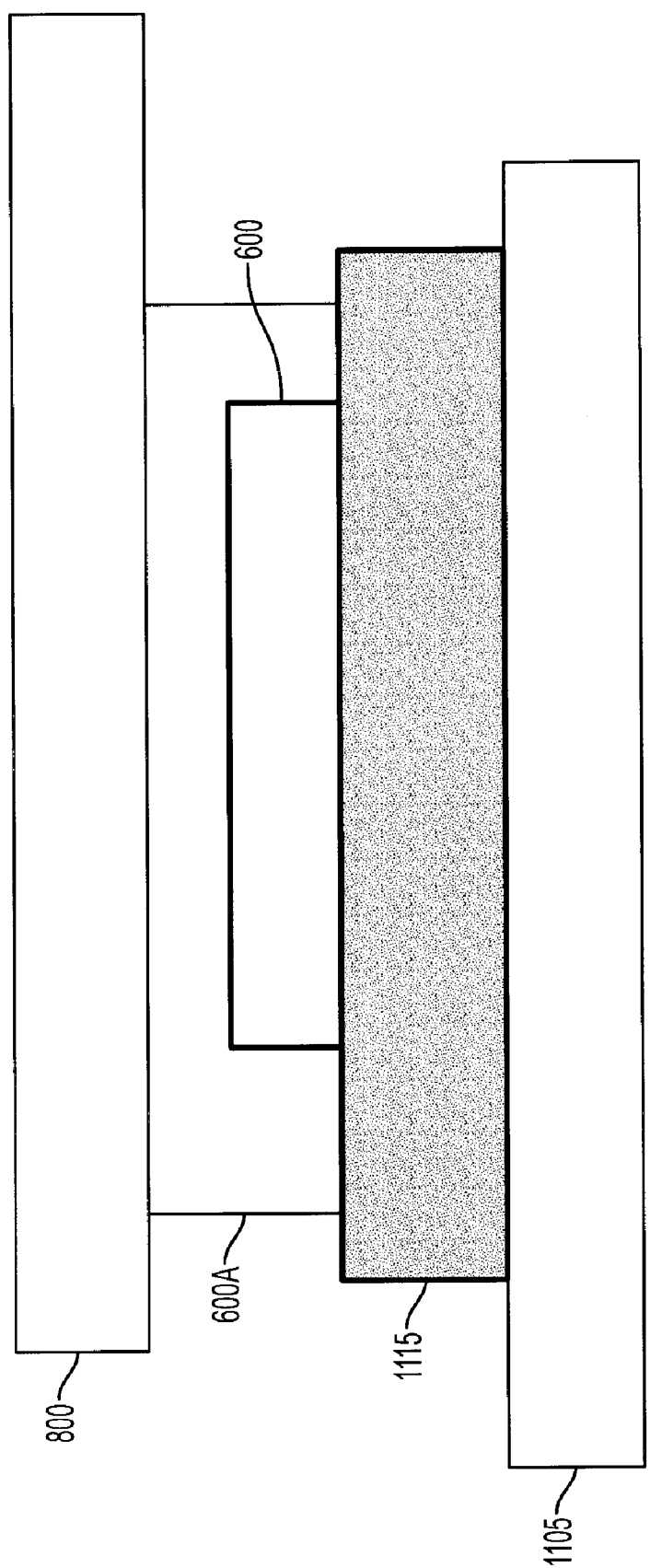
FIG. 25 shows a side view of an exemplary embodiment of the present invention including an anode.

FIG. 25 shows a side view of an exemplary embodiment of the present invention including an anode. In this exemplary embodiment, a protection layer 600A can be deposited on the anode 600. The protection layer 600A may provide electrical contact from the anode 600 to the outside terminal 800 and at the same time provides environmental protection from exposure to moisture, oxygen and environmental species. In this exemplary embodiment, the protection layer 600A can be made of an oxide, nitride, carbide or carbonate. In another exemplary embodiment, the protection layer 600A may be made of a metal that is vapor-deposited (CVD or PVD) with the help of a shadow mask. In yet another exemplary embodiment, the protection layer 600A may be made of Ni or Cu.

Figure 23A:
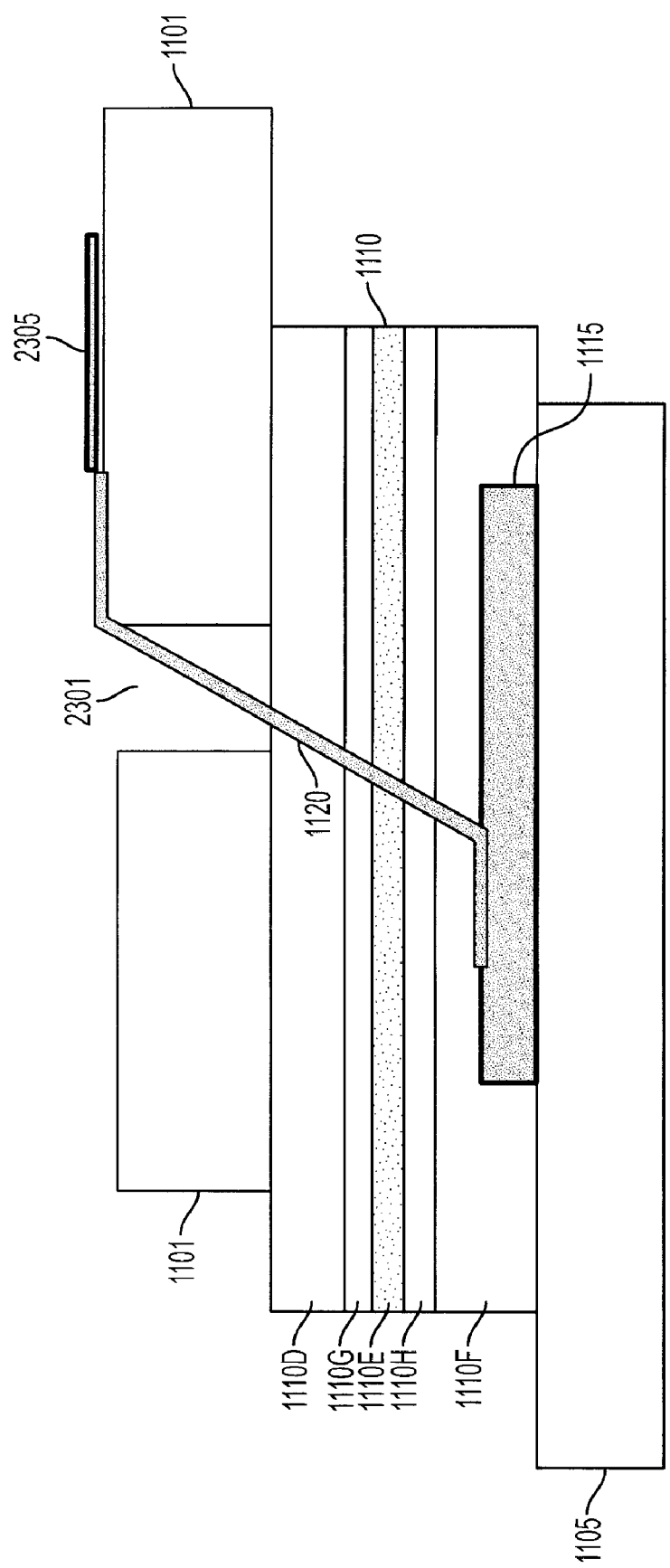
FIG. 23A shows a side view of a bonding layer according to an exemplary embodiment of the present invention.

FIG. 23A shows a side view of a bonding layer according to an exemplary embodiment of the present invention. In this exemplary embodiment, the first contact 1101 can be, for example, a non-conducting, insulating, or semiconducting layer. An opening 2301 may be created (either by mechanical means or masking during formation of the layer) in the non-conducting, insulating, or semiconducting layer 1101 so that the conductor 1120 could be used to contact the cell structure 1115 for termination purposes. A conducting insert (e.g., a metal or an isotropic/anisotropic conducting adhesive) may be placed in the opening 2301. The non-conducting, insulating, or semiconducting layer 1101 may be a ceramic selected from the group comprising BeO, $B_2O_3$, BN, borate glass, $Al_2O_3$, AlN, $SiO_2$, $Si_3N_4$, silicate glass, $ScO_x$, $TiO_x$, $VO_x$, $CrO_x$, $FeO_x$, $YO_x$, $ZrO_x$, $NbO_x$, $MoO_x$, $HfO_x$, $TaO_x$, $WO_x$, a nitride ceramic, a carbide ceramic, or a combination thereof. The non-conducting layer 1101 may also comprise at least one polymer type selected from the group of polyamides (e.g., Nylon), polyimides (e.g., Kapton), polyethylene terephthalates (e.g., Mylar), para-aramids (e.g., Kevlar), polyethylenes, high-density polyethylenes (e.g., Valeron), Ultra High Molecular Weight (UHMW) polyethylenes, polypropylenes, acrylics, polycarbonates, polyvinyl chlorides (PVC and CPVC), Acetal Delrin, phenolics, fluoroplastics (e.g., Teflon), polyurethanes, polystyrenes (e.g., acrylonitrile-butadiene-styrenes [ABS]), Keton PEEK, Tenite resins (e.g., Butyrate) or a combination/modification thereof. Furthermore, the semiconducting layer 1101 may be Si, Ge, GaAs, InP, their alloys, or a combination/modification thereof.

In this exemplary embodiment, the non-conducting layer 1101 may also have printed circuitry 2305 and the cell structure 1115 may be connected into the circuitry 2305 through an opening 2301 through the non-conducting layer 1101 either through the conductor 1120 or by the use of an isotropic or anisotropic conducting adhesive. The opening may be created either by mechanical means or masking/etching. In a different exemplary embodiment, the non-conducting layer 1101 may be equipped with at least one electrical connection layer that goes over at least one edge of the non-conducting layer 1101 and makes electrical contact with both the cell structure 1115 and the printed circuitry 2305 which are sandwiching the non-conducting layer 1101. The electrical connection layer may comprise a conducting medium comprising Li, B, graphitic carbon, Al, Si, Sc, Ti, V, Cr, Mn, Fe, Co, Ni, Cu, Y, Zr, Nb, Mo, Ru, Rh, Pd, Ag, In, Sn, Hf, Ta, W, Re, Os, Ir, Pt, Au, Pb, and any alloy thereof, including stainless steel, wherein Ni or Cu are the most preferred material selections. The non-conducting layer 1101 may provide another protective metallic layer, with or without a bonding layer in between the non-conducting and protective layers. The bonding layer may comprise at least one polymer type selected from the group of ethylene methacrylic acid (E/MAA) copolymer, ethylene methacrylic acid metal late (E/MAA) copolymer, cyano-acrylates, epoxies, fluoro-acrylates, polyimides containing ether linkages, urea-formaldehyde resins, vinyl chlorides, and low-density polyethylene (LDPE).

The bonding layer 1110 in this exemplary embodiment may be used as a heat and pressure resilient layer, without any further reinforcements, because the non-conducting layer does not cause any electrical shorting to the second contact 1105 when the bonding layer is damaged. In another exemplary embodiment, when the non-conductor layer material may tend to react with the cell structure material, a reinforcement structure (a two-layer, three-layer, four-layer, or five layer structure, as illustrated above) may be used in place of the bonding layer.

Figure 23B:
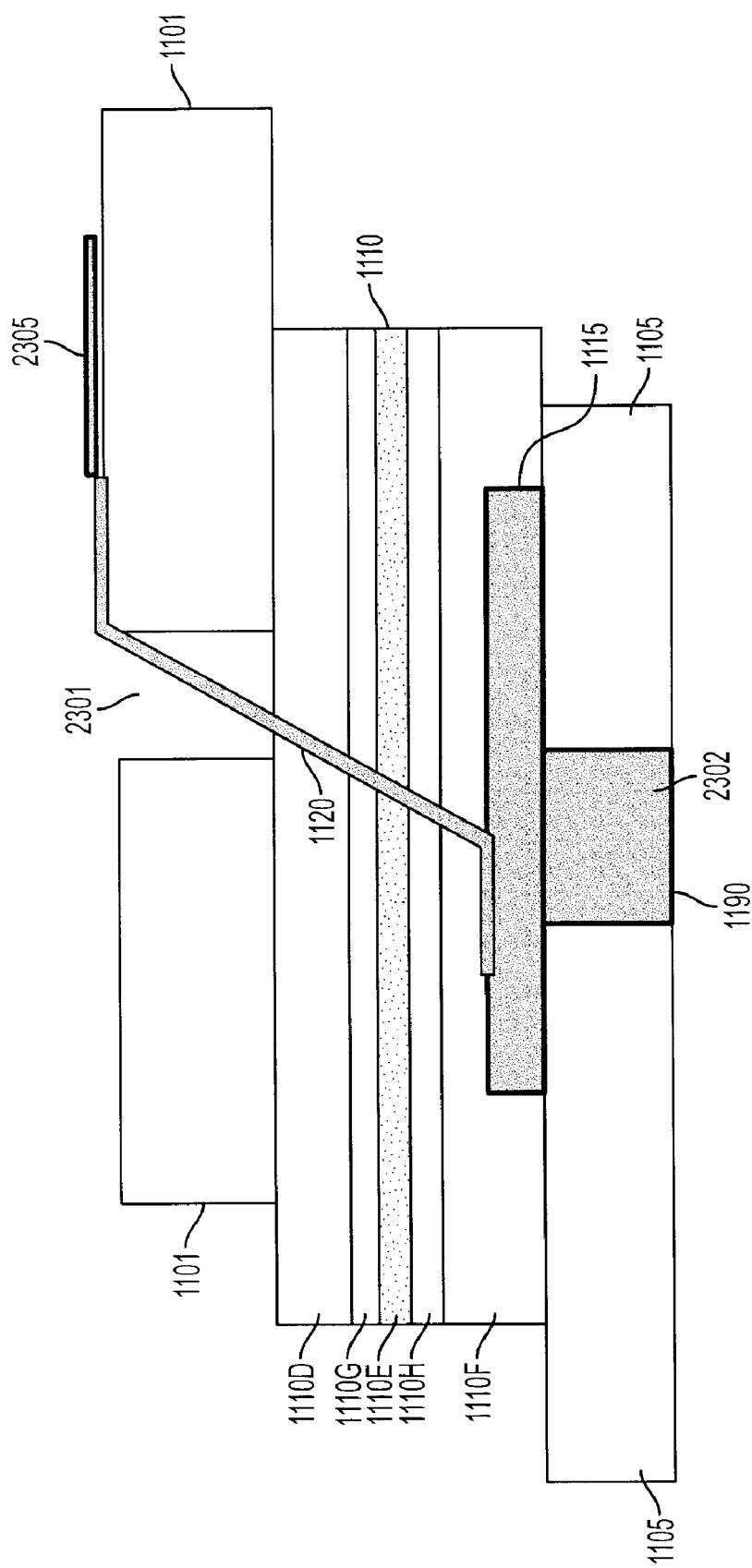
FIG. 23B shows a side view of a bonding layer according to another exemplary embodiment of the present invention.

FIG. 23B shows a side view of a bonding layer according to an exemplary embodiment of the present invention. In this exemplary embodiment, the second contact 1105 is a non-conducting layer. An opening 2302 may be created, either by mechanical means or masking during formation of the layer, in the non-conducting layer 1105 so that a conductor 1190 (hole-filling metallic column of Au, for instance) could be used to contact the cell structure 1115 for termination purposes. A conducting insert (e.g., a metal or an isotropic/anisotropic conducting adhesive) may be placed in the opening. The non-conducting layer 1105 may be a ceramic selected from the group comprising BeO, $B_2O_3$, BN, borate glass, $Al_2O_3$, AlN, $SiO_2$, $Si_3N_4$, silicate glass, $ScO_x$, $TiO_x$, $VO_x$, $CrO_x$, $FeO_x$, $YO_x$, $ZrO_x$, $NbO_x$, $MoO_x$, $HfO_x$, $TaO_x$, $WO_x$, or a combination thereof. In this exemplary embodiment, the bonding layer 1110 may be used as a heat and pressure resilient layer, without any further reinforcements, because the non-conducting layer 1105 does not cause any electrical shorting to the first contact 1101 when the bonding layer is damaged.

Figure 24:
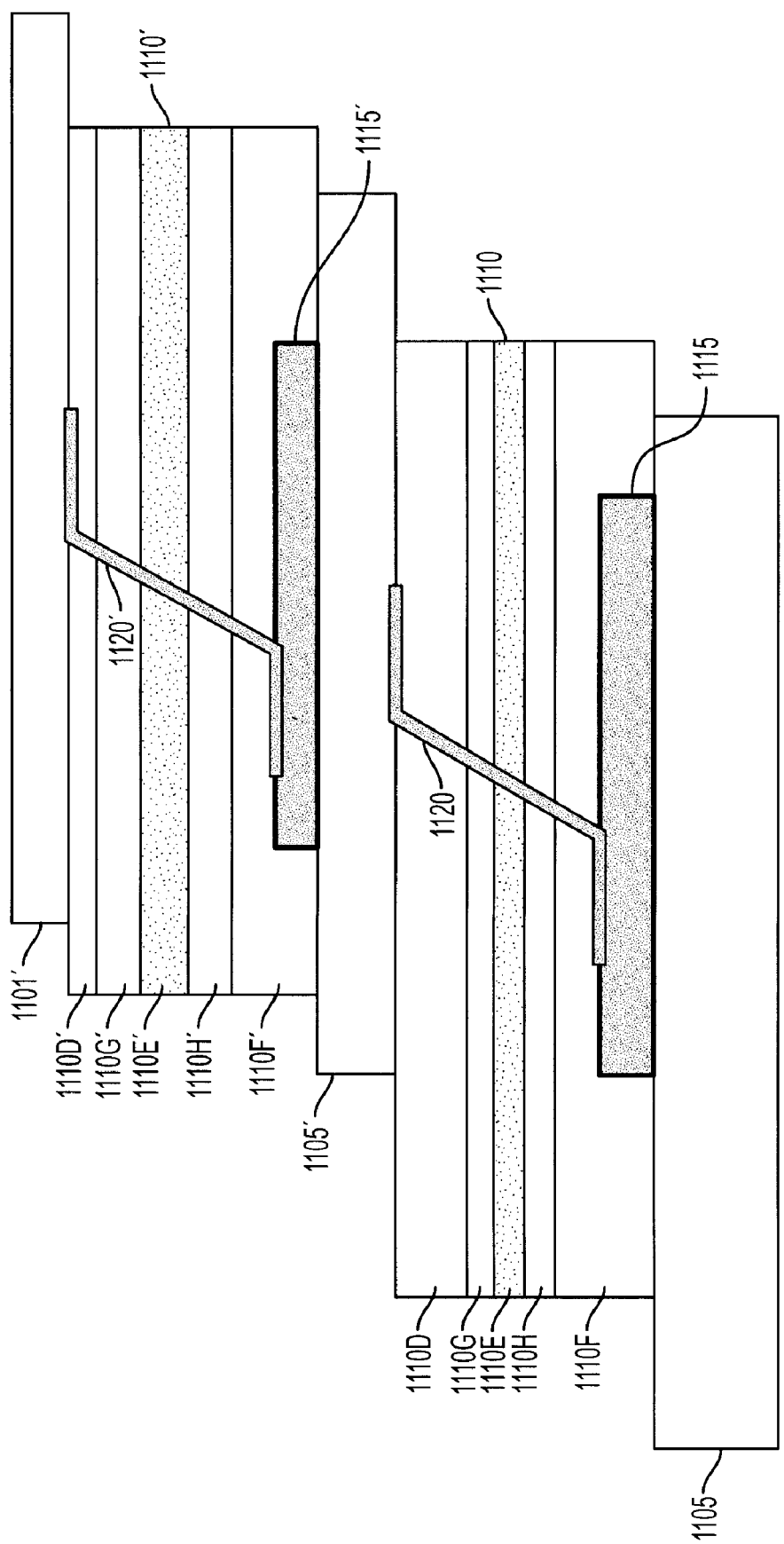
FIG. 24 shows a side view of multiple bonding layers according to an exemplary embodiment of the present invention.

For various purposes, the first contact 1101 may be eliminated for this invention. In one exemplary embodiment, when the first contact layer 1101 is eliminated, the conductor 1120 could be used for electrically contacting the cell structure 1115 for termination purposes. FIG. 24 shows a side view of an exemplary embodiment according to the current invention, in which the first contact 1101 of a first thin-film battery may be replaced by a second thin-film battery, which has all of the layers in FIG. 11A (1101', 1110D', 1110G', 1110E', 1110F', 1110H', 1115', and 1105'), that is head-on attached to the bonding layer 1110 of the first thin-film battery. The said head-on attached second thin-film battery, however, may not necessarily possess all of the layers shown in FIG. 11A and may have any of the layers 1101, 1110, and 1120 missing. For example, two thin-film batteries may be attached to each other via one or multiple bonding layer(s) as detailed above. It is this head-on second thin-film battery that may serve as the heat-and-pressure resilient encapsulation to the first thin-film battery.

The first contact 1101 may be covered by an electrically insulating and mechanically robust film comprising Lipon, borides, carbides, nitrides, oxides, polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, and/or Tenite resins. The borides, carbides, nitrides, and/or oxides, may be configured with boron, aluminum, silicon, Ti, Ta, Zr, Hf or a similar element, or a modification/combination thereof. The insulating film may mechanically and electrically protect the first contact 1101 from damages. For termination purposes, a recess may be created, by a shadow mask during or after the formation of the insulation film, in the first contact 1101 in order for it to make contact with the conductor 1120. To achieve the same purpose, another conductor may also be used in the central portion for contacting the conductor 1120. Furthermore, an isotropic or anisotropic conducting adhesive may be used in the central portion for contacting the conductor 1120 for termination purposes. The isotropic or anisotropic adhesive may comprise at least one adhesive selected from the group of ethylene methacrylic acid (E/MAA) copolymer, ethylene methacrylic acid metallate (E/MAA) copolymer, cyano-acrylates, epoxies, fluoro-acrylates, polyimides containing ether linkages, urea-formaldehyde resins, vinyl chlorides, and low-density polyethylene (LDPE) that contains gold-coated polymer spheres, solder-type alloys, or solid metal powders such as carbon, Ni, Au, Cu, or Ag.

The conductor 1120 may not be a necessary component of the current invention. The contact between the first contact 1101 and the cell structure 1115 can be made by applying pressure by a mandrel in the central portion of the first contact 1101 so that a depression is created in the first contact 1101 thereby creating an electrical contact. The bonding layer 1110 can be removed before creating the depression of 1101 by the mandrel so as to create a more robust electrical contact between the first contact and the cell structure.

The embodiments and examples described above are exemplary only. One skilled in the art may recognize variations from the embodiments specifically described here, which are intended to be within the scope of this disclosure and invention. As such, the invention is limited only by the following claims. Thus, it is intended that the present invention cover the modifications of this invention provided they come within the scope of the appended claims and their equivalents.

What is claimed is:

1. A battery comprising:
   a first electrical contact;
   a cell structure comprising a cathode, an anode and an electrolyte;
   a bonding layer coupled with said first electrical contact and said bonding layer comprising an embedded conductor, wherein said embedded conductor contacts said cell structure and wherein said embedded conductor physically contacts said first electrical contact; and
   a second electrical contact;
   wherein said bonding layer and said at least one cell structure are sandwiched between said first electrical contact and said second electrical contact; and
   wherein said bonding layer comprises a plurality of layers in which the cell structure is at least in part within one of the plurality of layers.

2. The battery of claim 1, wherein said bonding layer comprises at least one adhesive material.

3. The battery of claim 2, wherein said adhesive material comprises a material selected from the group of thermoplastic, thermally set, ethylene, methacrylic acid (E/MAA) copolymer, ethylene methacrylic acid metallate (E/MAA) copolymer, cyano-acrylates, epoxies, fluoro-acrylates, polyimides containing ether linkages, urea-formaldehyde resins, vinyl chlorides, and low-density polyethylene (LDPE).

4. The battery of claim 1, wherein said bonding layer comprises at least one material selected from the group of thermoplastic, thermally set, ethylene methacrylic acid (E/MAA) copolymer, ethylene methacrylic acid metallate (E/MAA) copolymer, cyano-acrylates, epoxies, fluoro-acrylates, polyimides containing ether linkages, urea-formaldehyde resins, vinyl chlorides, and low-density polyethylene (LDPE).

5. The battery of claim 1, wherein said bonding, layer comprises at least one material selected from the group of polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, oxide ceramic, nitride ceramic, carbide ceramic, silicate based glass, non-silicate based glass, fiber-glass, and any combination thereof.

6. The battery of claim 4, wherein said bonding layer further comprises at least one material selected from the group of polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, oxide ceramic, nitride ceramic, carbide ceramic, silicate based glass, non-silicate based glass, fiberglass, and any combination thereof.

7. The battery of claim 1, wherein said embedded conductor comprises at least one element selected from the group of Li, B, graphitic carbon, Al, Si, Sc, Ti, V, Cr, Mn, Fe, Co, Ni, Cu, Y, Zr, Nb, Mo, Ru, Rh, Pd, Ag, In, Sn, Hf, Ta, W, Re, Os, Ir, Pt, Au, Pb, any alloy thereof, and stainless steel.

8. The battery of claim 7, wherein said embedded conductor further comprises a plurality of conductors selected from the group of Li, B, graphitic carbon, Al, Si, Sc, Ti, V, Cr, Mn, Fe, Co, Ni, Cu, Y, Zr, Nb, Mo, Ru, Rh, Pd, Ag, In, Sn, Hf, Ta, W, Re, Os, Ir, Pt, Au, Pb, any alloy thereof, and stainless steel.

9. The battery of claim 1, wherein said bonding layer comprises an isotropic or anisotropic electronically conducting adhesive comprising at least one adhesive selected from the group of ethylene methacrylic acid (E/MAA) copolymer, ethylene methacrylic acid metallate (E/MAA) copolymer, cyano-acrylates, epoxies, fluoro-acrylates, polyimides containing ether linkages, urea-formaldehyde resins, vinyl chlorides, and low-density polyethylene (LDPE) and at least one electronically conducting material selected from the group comprising gold-coated polymer spheres, solder-type alloys, carbon, Ni, Cu, Au, Ag, and metallic powders.

10. The battery of claim 1, wherein said first electrical contact is a conductor or an electronically insulating layer with a conducting insert.

11. The battery of claim 10, wherein said electronically insulating layer comprises at least a ceramic selected from the group of BeO, $B_2O_3$, BN, borate glass, $Al_2O_3$, AlN, $SiO_2$, $Si_3N_4$, silicate glass, $ScO_x$, $TiO_x$, $VO_x$, $CrO_x$, $FeO_x$, $YO_x$, $ZrO_x$, $NbO_x$, $MoO_x$, $HfO_x$, $TaO_x$, $WO_x$, and any combination thereof.

12. The battery of claim 10, wherein said electronically insulating layer comprises at least a polymer material selected from the group of polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, and Tenite resins.

13. The battery of claim 10, wherein said electronically insulating layer comprises a composite material whose components are selected from the group of BeO, B203, BN, borate glass, $Al_2O_3$, AlN, Si $O_2$, Si3N4, silicate glass, $ScO_x$, $TiO_x$, $VO_x$, $CrO_x$, $FeO_x$, $YO_x$, $ZrO_x$, $NbO_x$, $MoO_x$, $HfO_x$, $TaO_x$, $WO_x$, polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, and any combination thereof.

14. A battery comprising:
a first electrical contact wherein said first electrical contact is a conductor covered at least in part with an electrically insulating film or wherein said first electrical contact is an electronically insulating layer with a conducting insert;
a cell structure comprising a cathode, an anode and an electrolyte;
a bonding layer coupled with said first electrical contact and said bonding layer comprising an embedded conductor; and
a second electrical contact;
wherein said bonding layer and said at least one cell structure are sandwiched between said first electrical contact and said second electrical contact;
wherein said bonding layer comprises a plurality of layers; and
wherein said electrically insulating film comprises materials selected from the group selected from the group of Lipon, BeO, $B_2O_3$, BN, borate glass, $Al_2O_3$, MN, $SiO_2$, $Si_3N_4$, silicate glass, ScOx, $TiO_x$, $VO_x$, $CrO_x$, $FeO_x$, $YO_x$, $ZrO_x$, $NbO_x$, $MoO_x$, $HfO_x$, $TaO_x$, $WO_x$, olyamides, polyimides, polyethylene terephthalates, para-aramids, polyethylenes, high density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, and any combination thereof.

15. The battery of claim 10, wherein said conductor is covered with a mechanically robust film.

16. The battery of claim 15, wherein said mechanically robust film comprises materials selected from the group of Lipon, borides, carbides, nitrides, oxides, polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, and any combination thereof.

17. A battery comprising:
at least one cell structure comprising a cathode, an anode and an electrolyte; an insulating layer comprising a plurality of layers in which the cell structure is at least in part within one of the plurality of layers;
at least one embedded conductor positioned inside each of said plurality of layers of said insulating layer wherein said embedded conductor is adapted to act as a first electrical contact and wherein said embedded conductor contacts said cell structure; and
a second electrical contact;
wherein said at least one cell structure is sandwiched between said insulating layer and said second electrical contact.

18. A battery comprising:
a first cell structure and a neighboring cell structure stacked on top of each other; wherein each said cell structure comprises, a cathode, an anode, an electrolyte, a first electrical contact and a second electrical contact;
a bonding layer;
wherein said bonding layer is sandwiched between said first electrical contact of said first cell structure and said second electrical contact of said neighboring cell structure; wherein said boding layer comprises a plurality of layers in which the cell structure is at least in part within one of the plurality of layers; and
wherein said bonding layer further comprises at least one embedded conductor and wherein said embedded conductor contacts said cell structure and wherein said embedded conductor physically contacts said first electrical contact.

19. The battery of claim 18, wherein said bonding layer comprises at least one material selected from the group of thermoplastic, thermally set, ethylene ethylene methacrylic acid (E/MAA) copolymer, ethylene methacrylic acid metallate (E/MAA) copolymer, cyano-acrylates, epoxies, fluoro-acrylates, polyimides containing ether linkages, urea-formaldehyde resins, vinyl chlorides, and low-density polyethylene (LDPE).

20. The battery of claim 18, wherein said bonding layer comprises at least one material selected from the group of polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, oxide ceramic, nitride ceramic, carbide ceramic, silicate glass, non-silicate based glass, fiberglass, and any combination thereof.

21. The battery of claim 18, wherein said bonding layer comprises at least one material selected from the group of thermoplastic, thermally set, ethylene ethylene methacrylic acid (E/MAA) copolymer, ethylene methacrylic, acid Metallate (E/MAA) copolymer, cyano-acrylates, epoxies, fluoro-acrylates, polyimides containing ether linkages, urea-formaldehyde resins, vinyl chlorides, low-density polyethylene (LDPE), polyamides, polyimides, polyethylene terephthalates, para-aramids, polyethylenes, high-density polytheylenes, Ultra High Molecular Weight (UHMW) polyethylenes, polypropylenes, acrylics, polycarbonates, polyvinyl chlorides, acetal delrin, phenolics, fluoroplastics, polyurethanes, polystyrenes, acrylonitrile-butadiene-styrenes (ABS), Keton PEEK, Tenite resins, oxide ceramic, nitride ceramic, carbide ceramic, silicate glass, non-silicate based glass, fiberglass, and any combination thereof.

22. The battery of claim 1, wherein said bonding layer further comprises printed circuitry.

23. The battery of claim 22, wherein said bonding layer further comprises an edge wherein a portion of said edge contacts said first contact and a portion of said edge does not contact said first contact.

24. A battery comprising:
a first electrical contact;
a cell structure comprising a cathode, an anode and an electrolyte;
a bonding layer coupled with said first electrical contact and said bonding layer comprising an embedded conductor, wherein said embedded conductor contacts said cell structure; and
a second electrical contact;
wherein said bonding layer and said at least one cell structure are sandwiched between said first electrical contact and said second electrical contact; and
wherein said bonding layer comprises a plurality of layers and wherein said bonding layer comprises printed circuitry embedded within said bonding layer.

* * * * *

UNITED STATES PATENT AND TRADEMARK OFFICE
CERTIFICATE OF CORRECTION

PATENT NO. : 8,394,522 B2
APPLICATION NO. : 12/111388
DATED : March 12, 2013
INVENTOR(S) : Shawn W. Snyder et al.

It is certified that error appears in the above-identified patent and that said Letters Patent is hereby corrected as shown below:

In the Claims:

At column 20, line 16, replace "olyamides" with --polyamides--.

Signed and Sealed this
Seventh Day of May, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,394,522 B2 | Page 1 of 1 |
| APPLICATION NO. | : 12/111388 | |
| DATED | : March 12, 2013 | |
| INVENTOR(S) | : Snyder et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this
Eighteenth Day of November, 2014

Michelle K. Lee
*Deputy Director of the United States Patent and Trademark Office*